(12) United States Patent
Wilson

(10) Patent No.: US 11,960,701 B2
(45) Date of Patent: Apr. 16, 2024

(54) USING AN ILLUSTRATION TO SHOW THE PASSING OF TIME

(71) Applicant: Apple Inc., Cupertino, CA (US)

(72) Inventor: Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/861,651

(22) Filed: Apr. 29, 2020

(65) Prior Publication Data

US 2020/0356224 A1 Nov. 12, 2020

Related U.S. Application Data

(60) Provisional application No. 62/843,723, filed on May 6, 2019.

(51) Int. Cl.
| | | |
|---|---|---|
| *G06F 3/0482* | (2013.01) | |
| *G06F 3/01* | (2006.01) | |
| *G06F 3/04845* | (2022.01) | |
| *G06F 3/04883* | (2022.01) | |
| *G06F 9/54* | (2006.01) | |
| *G06T 13/80* | (2011.01) | |

(52) U.S. Cl.
CPC ............ *G06F 3/0482* (2013.01); *G06F 3/011* (2013.01); *G06F 3/017* (2013.01); *G06F 3/04845* (2013.01); *G06F 3/04883* (2013.01); *G06F 9/542* (2013.01); *G06T 13/80* (2013.01)

(58) Field of Classification Search
CPC ........... G06F 3/14; G06F 3/0482; G06F 3/011
USPC .................................................. 715/764, 727
See application file for complete search history.

(56) References Cited

U.S. PATENT DOCUMENTS

| | | |
|---|---|---|
| 872,200 A | 11/1907 | Rowe |
| 3,148,500 A | 9/1964 | Thomas |
| 3,633,354 A | 1/1972 | Stemmler |
| 4,205,628 A | 6/1980 | Null |
| 4,355,380 A | 10/1982 | Huguenin et al. |
| 4,597,674 A | 7/1986 | Thompson |

(Continued)

FOREIGN PATENT DOCUMENTS

| | | |
|---|---|---|
| AU | 2010249319 A1 | 6/2012 |
| AU | 2015101019 A4 | 9/2015 |

(Continued)

OTHER PUBLICATIONS

Barbosa Jonathan, "Weather Clock 2.1 for Android", APKPure, Online Available at: https://apkpure.com/weather-clock/com.urbandroid.wclock, Oct. 15, 2015, 3 pages.

(Continued)

*Primary Examiner* — Ruay Ho
(74) *Attorney, Agent, or Firm* — DLA Piper LLP (US)

(57) ABSTRACT

The present disclosure generally relates to providing electronic devices with faster, more efficient methods and context-specific user interfaces for indicating time. Such methods and interfaces optionally complement or replace other methods for indicating time. Such methods and interfaces reduce the cognitive burden on a user and produce a more efficient human-machine interface. For battery-operated computing devices, such methods and interfaces conserve power and increase the time between battery charges.

30 Claims, 21 Drawing Sheets

(56) References Cited

U.S. PATENT DOCUMENTS

| | | |
|---|---|---|
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,383,165 A | 1/1995 | Vaucher |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,809,724 B1 | 10/2004 | Shiraishi et al. |
| 6,871,076 B2 | 3/2005 | Samn et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,725,842 B1 | 5/2014 | Al-nasser |
| 8,847,903 B2 | 9/2014 | Stokes et al. |
| 8,854,925 B1 | 10/2014 | Lee et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,369,537 B1 | 6/2016 | Mathew et al. |
| 9,377,762 B2 | 6/2016 | Hoobler et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 * | 3/2017 | Matas ............... H04L 51/32 |
| 9,625,987 B1 | 4/2017 | Lapenna et al. |
| 9,753,436 B2 | 9/2017 | Ely et al. |
| 9,794,397 B2 | 10/2017 | Min et al. |
| 10,019,599 B1 | 7/2018 | Moran et al. |
| 10,062,133 B1 | 8/2018 | Mishra et al. |
| 10,282,078 B2 | 5/2019 | Choi |
| 10,304,347 B2 | 5/2019 | Wilson et al. |
| 10,489,508 B2 | 11/2019 | Zhai et al. |
| 10,620,590 B1 | 4/2020 | Guzman et al. |
| 10,684,592 B2 | 6/2020 | Chang et al. |
| 10,721,711 B2 | 7/2020 | Kirov et al. |
| 10,788,797 B1 | 9/2020 | Guzman et al. |
| 10,817,981 B1 | 10/2020 | Belkin |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,050,873 B2 | 6/2021 | Kim et al. |
| 11,061,372 B1 | 7/2021 | Chen et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0135769 A1 | 7/2003 | Loughran |
| 2003/0140309 A1 | 7/2003 | Saito et al. |
| 2003/0164847 A1 | 9/2003 | Zaima et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0122543 A1 | 6/2005 | Walker |
| 2005/0124389 A1 | 6/2005 | Yang |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0085765 A1 | 4/2006 | Peterson et al. |
| 2006/0092770 A1 | 5/2006 | Demas |
| 2006/0166708 A1 | 7/2006 | Kim et al. |
| 2006/0214935 A1 | 9/2006 | Boyd et al. |

(56) References Cited

U.S. PATENT DOCUMENTS

| | | |
|---|---|---|
| 2006/0239640 A1 | 10/2006 | Watanabe et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0150959 A1 | 6/2008 | Marui et al. |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0012988 A1 | 1/2009 | Brown |
| 2009/0016168 A1 | 1/2009 | Smith |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0060586 A1 | 3/2010 | Pisula et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge et al. |
| 2010/0235726 A1 | 9/2010 | Ording et al. |
| 2010/0243516 A1 | 9/2010 | Martin et al. |
| 2010/0257469 A1 | 10/2010 | Kim et al. |
| 2010/0281374 A1 | 11/2010 | Schulz et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0022294 A1 | 1/2011 | Apley |
| 2011/0025719 A1 | 2/2011 | Yanase et al. |
| 2011/0029870 A1 | 2/2011 | May et al. |
| 2011/0047014 A1 | 2/2011 | De |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris et al. |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0017180 A1 | 1/2012 | Flik et al. |
| 2012/0028707 A1 | 2/2012 | Raitt et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0154156 A1 | 6/2012 | Kuntzel |
| 2012/0182226 A1 | 7/2012 | Tuli |
| 2012/0197523 A1 | 8/2012 | Kirsch et al. |
| 2012/0210263 A1 | 8/2012 | Perry et al. |
| 2012/0212495 A1 | 8/2012 | Butcher et al. |
| 2012/0218201 A1 | 8/2012 | Tamas et al. |

(56) References Cited

U.S. PATENT DOCUMENTS

| | | |
|---|---|---|
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0121119 A1 | 5/2013 | Umamoto |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0170324 A1 | 7/2013 | Tu et al. |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332856 A1 | 12/2013 | Sanders et al. |
| 2013/0345980 A1 | 12/2013 | Van Os et al. |
| 2014/0013414 A1 | 1/2014 | Bruck et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047389 A1 | 2/2014 | Aarabi |
| 2014/0047525 A1 | 2/2014 | Bonhoff |
| 2014/0055495 A1 | 2/2014 | Kim et al. |
| 2014/0059493 A1 | 2/2014 | Kim et al. |
| 2014/0068755 A1 | 3/2014 | King et al. |
| 2014/0074570 A1 | 3/2014 | Hope et al. |
| 2014/0082533 A1 | 3/2014 | Kelley et al. |
| 2014/0094224 A1 | 4/2014 | Lozovoy et al. |
| 2014/0101169 A1 | 4/2014 | Kurata et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0173439 A1* | 6/2014 | Gutierrez ........... G08B 21/0236 715/727 |
| 2014/0189578 A1 | 7/2014 | Shuttleworth et al. |
| 2014/0189584 A1 | 7/2014 | Weng et al. |
| 2014/0200691 A1 | 7/2014 | Lee et al. |
| 2014/0201655 A1 | 7/2014 | Mahaffey et al. |
| 2014/0229752 A1 | 8/2014 | Lee et al. |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Crandall |
| 2014/0282153 A1 | 9/2014 | Christiansen et al. |
| 2014/0282254 A1 | 9/2014 | Feiereisen et al. |
| 2014/0289660 A1 | 9/2014 | Min et al. |
| 2014/0293755 A1 | 10/2014 | Geiser et al. |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0347275 A1 | 11/2014 | Jung et al. |
| 2014/0359477 A1 | 12/2014 | Chen |
| 2014/0362105 A1 | 12/2014 | Kocienda et al. |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0070378 A1 | 3/2015 | Kriese et al. |
| 2015/0071043 A1 | 3/2015 | Kubota |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |

(56) References Cited

U.S. PATENT DOCUMENTS

| | | |
|---|---|---|
| 2015/0217163 A1 | 8/2015 | Amis et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0339261 A1 | 11/2015 | Jha et al. |
| 2015/0346694 A1 | 12/2015 | Hoobler et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0379476 A1 | 12/2015 | Chaudhri et al. |
| 2016/0004393 A1 | 1/2016 | Faaborg et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0048161 A1 | 2/2016 | Carceroni et al. |
| 2016/0048283 A1 | 2/2016 | Yang et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0103427 A1 | 4/2016 | Westra et al. |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0187995 A1 | 6/2016 | Rosewall |
| 2016/0188179 A1 | 6/2016 | Roh |
| 2016/0188181 A1 | 6/2016 | Smith et al. |
| 2016/0191511 A1 | 6/2016 | Tijerina et al. |
| 2016/0217601 A1 | 7/2016 | Tsuda et al. |
| 2016/0259518 A1 | 9/2016 | King et al. |
| 2016/0259656 A1 | 9/2016 | Sumner et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0313869 A1 | 10/2016 | Jang et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357282 A1 | 12/2016 | Block et al. |
| 2016/0357354 A1 | 12/2016 | Chen et al. |
| 2016/0357386 A1 | 12/2016 | Choi |
| 2016/0358311 A1 | 12/2016 | Chen et al. |
| 2017/0003659 A1 | 1/2017 | Nakanishi |
| 2017/0011210 A1 | 1/2017 | Cheong et al. |
| 2017/0039535 A1 | 2/2017 | Park et al. |
| 2017/0045993 A1 | 2/2017 | Oh et al. |
| 2017/0046024 A1* | 2/2017 | Dascola .............. G06F 3/04845 |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0134321 A1 | 5/2017 | Ushio et al. |
| 2017/0149795 A1 | 5/2017 | Day |
| 2017/0160898 A1 | 6/2017 | Lee et al. |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0230236 A1 | 8/2017 | Kim et al. |
| 2017/0255169 A1 | 9/2017 | Lee et al. |
| 2017/0257426 A1 | 9/2017 | Wilbur et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357426 A1 | 12/2017 | Wilson et al. |
| 2017/0357427 A1 | 12/2017 | Wilson et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1* | 3/2018 | Bae ..................... G09G 5/393 |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1* | 3/2018 | Murai ................. G04G 9/0064 |
| 2018/0088797 A1 | 3/2018 | Mcatee et al. |
| 2018/0097925 A1 | 4/2018 | Ryu et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1* | 6/2018 | Nelson ................. G09G 5/377 |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0275739 A1 | 9/2018 | Minami et al. |
| 2018/0288560 A1 | 10/2018 | Naik et al. |
| 2018/0316783 A1* | 11/2018 | Ye ....................... H04M 1/0268 |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0343023 A1 | 11/2018 | Park et al. |
| 2018/0352435 A1 | 12/2018 | Donley et al. |
| 2018/0374429 A1 | 12/2018 | Nakamura |
| 2019/0050045 A1 | 2/2019 | Jha et al. |
| 2019/0069244 A1 | 2/2019 | Jeon et al. |
| 2019/0072909 A1 | 3/2019 | Misaki et al. |
| 2019/0121300 A1 | 4/2019 | Peterson et al. |
| 2019/0139207 A1 | 5/2019 | Jeong et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0250813 A1 | 8/2019 | Block et al. |
| 2019/0268771 A1 | 8/2019 | Seo et al. |
| 2019/0279520 A1 | 9/2019 | Wilson et al. |

(56) References Cited

U.S. PATENT DOCUMENTS

| | | |
|---|---|---|
| 2019/0281154 A1 | 9/2019 | Choi et al. |
| 2019/0302972 A1 | 10/2019 | Kline et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0068095 A1 | 2/2020 | Nabetani |
| 2020/0089302 A1 | 3/2020 | Kim et al. |
| 2020/0125037 A1 | 4/2020 | Jo et al. |
| 2020/0133206 A1 | 4/2020 | Jo et al. |
| 2020/0249632 A1 | 8/2020 | Olwal et al. |
| 2020/0264567 A1 | 8/2020 | Ok et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356242 A1 | 11/2020 | Wilson et al. |
| 2020/0356252 A1 | 11/2020 | Ko et al. |
| 2020/0359204 A1 | 11/2020 | Hawkins et al. |
| 2020/0379413 A1 | 12/2020 | Chen et al. |
| 2021/0042028 A1 | 2/2021 | Block et al. |
| 2021/0048929 A1 | 2/2021 | Agnoli et al. |
| 2021/0149694 A1 | 5/2021 | Guzman et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2022/0198984 A1 | 6/2022 | Connor et al. |
| 2022/0229537 A1 | 7/2022 | Chen et al. |
| 2022/0236867 A1 | 7/2022 | Chen et al. |
| 2023/0004270 A1 | 1/2023 | Chen et al. |
| 2023/0035532 A1 | 2/2023 | Chen et al. |
| 2023/0236547 A1 | 7/2023 | Chen et al. |
| 2023/0236549 A1 | 7/2023 | Guzman et al. |
| 2023/0236550 A1 | 7/2023 | Chen et al. |
| 2023/0282146 A1 | 9/2023 | Connor et al. |
| 2023/0350564 A1 | 11/2023 | Chen et al. |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1083229 A | 3/1994 |
| CN | 1337638 A | 2/2002 |
| CN | 1397904 A | 2/2003 |
| CN | 2602404 Y | 2/2004 |
| CN | 1536511 A | 10/2004 |
| CN | 1610866 A | 4/2005 |
| CN | 1997957 A | 7/2007 |
| CN | 101382438 A | 3/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 202217134 U | 5/2012 |
| CN | 102687176 A | 9/2012 |
| CN | 102750070 A | 10/2012 |
| CN | 103399480 A | 11/2013 |
| CN | 103562832 A | 2/2014 |
| CN | 103607660 A | 2/2014 |
| CN | 103649897 A | 3/2014 |
| CN | 103902165 A | 7/2014 |
| CN | 103914238 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 104898402 A | 9/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 205608658 U | 9/2016 |
| CN | 106056848 A | 10/2016 |
| CN | 106486044 A | 3/2017 |
| CN | 106605201 A | 4/2017 |
| CN | 106909064 A | 6/2017 |
| CN | 107239101 A | 10/2017 |
| CN | 107430489 A | 12/2017 |
| CN | 107643677 A | 1/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 1988432 A1 | 11/2008 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2629483 A1 | 8/2013 |
| EP | 2738640 A2 | 6/2014 |
| EP | 2942932 A1 | 11/2015 |
| EP | 2955591 A2 | 12/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3152643 A1 | 4/2017 |
| EP | 3376342 A1 | 9/2018 |
| EP | 3401770 A1 | 11/2018 |
| EP | 3896560 A1 | 10/2021 |
| GB | 2475669 A | 6/2011 |
| JP | 49-134364 A | 12/1974 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-271451 A | 9/2002 |
| JP | 2003-9404 A | 1/2003 |

(56) References Cited

FOREIGN PATENT DOCUMENTS

| | | |
|---|---|---|
| JP | 2003-121568 A | 4/2003 |
| JP | 2003-233616 A | 8/2003 |
| JP | 2003-296246 A | 10/2003 |
| JP | 2004-28918 A | 1/2004 |
| JP | 2004-184396 A | 7/2004 |
| JP | 2005-521890 A | 7/2005 |
| JP | 2005-339017 A | 12/2005 |
| JP | 2006-101505 A | 4/2006 |
| JP | 2006-242717 A | 9/2006 |
| JP | 2008-175800 A | 7/2008 |
| JP | 2009-147889 A | 7/2009 |
| JP | 2009-229106 A | 10/2009 |
| JP | 2009-293960 A | 12/2009 |
| JP | 2010-124181 A | 6/2010 |
| JP | 2010-257051 A | 11/2010 |
| JP | 3168099 U | 6/2011 |
| JP | 2011-217000 A | 10/2011 |
| JP | 2012-32306 A | 2/2012 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2013-232230 A | 11/2013 |
| JP | 2014-123197 A | 7/2014 |
| JP | 2014-519126 A | 8/2014 |
| JP | 5-630676 B2 | 11/2014 |
| JP | 2014-216868 A | 11/2014 |
| JP | 2015-210587 A | 11/2015 |
| JP | 2016-013151 A | 1/2016 |
| JP | 2017-111083 A | 6/2017 |
| JP | 2017-527026 A | 9/2017 |
| JP | 2017-531225 A | 10/2017 |
| JP | 2017-531230 A | 10/2017 |
| JP | 2018-514838 A | 6/2018 |
| JP | 2018-113544 A | 7/2018 |
| JP | 2018-116067 A | 7/2018 |
| JP | 2020-56745 A | 4/2020 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-2009-0112132 A | 10/2009 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2014-0074824 A | 6/2014 |
| KR | 10-2015-0008996 A | 1/2015 |
| KR | 10-2015-0038711 A | 4/2015 |
| KR | 10-2015-0081140 A | 7/2015 |
| KR | 10-2015-0140212 A | 12/2015 |
| KR | 10-2016-0026314 A | 3/2016 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2018-0011581 A | 2/2018 |
| KR | 10-1875907 B1 | 7/2018 |
| KR | 10-2019-0020850 A | 3/2019 |
| KR | 10-2019-0071285 A | 6/2019 |
| KR | 10-2019-0114034 A | 10/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |
| WO | 1998/40795 A1 | 9/1998 |
| WO | 2001/71433 A1 | 9/2001 |
| WO | 2002/054157 A1 | 7/2002 |
| WO | 2003/048872 A1 | 6/2003 |
| WO | 2003/085460 A2 | 10/2003 |
| WO | 2006/012343 A2 | 2/2006 |
| WO | 2006/112641 A1 | 10/2006 |
| WO | 2007/018881 A2 | 2/2007 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2015/023419 A1 | 2/2015 |
| WO | 2015/034960 A1 | 3/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/025395 A2 | 2/2016 |
| WO | 2016/032076 A1 | 3/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213777 A1 | 12/2017 |
| WO | 2017/213899 A1 | 12/2017 |
| WO | 2017/213937 A1 | 12/2017 |
| WO | 2018/048700 A1 | 3/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.

Non-Final Office Action received for U.S. Appl. No. 15/421,865, dated Oct. 7, 2020, 20 pages.

Non-Final Office Action received for U.S. Appl. No. 16/659,507, dated Oct. 7, 2020, 16 pages.

Office Action received for Korean Patent Application No. 10-2020-7001340, dated Sep. 24, 2020, 19 pages (8 pages of English Translation and 11 pages of Official Copy).

Intention to Grant received for European Patent Application No. 15730925.3, dated May 28, 2020, 10 pages.

Minutes of Oral Proceedings received for European Patent Application No. 15730925.3, mailed on May 26, 2020, 11 pages.

Applicant Initiated Interview Summary received for U.S. Appl. No. 16/584,445, dated Mar. 17, 2020, 5 pages.

(56) References Cited

OTHER PUBLICATIONS

Applicant-Initiated Interview Summary received for U.S. Appl. No. 16/584,281, dated Mar. 9, 2020, 5 pages.
Applicant-Initiated Interview Summary received for U.S. Appl. No. 16/584,281, dated Sep. 14, 2020, 6 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,714, dated Apr. 16, 2020, 18 pages.
Non-Final Office Action received for U.S. Appl. No. 16/585,721, dated Dec. 27, 2019, 25 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated Oct. 21, 2020, 6 pages.
Notice of Allowance received for U.S. Appl. No. 16/585,714, dated Sep. 25, 2020, 15 pages.
Notice of Allowance received for U.S. Appl. No. 16/585,721, dated Sep. 30, 2020, 15 pages.
Office Action and Search Report received for Danish Patent Application No. PA201970598, dated Jan. 28, 2020, 6 pages.
Office Action received for Chinese Patent Application No. 201680013193.1, dated Sep. 7, 2020, 6 pages (3 pages of English Translation and 3 pages of Official Copy).
Office Action received for Chinese Patent Application No. 201910906898.1, dated Sep. 9, 2020, 8 pages (3 pages of English Translation and 5 pages of Official Copy).
Office Action received for Danish Patent Application No. PA201970596, dated May 6, 2020, 4 pages.
Office Action received for Danish Patent Application No. PA201970598, dated Oct. 9, 2020, 4 pages.
Office Action received for Danish Patent Application No. PA201970599, dated Jan. 23, 2020, 6 pages.
Office Action received for Japanese Patent Application No. 2020-074878, dated Sep. 7, 2020, 13 pages (7 pages of English Translation and 6 pages of Official Copy).
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.
Search Report and Opinion received for Danish Patent Application No. PA201970599, dated Nov. 8, 2019, 12 pages.
International Search Report and Written Opinion received for PCT Patent Application No. PCT/US2020/030079, dated Sep. 4, 2020, 18 pages.
Non-Final Office Action received for U.S. Appl. No. 15/405,122, dated Sep. 24, 2020, 30 pages.
Notice of Allowance received for U.S. Appl. No. 15/798,235, dated Sep. 22, 2020, 8 pages.
Applicant Initiated Interview Summary received for U.S. Appl. No. 16/389,722, dated Jul. 7, 2020, 5 pages.
Notice of Acceptance received for Australian Patent Application No. 2017277813, dated Jun. 16, 2020, 3 pages.
Notice of Allowance received for Japanese Patent Application No. 2019-096219, dated Jun. 26, 2020, 4 pages (1 page of English Translation and 3 pages of Official Copy).
Advisory Action received for U.S. Appl. No. 14/841,606, dated Feb. 28, 2019, 3 pages.
Advisory Action received for U.S. Appl. No. 14/815,898, dated Aug. 30, 2016, 3 pages.
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 15/421,865, dated Apr. 16, 2020, 7 pages.
Advisory Action received for U.S. Appl. No. 15/554,204, dated Mar. 12, 2020, 3 pages.
Adyclock—Night Alarm Clock, "App for android, Google play store page: https://web.archive.org/web/20130924223153/https://play.google.com/store/apps/details?id=com.adyclock&hl=en", Sep. 24, 2013, 2 pages.
Airshow, "Airshow App for Mobile Devices", 2012, 4 pages.
Andro Dollar, "Huawei Watch GT Always on Mode Update is finally here! LK", Online Available at: https://www.youtube.com/watch?v=AJw_FIAf7v4, Jun. 6, 2019, 4 pages.
Android Central, "Be Weather Weather app for Android", Available online at: https://www.youtube.com/watch?v=G2EY2K-XkSI, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen With WidgetLocker", Online Available at: http://appstap192.blogspot.com/2012/01/create-minimal-lock-screen-with.html, Jan. 18, 2012, 6 pages.
AOD too dim., "I've answered my own question to help others", Online Available at: https://forums.androidcentral.com/samsung-galaxy-s9-s9-plus/874444-aod-too-dim-ive-answered-my-own-question-help-others.html, Mar. 11, 2018, 3 pages.
APK Root, "Butterfly 3D Live Wallpaper 1.0 APK", Online Available at: http://net-suckga-ilauncher2.apk-dl.com/butterfly-3d-live-wallpaper, Feb. 26, 2013, 7 pages.
Applicant Initiated Interview Summary received for U.S. Appl. No. 14/846,511, dated Apr. 20, 2020, 4 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-Initiated Interview Summary received for U.S. Appl. No. 15/405,122, dated May 21, 2020, 5 pages.
Applicant-Initiated Interview Summary received for U.S. Appl. No. 15/421,865, dated Feb. 3, 2020, 5 pages.
Applicant-Initiated Interview Summary received for U.S. Appl. No. 15/554,204, dated Jan. 31, 2020, 3 pages.
Applicant-Initiated Interview Summary received for U.S. Appl. No. 15/554,204, dated Oct. 11, 2019, 5 pages.
Applicant-Initiated Interview Summary received for U.S. Appl. No. 15/798,235, dated Feb. 3, 2020, 3 pages.
Avdonin, Nikita, "Astroviewer 3D", Online Available at: https://www.youtube.comjwatch?v=zY0tslx3JHY/, Nov. 5, 2013, 2 pages.
Big Phil TV, "Gear S3 Watch faces with great always on display (A O D)", Online Available at: https://www.youtube.com/watch?v=2cxMnrMiGU8, Apr. 5, 2017, 3 pages.
Bogdanov, Alexei, "SKMEI 1016, XP054977588", Available online at: https://www.youtube.com/watch?v=E4q4Fug05Fw, Jun. 21, 2014, 2 pages (Official Copy only) {See Communication under 37 CFR § 1.98(a) (3)}.
Brief Communication regarding Oral Proceedings received for European Patent Application No. 15730925.3, mailed on Feb. 18, 2020, 7 pages.

(56) References Cited

OTHER PUBLICATIONS

Brief Communication regarding Oral Proceedings received for European Patent Application No. 17206177.2, mailed on Nov. 21, 2019, 5 pages.
"Brightness on lock screen", Online Available at: https://www.reddit.com/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Castellini, Rick, "Google Earth", Retrieved from: https://www.youtube.com/watch?v=bgjMSBXsFZQ, Feb. 12, 2013, 3 pages.
Cengic, Suad, "Samsung Gear S3—Display Always on! Cool!", Available online at: https://www.youtube.com/watch?v=ceeDinbPwOY, Mar. 10, 2017, 3 pages.
Clark, Josh, "Designing Great iPhone Apps", O'Reilly Japan Co., O'Reilly Tim, vol. 1, May 24, 2012, 5 pages (Official Copy only) {See Communication under 37 CFR § 1.98(a) (3)}.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/355,956, dated Jan. 3, 2020, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Cyr, Jim, "Apple Watch—Customize Modular Watch Face", Available online at: https://www.youtube.com/watch?v=02W93HbKIK8, May 13, 2015, 2 pages.
Dan, "Get This Look: 'Minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, dated Jul. 19, 2019, 18 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant Received for Danish Patent Application No. PA201770397, dated Feb. 6, 2018, 2 pages.
Decision to Refuse received for European Patent Application No. 15730924.6, dated Mar. 15, 2019, 12 pages.
"Deluxe Moon—Guide", Available online at: https://web.archive.org/web/20130520161057/http://www.lifewaresolutions.com/deluxe_moonguideip.html, May 20, 2013, 5 pages.
"Digital alarm clock app for Android, Goggle play store digital alarm clock description page", Mar. 25, 2015, 3 pages.
Droid Life, "How to: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to customize the clock face, Available online at: https://www.youtube.com/watch?v=evraMWFb1fY", Jul. 25, 2014, 1 page.
European Search Report received for European Patent Application No. 17206177.2, dated Apr. 30, 2018, 4 pages.
Evgenyevich, Sergey, "Earth & Moon in HD Gyro 3D", Online Available at: https://www.youtube.com/watch?v=IRwNcaSYrls/, Dec. 1, 2013, 2 pages.
Examiner's Answer to Appeal Brief received for U.S. Appl. No. 14/815,890, dated Mar. 20, 2020, 16 pages.
Extended European Search Report received for European Patent Application No. 16762356.0, dated Nov. 9, 2018, 10 pages.
Extended European Search Report received for European Patent Application No. 16837432.0, dated Mar. 11, 2019, 10 pages.
Extended European Search Report received for European Patent Application No. 17810723.1, dated Nov. 12, 2019, 9 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/841,606, dated Sep. 7, 2018, 34 pages.
Final Office Action received for U.S. Appl. No. 14/846,511 dated May 10, 2018, 21 pages.
Final Office Action received for U.S. Appl. No. 14/846,511, dated Jun. 5, 2019, 24 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/554,204, dated Oct. 31, 2019, 22 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 15/881,544, dated Jan. 29, 2019, 14 pages.
Final Office Action received for U.S. Appl. No. 16/582,020, dated Apr. 28, 2020, 31 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
"Fitbit surge Fitness Watch, Manual version 1.0", May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual, Sotec Co., Ltd., No. 1", Nov. 15, 2013, pp. 217-218.
Gazer, "iPhone 4S Super Manual", Shuwa System Co., Saito Kazukuni, vol. 1, Jun. 6, 2013, 7 pages (Official Copy only) {See Communication under 37 CFR § 1.98(a) (3)}.
Geary, David, "Programming HTML5 Canvas", O'Reilly Japan, Inc., No. 1, Jul. 23, 2014, pp. 327-330.
Geek, "How to Put the Day of the Week into the Windows Taskbar Clock", Available online at: https://www.howtogeek.com/194103/how-to-put-the-day-of-the-week-into-the-windows-taskbar-clock/, 2014, 3 pages.
"Google Earth 7.0.1.8244", Retrieved from the Internet: http://dl.google.com/dl/earth/client/ge7/release_7_0_1/googleearth-win-bundle-7.0.1.8244.exe, Oct. 29, 2012, 1 page.
Google Earth on Android—Android Central com., Available online at: https://www.youtube.com/watch?v=1WxN1RunrE4, Feb. 22, 2010, 1 page.

(56) References Cited

OTHER PUBLICATIONS

Gottabemobile, "How to Change Watch Faces on Android Wear", Available online at: https://www.youtube.com/watch?v=B8iRGkGq6a8, Jul. 9, 2014, 4 pages.
Intention to Grant received for Danish Patent Application No. PA201570496, dated Feb. 17, 2016, 6 pages.
Intention to Grant Received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant received for European Patent Application No. 15747595.5, dated Feb. 17, 2020, 8 pages.
Intention to Grant received for European Patent Application No. 17206177.2, dated Feb. 24, 2020, 8 pages.
International Preliminary Report on Patentability received for PCT Application No. PCT/US2016/037686, dated Mar. 1, 2018, 12 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2018/032164, dated Nov. 21, 2019, 11 pages.
International Search Report and Written Opinion received for PCT Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2018/032164, dated Oct. 18, 2018, 16 pages.
International Search Report and Written Opinion received for PCT Patent Application No. PCT/US2019/030770, dated Oct. 31, 2019, 23 pages.
International Search Report and Written Opinion received for PCT Patent Application No. PCT/US2015/034607, dated Dec. 1, 2015, 23 pages.
Internet Blog Post, "[PC] Pre-Customization of Black Desert's Characters", Online Available at: https://blog.naver.com/hsh6051/220209813968, Dec. 14, 2014, 41 pages (21 pages of English translation and 20 pages of Official Copy).
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional fees received for PCT Patent Application No. PCT/US2015/053353, dated Jan. 21, 2016, 7 pages.
Invitation to pay additional fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
Kenney, Briley, "How to Customize a Smartwatch and other Personalization Questions", Available online at: https://smartwatches.org/learn/customize-smartwatch/, Jan. 23, 2014, 3 pages.
Kidizoom Smartwatch, Available online at: https://www.vtechnl.com/media/downloads/Kidizoom-Smart-Watch.pdf, Jun. 24, 2014, 23 pages.
"Link to Wayback Machine with link to Google Play showing different layouts of complications associated with a clock face", Available Online at: https://play.google.com/store/apps/details?id=com.levelup.beautifulwidgets.free&hl=da, Sep. 9, 2013, 6 pages.
"Living Earth", Online Available at: http://www.livingcarthapp.com/, 2014, 6 pages.
"Looking for a launcher that changes the default homescreen or widgets based on wifi, location, or other context", Online Available at: https://www.reddit.com/r/androidapps/comments/35lu90/looking_for_a_launcher_that_changes_the_default/, 2015, 2 pages.
Minutes of Oral Proceedings received for European Patent Application No. 15730924.6, mailed on Mar. 13, 2019, 4 pages.
MS Excel 2013, Jan. 29, 2013, 2 pages.

(56) References Cited

OTHER PUBLICATIONS

Nerdtalk, "The Best Android Clock Widgets", Online Available at: https://www.youtube.com/watch?v=E1bAprWByfU, Apr. 25, 2011, 1 page.
"New, but unsigned—Easy Stop Watch for Symbian, XP55393563", Available online at: http://www.allaboutsymbian.com/flow/item/19490_New_but_unsigned-Easy_StopWatc.php, Mar. 15, 2014, 15 pages.
"Night Display (Alarm Clock) App, Google Play Store Night Display (Alarm Clock) Description page", Online Available at: https://web.archive.org/web/20141007124222/https://play.google.com/store/apps/details?id=com.srk.nighttimedisplay&hl=en, Oct. 7, 2014, pp. 1-3.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 15/881,544, dated Jun. 7, 2018, 15 pages.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.
Non-Final Office Action received for U.S. Appl. No. 15/183,663, dated Jul. 9, 2018, 13 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 15/421,865, dated Mar. 21, 2019, 18 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 16/389,722, dated Apr. 3, 2020, 15 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Non-Final Office Action received for U.S. Appl. No. 14/846,511, dated Nov. 30, 2018, 22 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.
Notice of Acceptance received for Australian Patent Application No. 2018279037, dated May 13, 2020, 3 pages.
Notice of Allowance received for Chinese Patent Application No. 201510481525.6, dated May 27, 2019, 2 pages (1 page of English Translation and 1 page of Official Copy).
Notice of Allowance received for Chinese Patent Application No. 201510483268.X, dated Nov. 6, 2019, 2 pages (1 page of English translation and 1 page of Official Copy).
Notice of Allowance received for Chinese Patent Application No. 201510483305.7, dated Jan. 8, 2019, 3 pages (1 page of English Translation and 2 pages of Official Copy).
Notice of Allowance received for Chinese Patent Application No. 201510484514.3, dated Jun. 6, 2019, 2 pages (1 page of English Translation and 1 page of Official Copy).
Notice of Allowance received for Chinese Patent Application No. 201520594249.X, dated Jul. 12, 2016, 4 pages (2 pages of English Translation and 2 pages of Official Copy).
Notice of Allowance received for Chinese Patent Application No. 201810037665.8, dated Jul. 9, 2019, 4 pages (1 page of English Translation and 3 pages of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Japanese Patent Application No. 2017-505450, dated Mar. 9, 2018, 10 pages (7 pages of English Translation and 3 pages of Official Copy).
Notice of Allowance received for Japanese Patent Application No. 2017-505842, dated Mar. 16, 2020, 4 pages (1 page of English Translation and 3 pages of Official Copy).
Notice of Allowance received for Japanese Patent Application No. 2017-505847, dated May 20, 2019, 4 pages (1 page of English Translation and 3 pages of Official Copy).
Notice of Allowance received for Japanese Patent Application No. 2017-545918, dated Jul. 22, 2019, 4 pages (1 page of English Translation and 3 pages of Official Copy).
Notice of Allowance received for Japanese Patent Application No. 2018-074971, dated Apr. 23, 2019, 4 pages (1 page of English Translation and 3 pages of Official Copy).
Notice of Allowance received for Japanese Patent Application No. 2018-537840, dated Mar. 19, 2020, 4 pages (1 page of English Translation and 3 pages of Official Copy).
Notice of Allowance received for Korean Patent Application No. 10-2017-7005939, dated Mar. 30, 2018, 5 pages (2 pages of English Translation and 3 pages of Official Copy).
Notice of Allowance received for Korean Patent Application No. 10-2018-7022101, dated Oct. 14, 2019, 4 pages (1 page of English Translation and 3 pages of Official Copy).
Notice of Allowance received for Taiwanese Patent Application No. 104124962, dated Jul. 27, 2017, 3 pages (Official Copy only) {See Communication under 37 CFR § 1.98(a) (3)}.
Notice of Allowance received for Taiwanese Patent Application No. 104124963, dated Sep. 28, 2017, 5 pages (1 page of English Translation of Search report and 4 pages of Official Copy).
Notice of Allowance received for Taiwanese Patent Application No. 104124995, dated Jul. 27, 2017, 3 pages (Official Copy only) {See Communication under 37 CFR § 1.98(a) (3)}.
Notice of Allowance received for Taiwanese Patent Application No. 104124997, dated Jun. 16, 2017, 5 pages (1 page of English Translation of Search report and 4 pages of Official Copy).
Notice of Allowance received for Taiwanese Patent Application No. 104124998, dated Mar. 31, 2017, 3 pages (Official copy only) {See Communication under 37 CFR § 1.98(a) (3)}.
Notice of Allowance received for Taiwanese Patent Application No. 104134740, dated Dec. 8, 2016, 5 pages (1 page of English Translation of Search Report and 4 pages of Official Copy).
Notice of Allowance received for U.S. Appl. No. 14/815,879, dated Jun. 26, 2017, 8 pages.

(56) References Cited

OTHER PUBLICATIONS

Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/839,889, dated Oct. 30, 2017, 16 pages.
Notice of Allowance received for U.S. Appl. No. 15/183,663, dated Jan. 17, 2019, 6 pages.
Notice of Allowance received for U.S. Appl. No. 15/355,956, dated Nov. 22, 2019, 29 pages.
Notice of Allowance received for U.S. Appl. No. 15/798,235, dated Apr. 1, 2020, 8 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 16/585,366, dated Jan. 2, 2020, 6 pages.
"Nova Launcher—Lock Screen Edit", Online Available at: https://forums.androidcentral.com/ask-question/835057-nova-launcher-lock-screen-edit.html, Sep. 2017, 2 pages.
Nova, "Tour of the Solar System", Retrieved from: http://www.pbs.org/wgbh/nova/space/tour-solar-system.html, May 24, 2013, 14 pages.
Obara, Yuuta, "iPhone Application Selection for Univesity Students", Shuwa System Co., Saito Kazukuni, vol. 1, May 16, 2013, 4 pages (Official Copy only) {See Communication under 37 CFR § 1.98(a) (3)}.
Octoba, "Just Install It—Utilizing Method for Android Application Business", ASCII Media Works Co. Takano Kiyoshi, vol. 1, Apr. 25, 2013, 6 pages (Official Copy only) {See Communication under 37 CFR § 1.98(a) (3)}.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2018201089, dated Oct. 11, 2019, 4 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2019208225, dated Mar. 20, 2020, 3 pages.
Office Action received for Australian Patent Application No. 2015101019, dated Feb. 12, 2016, 4 pages.
Office Action received for Chinese Patent Application No. 201510479088.4, dated Mar. 12, 2018, 20 pages (6 pages of English Translation and 14 pages of Official Copy).
Office Action received for Chinese Patent Application No. 201510479088.4, dated May 7, 2019, 6 pages (3 pages of English Translation and 3 pages of Official Copy).
Office Action received for Chinese Patent Application No. 201510481525.6, dated Aug. 29, 2018, 10 pages (5 pages of English Translation and 5 pages of Official copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Apr. 16, 2019, 6 pages (3 pages of English Translation and 3 pages of Official Copy).
Office Action received for Chinese Patent Application No. 201510483268.X, dated Dec. 1, 2017, 11 pages (5 pages of English Translation and 6 pages of Official Copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).
Office action received for Chinese Patent Application No. 201510483305.7, dated Dec. 1, 2017, 13 pages (5 pages of English Translation and 8 pages of Official Copy).
Office Action received for Chinese Patent Application No. 201510484514.3, dated Apr. 4, 2018, 12 pages (5 pages of English Translation and 7 pages of Official Copy).
Office Action received for Chinese Patent Application No. 201510484514.3, dated Dec. 24, 2018, 13 pages (6 pages of English Translation and 7 pages of Official Copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595384.6, dated Dec. 30, 2016, 2 pages (Official Copy only) {See Communication under 37 CFR § 1.98(a) (3)}.
Office Action received for Chinese Patent Application No. 201520595384.6, dated Jul. 22, 2016, 3 pages (1 page of English Translation and 2 pages of Official Copy).
Office Action received for Chinese Patent Application No. 201520595384.6, dated Mar. 25, 2016, 3 pages (1 page of English Translation and 2 pages of Official copy).ss

(56) References Cited

OTHER PUBLICATIONS

Office Action received for Chinese Patent Application No. 201510479088.4, dated Apr. 22, 2020, 7 pages (3 pages of English Translation and 4 pages of Official Copy).
Office Action received for Chinese Patent Application No. 201520595385.0, dated Dec. 30, 2016, 2 pages (Official Copy only) {See Communication under 37 CFR § 1.98(a) (3)}.
Office Action received for Chinese Patent Application No. 201520595385.0, dated Jul. 22, 2016, 3 pages (1 page of English Translation and 2 pages of Official Copy).
Office Action received for Chinese Patent Application No. 201520595385.0, dated Mar. 25, 2016, 3 pages (1 page of English Translation and 2 pages of Official copy).
Office Action Received for Chinese Patent Application No. 201520595408.8, dated Dec. 9, 2015, 4 pages (2 pages of English Translation and 2 pages of Official Copy).
Office Action Received for Chinese Patent Application No. 201520595408.8, dated Dec. 30, 2016, 2 pages (Official Copy Only) {See Communication under 37 CFR § 1.98(a) (3)}.
Office Action received for Chinese Patent Application No. 201520595408.8, dated Jul. 25, 2016, 3 pages (1 page of English Translation and 2 pages of Official Copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Dec. 30, 2016, 2 pages (Official Copy only) {See Communication under 37 CFR § 1.98(a) (3)}.
Office Action received for Chinese Patent Application No. 201520595538.1, dated Jul. 22, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Office Action received for Chinese Patent Application No. 201680013193.1, dated Mar. 25, 2020, 21 pages (8 pages of English Translation and 13 pages of Official Copy).
Office Action received for Chinese Patent Application No. 201680047983.1, dated Mar. 18, 2019, 18 pages (6 pages of English Translation and 12 pages of Official Copy).
Office Action received for Chinese Patent Application No. 201680047983.1, dated Nov. 28, 2019, 9 pages (4 pages of English Translation and 5 pages of Official Copy).
Office Action received for Chinese Patent Application No. 201810037665.8, dated Dec. 7, 2018, 10 pages (5 pages of English Translation and 5 pages of Official Copy).
Office Action Received for Chinese Patent Application No. 201520594249.X, dated Dec. 9, 2015, 4 pages (2 pages of English Translation and 2 pages of Official Copy).
Office Action Received for Chinese Patent Application No. 201520595384.6, dated Dec. 9, 2015, 4 pages. (2 pages of English Translation and 2 pages of Official Copy).
Office Action Received for Chinese Patent Application No. 201520595385.0, dated Dec. 9, 2015, 4 pages (2 pages of English Translation and 2 pages of Official Copy).
Office Action Received for Chinese Patent Application No. 201520595538.1, dated Dec. 9, 2015, 4 pages (2 pages of English Translation and 2 pages of Official Copy).
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570499, dated Nov. 1, 2017, 6 pages.
Office Action received for Danish Patent Application No. PA201570499, dated Nov. 3, 2015, 7 pages.
Office Action Received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15730924.6, dated Dec. 12, 2017, 8 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 16837432.0, dated Jan. 10, 2020, 7 pages.
Office Action received for European Patent Application No. 17206177.2, dated May 15, 2018, 6 pages.
Office Action received for European Patent Application No. 15730925.3, dated Feb. 27, 2019, 5 pages.
Office Action received for German Patent Application No. 112015003083.2, dated Mar. 9, 2018, 12 pages (5 pages of English Translation and 7 pages of Official Copy).
Office Action received for Japanese Patent Application No. 2017-505450, dated Jun. 20, 2017, 8 pages (4 pages of English Translation and 4 pages of Official Copy).
Office Action received for Japanese Patent Application No. 2017-505842, dated Feb. 22, 2019, 11 pages (6 pages of English Translation and 5 pages of Official Copy).
Office Action received for Japanese Patent Application No. 2017-505842, dated Sep. 9, 2019, 7 pages (3 pages of English Translation and 4 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2018-074971, dated Jan. 28, 2019, 6 pages (3 pages of English Translation and 3 pages of Official Copy).

(56) References Cited

OTHER PUBLICATIONS

Office Action received for Japanese Patent Application No. 2018-537840, dated Jul. 8, 2019, 15 pages (8 pages of English Translation and 7 pages of Official copy).
Office Action received for Korean Patent Application No. 10-2017-7005939, dated Jun. 30, 2017, 6 pages (2 pages of English Translation and 4 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7024570, dated Sep. 28, 2018, 14 pages (6 pages of English Translation and 8 pages of Official copy).
Office Action received for Korean Patent Application No. 10-2018-7018904, dated Aug. 20, 2019, 8 pages (3 pages of English Translation and 5 pages of Official Copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2018-7022101, dated Jul. 9, 2019, 10 pages (5 pages of English Translation and 5 pages of Official Copy).
Office Action received for Korean Patent Application No. 10-2019-7029673, dated Nov. 5, 2019, 10 pages (4 pages of English Translation and 6 pages of Official Copy).
Office Action received for Netherland Patent Application No. 2015245, dated Jan. 24, 2017, 11 pages (1 page of English Translation and 10 pages of Official Copy).
Office Action received for Netherlands Patent Application No. 2015239, dated Oct. 28, 2016, 13 pages (5 pages of English Translation and 8 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104124998, dated Nov. 29, 2016, 6 pages (3 pages of English Translation and 3 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104126627, dated Aug. 30, 2018, 22 pages (9 pages of English Translation and 13 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104126627, dated Oct. 16, 2017, 7 pages (3 pages of English Translation and 4 pages of Official Copy).
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official Copy).
Omar Romero, "Sony Smartwatch 2 Custom Watch faces Tutorial", Retrieved From: https://www.youtube.com/watch?v=8odbxqwSQR8, May 1, 2014, 2 pages.
"Online Alarm Clock", Online Available at: https://web.archive.org/web/20150505081746/http://www.online-stopwatch.com/online-alarm-clock, May 5, 2015, 2 pages.
"Pentax K20D Operating Manual", Online Available at: http://www.ricoh-imaging.eu/en/operating-manuals-download.html, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Pre-Interview First Office Action received for U.S. Appl. No. 14/815,890, dated May 26, 2016, 4 pages.
Rehman, A., "Install Android 4.2 Gesture-Based Keyboard & Clock App on Jelly Bean 4.1 or Higher", Excerpts From, Available online at: http://www.addictivetips.com/android/install-android-4-2-keyboard-clock-app-apk-on-jelly-bean-4-1-x/, Nov. 3, 2012, 4 pages.
Restriction Requirement received for U.S. Appl. No. 14/815,890, dated Feb. 22, 2016, 5 pages.
Reuse Animations—Synfig Animation Studio, Available online at: https://wiki.synfig.org/index.php?title=Doc:Reuse_Animations&oldid=18173, May 20, 2013, 5 pages.
Search Report and Opinion Received for Netherland Patent Application No. 2015232, dated Jan. 25, 2017, 9 pages (1 page of English Translation and 8 pages of Official Copy).sss.
Search Report and Opinion received for Netherlands Patent Application No. 2015242, dated Jul. 4, 2017s, 20 pages (10 pages of English Translation of Search Opinion and 10 pages of official copy).
Search Report and Opinion received for Netherlands Patent Application No. 2018531, dated Jul. 27, 2017, 14 pages (6 pages of English Translation and 8 pages of Official Copy).
Search Report received for Danish Patent Application No. 201570768, dated Mar. 17, 2016, 11 pages.
Shiota, Shinji, "Windows 7 Dojo", Weekly ASCII, Ascii Mediaworks Inc., vol. 798, Aug. 31, 2010, 3 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
Sony, "Live View™ micro display", Extended User Guide, Aug. 2010, 27 pages.
Sony, "Sony SmartWatch", User Guide, Dec. 2011, 18 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 17206177.2, mailed on Jun. 3, 2019, 8 pages.
Sun Set, "Sun Set solar image clock", Available at: https://web.archive.orgjweb/20140719005410/http://www.sunsetclock.com/, 2013, 5 pages.
Talkandroid, "Android Wear walkthrough", Available online at: https://www.youtube.com/watch?v=4xntpZac4sw, Jun. 30, 2014, 1 page.
"The Simply Alarm app for Pebble", Available online at: https://web.archive.org/web/20150517070400>/http://www.rebootsramblings.ca/n/sahhelp/https://www.youtube.com/watch?v=IVp1scQPw08, May 17, 2015, 1 page.
"Tropical Fish 14", Available online at: https://www.turbosquid.com/3d-models/tropical-fish-3d-model/388510, Feb. 4, 2008, 2 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
"UIKit User Interface Catalog: Page Controls", Available Online at: https://web.archive.org/web/20140703123442/https://developer.apple.com/library/ios/documentation/userexperience/conceptual/UIKitUICatalog/UIPageControl.html, Dec. 16, 2013, 4 pages.
Viticci, Frederico, "Checking Time Zones with Living Earth—MacStories", Available at: https://www.macstories.net/reviews/checking-time-zones-with-living-earth/, Dec. 11, 2013, pp. 1-5.

(56) References Cited

OTHER PUBLICATIONS

Wade, Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ? ", Online Available at: https://forums.watchuseek.com/f2/watch-every-father-needs-m-i-c-k-e-y-m-o-u-s-e-mickey-mouse-855069.html, 2013, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Xperia ZL2 SOL25, "Instruction Manual", Detailed version, KDDI Corporation, No. 1, vol. 1, Jun. 2014, 4 pages.
Zephyrnix, "Steam's In-Game Home menu", Online Available at: https://www.youtube.com/watch?v=jLoRFiPkcUw, see 0;00-1;06., Feb. 15, 2011, 3 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Advisory Action received for U.S. Appl. No. 16/582,020, dated Aug. 3, 2020, 4 pages.
European Search Report received for European Patent Application No. 20172197.4, dated Jul. 28, 2020, 4 pages.
Office Action received for Australian Patent Application No. 2018201089, dated Jul. 23, 2020, 4 pages.
Office Action received for Chinese Patent Application No. 201680047983.1, dated Jul. 1, 2020, 6 pages (3 pages of English Translation and 3 pages of Official Copy).
International Search Report and Written Opinion received for PCT Patent Application No. PCT/US2020/031575, dated Aug. 20, 2020, 14 pages.
Office Action received for Korean Patent Application No. 10-2019-7029673, dated Sep. 3, 2020, 9 pages (4 pages of English Translation and 5 pages of Official Copy).
Phlam, Dev, "Clockwork Tomato Presentation", Retrieved from the Internet: URL: https://www.youtube.com/watch?v=2IQDx9REn0E, Apr. 29, 2016, 6 pages.
Supplemental Notice of Allowance received for U.S. Appl. No. 16/585,399, dated Aug. 26, 2020, 2 pages.
Applicant Initiated Interview Summary received for U.S. Appl. No. 16/582,020, dated Jul. 14, 2020, 5 pages.
Decision to Grant received for Danish Patent Application No. PA201770791, dated Jul. 7, 2020, 2 pages.
Decision to Grant received for European Patent Application No. 15747595.5, dated Jul. 16, 2020, 2 pages.
Notice of Allowance received for Korean Patent Application No. 10-2018-7018904, dated Jun. 26, 2020, 4 pages (1 page of English Translation and 3 pages of Official copy).
Notice of Allowance received for U.S. Appl. No. 15/554,204, dated Jul. 13, 2020, 10 pages.
Notice of Allowance received for U.S. Appl. No. 16/585,399, dated Jul. 21, 2020, 9 pages.
Extended European Search Report received for European Patent Application No. 20185974.1, dated Oct. 28, 2020, 7 pages.
Notice of Allowance received for U.S. Appl. No. 16/585,721, dated Oct. 30, 2020, 9 pages.
Office Action received for Danish Patent Application No. PA201970597, dated Oct. 29, 2020, 4 pages.
Office Action received for Japanese Patent Application No. 2019-151358, dated Oct. 2, 2020, 5 pages (2 pages of English Translation and 3 pages of Official Copy).
Decision to Grant received for European Patent Application No. 17206177.2, dated Aug. 6, 2020, 2 pages.
Final Office Action received for U.S. Appl. No. 14/846,511, dated Aug. 11, 2020, 25 pages.
Invitation to Pay Additional Fees received for PCT Patent Application No. PCT/US2020/030079, dated Jul. 14, 2020, 12 pages.
Corrected Notice of Allowance received for U.S. Appl. No. 15/554,204, dated Aug. 19, 2020, 3 pages.
Office Action received for European Patent Application No. 20172197.4, dated Aug. 5, 2020, 6 pages.
Applicant-Initiated Interview Summary received for U.S. Appl. No. 16/418,786, dated Mar. 30, 2021, 4 pages.
Final Office Action received for U.S. Appl. No. 15/421,865, dated Mar. 19, 2021, 20 pages.
Final Office Action received for U.S. Appl. No. 16/997,588, dated Mar. 30, 2021, 23 pages.
Notice of Allowance received for Korean Patent Application No. 10-2021-7002597, dated Feb. 25, 2021, 5 pages (1 page of English Translation and 4 pages of Official Copy).
Office Action received for Chinese Patent Application No. 201680013193.1, dated Feb. 1, 2021, 8 pages (3 pages of English Translation and 5 pages of Official Copy).
Applicant-Initiated Interview Summary received for U.S. Appl. No. 16/401,934, dated Feb. 23, 2021, 8 pages.
Notice of Allowance received for U.S. Appl. No. 14/815,890, dated Feb. 12, 2021, 8 pages.
Notice of Allowance received for U.S. Appl. No. 16/659,507, dated Feb. 24, 2021, 7 pages.
Office Action received for Chinese Patent Application No. 201680047983.1, dated Feb. 1, 2021, 6 pages (3 pages of English Translation and 3 pages of Official Copy).
Applicant-Initiated Interview Summary received for U.S. Appl. No. 16/659,507, dated Nov. 17, 2020, 3 pages.
Decision on Appeal received for U.S. Appl. No. 14/815,890, dated Nov. 24, 2020, 13 pages.
International Preliminary Report on Patentability received for PCT Patent Application No. PCT/US2019/030770, dated Nov. 19, 2020, 14 pages.
International Search Report and Written Opinion received for PCT Patent Application No. PCT/US2020/031536, dated Sep. 23, 2020, 16 pages.
Invitation to Pay Additional Fees received for PCT Patent Application No. PCT/US2020/031536, dated Jul. 31, 2020, 9 pages.
Invitation to Pay Additional Fees received for PCT Patent Application No. PCT/US2020/045814, dated Nov. 18, 2020, 11 pages.
Notice of Allowance received for U.S. Appl. No. 16/584,281, dated Nov. 18, 2020, 8 pages.
Record of Oral Hearing received for U.S. Appl. No. 14/815,890, mailed on Nov. 20, 2020, 18 pages.
Result of Consultation received for European Patent Application No. 15730925.3, dated Nov. 24, 2020, 4 pages.
Applicant-Initiated Interview Summary received for U.S. Appl. No. 15/405,122, dated Dec. 22, 2020, 5 pages.
Office Action received for Danish Patent Application No. PA202070609, dated Dec. 10, 2020, 8 pages.
Office Action received for Korean Patent Application No. 10-2020-7026036, dated Dec. 7, 2020, 8 pages (3 pages of English Translation and 5 pages of Official Copy).
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 1 page.
Vids Tube, "Bitmoji Clockface on Fitbit Versa Sense/Versa 3/Versa 2", Available online at: https://www.youtube.com/watch?v=4V_xDnSLeHE, Jun. 30, 2019, 1 page.
Woolsey, Amanda, "How to Customize the Clock on the Apple Watch", Available online at: <https://www.youtube.com/watch?v=t-3Bckdd9B4>, Apr. 25, 2015, 1 page.

(56) References Cited

OTHER PUBLICATIONS

Applicant Initiated Interview Summary received for U.S. Appl. No. 16/389,722, dated Feb. 11, 2021, 4 pages.
Applicant-Initiated Interview Summary received for U.S. Appl. No. 16/997,588, dated Jan. 29, 2021, 3 pages.
Notice of Acceptance received for Australian Patent Application No. 2019208225, dated Jan. 21, 2021, 3 pages.
Notice of Allowance received for Chinese Patent Application No. 201510479088.4, dated Jan. 21, 2021, 2 pages (1 page of English Translation and 1 page of Official Copy).
Notice of Allowance received for Japanese Patent Application No. 2019-151358, dated Jan. 22, 2021, 4 pages (1 page of English Translation and 3 pages of Official Copy).
Office Action received for Australian Patent Application No. 2020309093, dated Jan. 21, 2021, 3 pages.
Office Action received for Chinese Patent Application No. 201780033973.7, dated Jan. 22, 2021, 27 pages (11 pages of English Translation and 16 pages of Official Copy).
Office Action received for European Patent Application No. 16837432.0, dated Jan. 27, 2021, 7 pages.
Feist Jonathan, "Android customization—How to create a custom clock widget using zooper widget", Android Authority, Available Online at: https://www.androidauthority.com/zooper-widget-clock-366476/, May 15, 2014, pp. 1-13.
Applicant-Initiated Interview Summary received for U.S. Appl. No. 15/421,865, dated Dec. 15, 2020, 6 pages.
Final Office Action received for U.S. Appl. No. 16/389,722, dated Dec. 8, 2020, 18 pages.
Intention to Grant Received for Danish Patent Application No. PA201970596, dated Dec. 1, 2020, 2 pages.
Non-Final Office Action received for U.S. Appl. No. 16/401,934, dated Dec. 11, 2020, 26 pages.
Non-Final Office Action received for U.S. Appl. No. 16/997,588, dated Dec. 14, 2020, 21 pages.
Office Action received for Australian Patent Application No. 2020102158, dated Dec. 8, 2020, 9 pages.
Office Action received for Australian Patent Application No. 2020204506, dated Dec. 7, 2020, 6 pages.
Office Action received for European Patent Application No. 16762356.0, dated Dec. 11, 2020, 7 pages.
Advisory Action received for U.S. Appl. No. 16/389,722, dated Mar. 9, 2021, 5 pages.
Decision to Grant received for Danish Patent Application No. PA201970596, dated Feb. 26, 2021, 2 pages.
Office Action received for Australian Patent Application No. 2020239670, dated Mar. 3, 2021, 4 pages.
Office Action received for Danish Patent Application No. PA201970599, dated Mar. 1, 2021, 4 pages.
Supplemental Notice of Allowance received for U.S. Appl. No. 14/815,890, dated Mar. 10, 2021, 2 pages.
Baar, Marius, "Fitbit Ace—Unboxing, Setup and 24 Hour Test", YouTube [online] [video], Retrieved from: <https://youtu.be/ekvkfqOyrls>, See especially 4:44, Oct. 24, 2018, 3 pages.
Final Office Action received for U.S. Appl. No. 16/418,786, dated Jan. 13, 2021, 14 pages.
Intention to Grant received for Danish Patent Application No. PA202070609, dated Jan. 14, 2021, 2 pages.
International Search Report and Written Opinion received for PCT Patent Application No. PCT/US2020/045814, dated Jan. 20, 2021, 16 pages.
My Mate Vince, "Setting up the Fitbit Alta HR Activity Tracker on Apple iOS", Online available at: <https://youtu.be/FdwRF4IfvFc>, Jun. 18, 2017, 3 pages.
Notice of Allowance received for U.S. Appl. No. 16/585,714, dated Jan. 8, 2021, 8 pages.
Notice of Allowance received for U.S. Appl. No. 16/585,714, dated Jan. 27, 2021, 2 pages.
Office Action received for Australian Patent Application No. 2019208225, dated Dec. 21, 2020, 3 pages.
Search Report and Opinion received for Danish Patent Application No. PA202070610, dated Jan. 8, 2021, 9 pages.
Wearablezone, "How to Set Up Your Fitbit Profile", Online available at: <https://youtu.be/jsWPtcDWiJM>, Jun. 6, 2016, 3 pages.
Xdream, "TickTalk Video User Manual", YouTube [online] [video], Online available at: <https://youtu.be/jYhq3DwmVzo>, Mar. 17, 2017, 3 pages.
Applicant-Initiated Interview Summary received for U.S. Appl. No. 16/935,002, dated Sep. 21, 2021, 4 pages.
Applicant-Initiated Interview Summary received for U.S. Appl. No. 17/068,386, dated Sep. 21, 2021, 2 pages.
Applicant Initiated Interview Summary received for U.S. Appl. No. 16/582,020, dated Jul. 9, 2021, 4 pages.
Applicant Initiated Interview Summary received for U.S. Appl. No. 17/031,671, dated Aug. 2, 2021, 5 pages.
Applicant-Initiated Interview Summary received for U.S. Appl. No. 15/405,122, dated Jul. 7, 2021, 4 pages.
Applicant-Initiated Interview Summary received for U.S. Appl. No. 15/421,865, dated Jun. 30, 2021, 6 pages.
Applicant-Initiated Interview Summary received for U.S. Appl. No. 16/389,722, dated Sep. 7, 2021, 4 pages.
Applicant-Initiated Interview Summary received for U.S. Appl. No. 16/943,737, dated Sep. 7, 2021, 4 pages.
Applicant-Initiated Interview Summary received for U.S. Appl. No. 16/997,588, dated May 12, 2021, 2 pages.
Applicant-Initiated Interview Summary received for U.S. Appl. No. 17/031,654, dated Feb. 1, 2021, 2 pages.
Applicant-Initiated Interview Summary received for U.S. Appl. No. 17/041,350, dated Aug. 18, 2021, 2 pages.
Certificate of Examination received for Australian Patent Application No. 2020102158, dated Jun. 8, 2021, 2 pages.
Corrected Notice of Allowance received for U.S. Appl. No. 16/582,020, dated Aug. 11, 2021, 2 pages.
Decision on Acceptance received for Australian Patent Application No. 2018201089, dated Apr. 20, 2021, 28 pages.
Decision to Grant received for Danish Patent Application No. PA201970597, dated Aug. 19, 2021, 2 pages.
Decision to Grant received for Danish Patent Application No. PA202070609, dated May 3, 2021, 2 pages.
Examiner's Answer to Appeal Brief received for U.S. Appl. No. 14/846,511, dated Jun. 14, 2021, 15 pages.
Final Office Action received for U.S. Appl. No. 16/401,934, dated Jun. 14, 2021, 30 pages.
Final Office Action received for U.S. Appl. No. 17/031,671, dated Sep. 7, 2021, 27 pages.
Final Office Action received for U.S. Appl. No. 17/041,350, dated Sep. 17, 2021, 25 pages.
Intention to Grant received for Danish Patent Application No. PA201970597, dated Apr. 20, 2021, 2 pages.
Intention to Grant received for European Patent No. 15730925.3, dated Aug. 16, 2021, 10 pages.
Invitation to Pay Additional Fees received for PCT Patent Application No. PCT/US2021/031212, dated Jul. 28, 2021, 19 pages.
Jean, "Our Pact Parental Control Review", Available online at: https://www.bewebsmart.com/parental-controls/our-pact-parental-control-review/, Jun. 25, 2016, 25 pages.
Non-Final Office Action received for U.S. Appl. No. 16/389,722, dated Jun. 3, 2021, 17 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Non-Final Office Action received for U.S. Appl. No. 17/041,350, dated Jun. 10, 2021, 24 pages.
Non-Final Office Action received for U.S. Appl. No. 17/068,386, dated Jul. 15, 2021, 16 pages.

(56) References Cited

OTHER PUBLICATIONS

Notice of Acceptance received for Australian Patent Application No. 2018201089, dated May 28, 2021, 3 pages.
Notice of Acceptance received for Australian Patent Application No. 2020204506, dated Apr. 8, 2021, 3 pages.
Notice of Acceptance received for Australian Patent Application No. 2020239670, dated Jul. 2, 2021, 3 pages.
Notice of Acceptance received for Australian Patent Application No. 2020309093, dated Jul. 8, 2021, 3 pages.
Notice of Acceptance received for Australian Patent Application No. 2021202834, dated Jul. 15, 2021, 3 pages.
Notice of Acceptance received for Australian Patent Application No. 2021202836, dated Jun. 25, 2021, 3 pages.
Notice of Allowance received for Chinese Patent Application No. 201680013193.1, dated May 7, 2021, 5 pages (1 page of English Translation and 4 pages of Official Copy).
Notice of Allowance received for Chinese Patent Application No. 201680047983.1, dated Apr. 28, 2021, 3 pages (1 page of English Translation and 2 pages of Official Copy).
Notice of Allowance received for Chinese Patent Application No. 201780033973.7, dated Jul. 7, 2021, 5 pages (1 page of English Translation and 4 pages of Official Copy).
Notice of Allowance received for Japanese Patent Application No. 2020-074878, dated May 28, 2021, 4 pages (1 page of English Translation and 3 pages of Official Copy).
Notice of Allowance received for Japanese Patent Application No. 2020-551465, dated Jun. 28, 2021, 4 pages (1 page of English Translation and 3 pages of Official Copy).
Notice of Allowance received for Korean Patent Application No. 10-2019-7029673, dated Aug. 3, 2021, 3 pages (1 page of English Translation and 2 pages of Official Copy).
Notice of Allowance received for Korean Patent Application No. 10-2020-7001340, dated May 10, 2021, 5 pages (2 pages of English Translation and 3 pages of Official Copy).
Notice of Allowance received for Korean Patent Application No. 10-2020-7026036, dated Jul. 26, 2021, 4 pages (1 page of English Translation and 3 pages of Official Copy).
Notice of Allowance received for Korean Patent Application No. 10-2021-7013453, dated Aug. 11, 2021, 5 pages (2 pages of English Translation and 3 pages of Official Copy).
Notice of Allowance received for Korean Patent Application No. 10-2021-7013454, dated Aug. 12, 2021, 4 pages (1 page of English Translation and 3 pages of Official Copy).
Notice of Allowance received for U.S. Appl. No. 16/582,020, dated Jul. 27, 2021, 29 pages.
Notice of Allowance received for U.S. Appl. No. 17/031,654, dated Aug. 20, 2021, 12 pages.
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Australian Patent Application No. 2019267413, dated Jun. 29, 2021, 3 pages.
Office Action received for Australian Patent Application No. 2020102158, dated Apr. 27, 2021, 5 pages.
Office Action received for Australian Patent Application No. 2020239749, dated Jul. 16, 2021, 5 pages.
Office Action received for Australian Patent Application No. 2020239774, dated Jun. 28, 2021, 8 pages.
Office Action received for Australian Patent Application No. 2021202834, dated May 28, 2021, 2 pages.
Office Action received for Chinese Patent Application No. 201910906898.1, dated Jun. 23, 2021, 6 pages (3 pages of English Translation and 3 pages of Official Copy).
Office Action received for Danish Patent Application No. PA201970598, dated Apr. 15, 2021, 6 pages.
Office Action received for Danish Patent Application No. PA202070610, dated Jun. 18, 2021, 8 pages.
Office Action received for Danish Patent Application No. PA202070623, dated Aug. 24, 2021, 3 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for European Patent Application No. 17810723.1, dated Jul. 9, 2021, 8 pages.
Office Action received for European Patent Application No. 20172197.4, dated Jul. 8, 2021, 5 pages.
Office Action received for Korean Patent Application No. 10-2019-7029673, dated Apr. 8, 2021, 7 pages (3 pages of English Translation and 4 pages of Official Copy).
Office Action received for Korean Patent Application No. 10-2020-7028759, dated Jun. 29, 2021, 12 pages (5 pages of English Translation and 7 pages of Official Copy).
Office Action received for Korean Patent Application No. 10-2021-7013453, dated Jun. 5, 2021, 6 pages (2 pages of English Translation and 4 pages of Official Copy).
Office Action received for Korean Patent Application No. 10-2021-7013454, dated Jun. 5, 2021, 6 pages (2 pages of English Translation and 4 pages of Official Copy).
Phonebuff, "Hybrid Stopwatch & Timer Android App Review", Available Online at: https://www.youtube.com/watch?v=B43oCFPiWvY, Apr. 4, 2012, 7 pages.
Rosa et al., "Stripe Generator—a Free Tool for the Web Design Community", Available online at: http://www.stripegenerator.com/, Mar. 28, 2019, 2 pages.
Rowinski Dan, "Why the All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Search Report received for Netherlands Patent Application No. 2015236, dated Apr. 21, 2021, 19 pages (13 pages of English Translation and 6 pages of Official Copy).
Sony Smartwatch 2 update—new features and watch face creator!!! NEW!!!, Online available at:—https://www.youtube.com/watch?v=k3jjBv7QZSk, May 8, 2014, 3 pages.
Stateoftech, "Samsung Galaxy Gear Tips—Installing and Customizing Clock Faces", Online available at:—https://www.youtube.com/watch?v=p2GzpL3xlUo, Dec. 12, 2013, 3 pages.
Summons to Attend Oral Proceedings received for European Patent Application No. 16762356.0, mailed on May 10, 2021, 10 pages.
Supplemental Notice of Allowance received for U.S. Appl. No. 16/867,002, dated Sep. 9, 2021, 2 pages.
TechCloud, "How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
TheUnlockr, "How to Change the Watch Face on the Galaxy Gear", Online available at:—https://www.youtube.com/watch?v=Z7EBG5aBiZg, Jan. 3, 2014, 3 pages.
Wade Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Non-Final Office Action received for U.S. Appl. No. 15/405,122, dated Apr. 2, 2021, 35 pages.
Non-Final Office Action received for U.S. Appl. No. 16/582,020, dated Apr. 5, 2021, 29 pages.
Office Action received for Korean Patent Application No. 10-2020-7001340, dated Mar. 26, 2021, 13 pages (6 pages of English Translation and 7 pages of Official Copy).
Applicant-Initiated Interview Summary received for U.S. Appl. No. 17/031,765, dated Sep. 22, 2021, 5 pages.
Applicant-Initiated Interview Summary received for U.S. Appl. No. 17/031,765, dated Dec. 15, 2021, 4 pages.
Corrected Notice of Allowance received for U.S. Appl. No. 16/401,934, dated Dec. 23, 2021, 3 pages.

(56) References Cited

OTHER PUBLICATIONS

Decision on Appeal received for U.S. Appl. No. 14/846,511, dated Dec. 29, 2021, 20 pages.
Intention to Grant received for European Patent Application No. 16762356.0, dated Dec. 23, 2021, 8 pages.
Minutes of Oral Proceedings received for European Patent Application No. 16762356.0, mailed on Dec. 17, 2021, 5 pages.
Non-Final Office Action received for U.S. Appl. No. 15/421,865, dated Dec. 29, 2021, 23 pages.
Non-Final received for U.S. Appl. No. 17/078,896, dated Dec. 24, 2021, 17 pages.
Notice of Acceptance received for Australian Patent Application No. 2020269232, dated Dec. 16, 2021, 3 pages.
Office Action received for Australian Patent Application No. 2020250323, dated Dec. 14, 2021, 2 pages.
Office Action received for Chinese Patent Application No. 202110454541.1, dated Oct. 20, 2021, 19 pages (10 pages of English Translation and 9 pages of Official Copy).
Office Action received for Indian Patent Application No. 202017041557, dated Dec. 8, 2021, 8 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-7036246, dated Nov. 26, 2021, 5 pages (2 pages of English Translation and 3 pages of Official Copy).
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.
Office Action received for Korean Patent Application No. 10-2021-7036016, dated Nov. 10, 2021, 13 pages (6 pages of English Translation and 7 pages of Official Copy).
Office Action received for Australian Patent Application No. 2020239774, dated Oct. 5, 2021, 3 pages.
Office Action received for Chinese Patent Application No. 202110194015.6, dated Sep. 28, 2021, 13 pages (6 pages of English Translation and 7 pages of Official Copy).
Office Action received for Korean Patent Application No. 10-2021-7025301, dated Oct. 15, 2021, 5 pages (2 pages of English Translation and 3 pages of Official Copy).
Supplemental Notice of Allowance received for U.S. Appl. No. 16/997,588, dated Oct. 22, 2021, 4 pages.
Decision to Grant received for European Patent Application No. 15730925.3, dated Dec. 9, 2021, 2 pages.
Final Office Action received for U.S. Appl. No. 16/389,722, dated Dec. 6, 2021, 19 pages.
Invitation to Pay Search Fees received for European Patent Application No. 20761084.1, dated Dec. 7, 2021, 3 pages.
Notice of Acceptance received for Australian Patent Application No. 2019267413, dated Nov. 23, 2021, 3 pages.
Notice of Allowance received for U.S. Appl. No. 16/418,786, dated Dec. 9, 2021, 9 pages.
Office Action received for Chinese Patent Application No. 202110453180.9, dated Nov. 8, 2021, 21 pages (11 pages of English Translation and 10 pages of Official Copy).
Result of Consultation received for European Patent Application No. 16762356.0, dated Nov. 29, 2021, 3 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
International Search Report and Written Opinion received for PCT Patent Application No. PCT/US2021/031212, dated Sep. 21, 2021, 21 pages.
Non-Final Office Action received for U.S. Appl. No. 16/418,786, dated Oct. 4, 2021, 10 pages.
Notice of Allowance received for U.S. Appl. No. 16/997,588, dated Sep. 30, 2021, 12 pages.
Office Action received for Japanese Patent Application No. 2020-124605, dated Sep. 3, 2021, 5 pages (2 pages of English Translation and 3 pages of Official Copy).
Applicant Initiated Interview Summary received for U.S. Appl. No. 17/031,671, dated Nov. 8, 2021, 5 pages.
Final Office Action received for U.S. Appl. No. 15/405,122, dated Nov. 5, 2021, 45 pages.
Final Office Action received for U.S. Appl. No. 17/031,765, dated Oct. 29, 2021, 34 pages.
International Search Report and Written Opinion received for PCT Patent Application No. PCT/US2021/031669, dated Oct. 13, 2021, 17 pages.
Invitation to Pay Additional Fees received for PCT Patent Application No. PCT/US2021/031669, dated Aug. 19, 2021, 9 pages.
Non-Final Office Action received for U.S. Appl. No. 17/068,386, dated Oct. 28, 2021, 20 pages.
Non-Final Office Action received for U.S. Appl. No. 17/317,042, dated Nov. 10, 2021, 13 pages.
Notice of Allowance received for Chinese Patent Application No. 201910906898.1, dated Oct. 28, 2021, 4 pages (1 page of English Translation and 3 pages of Official Copy).
Notice of Allowance received for Korean Patent Application No. 10-2020-7028759, dated Oct. 19, 2021, 4 pages (1 page of English Translation and 3 pages of Official Copy).
Notice of Allowance received for U.S. Appl. No. 16/401,934, dated Nov. 1, 2021, 11 pages.
Notice of Allowance received for U.S. Appl. No. 17/087,845, dated Oct. 28, 2021, 9 pages.
Advisory Action received for U.S. Appl. No. 17/031.765, dated Nov. 13, 2023, 5 pages.
International Preliminary Report on Patentability received for PCT Patent Application No. PCT/US2022/029279, dated Nov. 23, 2023, 11 pages.
Office Action received for Korean Patent Application No. 10-2023-7008379, dated Nov. 13, 2023, 15 pages (7 pages of English Translation and 8 pages of Official Copy).
Advisory Action received for U.S. Appl. No. 15/405,122, dated Apr. 18, 2022, 5 pages.
Advisory Action received for U.S. Appl. No. 16/935,002, dated May 6, 2022, 3 pages.
Advisory Action received for U.S. Appl. No. 16/943,737, dated Jun. 1, 2022, 6 pages.
Advisory Action received for U.S. Appl. No. 17/031,765, dated Dec. 12, 2022, 7 pages.
Advisory Action received for U.S. Appl. No. 17/947,530, dated Oct. 13, 2023, 3 pages.
Applicant Initiated Interview Summary received for U.S. Appl. No. 17/031,671, dated Jun. 13, 2022, 7 pages.
Applicant-Initiated Interview Summary received for U.S. Appl. No. 15/405,122, dated Mar. 1, 2022, 4 pages.
Applicant-Initiated Interview Summary received for U.S. Appl. No. 15/421,865, dated Feb. 28, 2022, 5 pages.
Applicant-Initiated Interview Summary received for U.S. Appl. No. 15/421,865, dated Oct. 3, 2023, 6 pages.
Applicant-Initiated Interview Summary received for U.S. Appl. No. 16/943,737, dated Apr. 29, 2022, 6 pages.
Applicant-Initiated Interview Summary received for U.S. Appl. No. 17/031,671, dated Dec. 9, 2022, 5 pages.
Applicant-Initiated Interview Summary received for U.S. Appl. No. 17/031,671, dated May 23, 2023, 3 pages.
Applicant-Initiated Interview Summary received for U.S. Appl. No. 17/031,765, dated Apr. 17, 2023, 4 pages.
Applicant-Initiated Interview Summary received for U.S. Appl. No. 17/031,765, dated May 3, 2023, 6 pages.
Applicant-Initiated Interview Summary received for U.S. Appl. No. 17/031,765, dated May 23, 2022, 5 pages.
Applicant-Initiated Interview Summary received for U.S. Appl. No. 17/031,765, dated Nov. 16, 2022, 5 pages.

(56) References Cited

OTHER PUBLICATIONS

Applicant-Initiated Interview Summary received for U.S. Appl. No. 17/373,163, dated Apr. 11, 2022, 2 pages.
Applicant-Initiated Interview Summary received for U.S. Appl. No. 17/556,165, dated Oct. 28, 2022, 4 pages.
Applicant-Initiated Interview Summary received for U.S. Appl. No. 17/717,275, dated Sep. 26, 2023, 6 pages.
Applicant-Initiated Interview Summary received for U.S. Appl. No. 17/738,940, dated Mar. 7, 2023, 4 pages.
Applicant-Initiated Interview Summary received for U.S. Appl. No. 17/941,962, dated May 30, 2023, 2 pages.
Applicant-Initiated Interview Summary received for U.S. Appl. No. 17/947,530, dated Jun. 14, 2023, 2 pages.
Applicant-Initiated Interview Summary received for U.S. Appl. No. 17/947,530, dated Sep. 19, 2023, 2 pages.
Applicant-Initiated Interview Summary received for U.S. Appl. No. 17/949,081, dated Apr. 28, 2023, 2 pages.
Applicant-Initiated Interview Summary received for U.S. Appl. No. 17/949,081, dated Sep. 8, 2023, 2 pages.
Brief Communication Regarding Oral Proceedings received for European Patent Application No. 17810723.1, mailed on Nov. 11, 2022, 11 pages.
Corrected Notice of Allowance received for U.S. Appl. No. 16/401,934, dated Feb. 28, 2022, 3 pages.
Corrected Notice of Allowance received for U.S. Appl. No. 16/935,002, dated Jul. 17, 2023, 5 pages.
Corrected Notice of Allowance received for U.S. Appl. No. 16/935,002, dated Mar. 2, 2023, 2 pages.
Corrected Notice of Allowance received for U.S. Appl. No. 16/935,002, dated Mar. 28, 2023, 2 pages.
Corrected Notice of Allowance received for U.S. Appl. No. 17/373,163, dated Jul. 15, 2022, 5 pages.
Corrected Notice of Allowance received for U.S. Appl. No. 17/373,163, dated Jun. 27, 2022, 5 pages.
Corrected Notice of Allowance received for U.S. Appl. No. 17/941,962, dated Apr. 14, 2023, 6 pages.
Corrected Notice of Allowance received for U.S. Appl. No. 17/941,962, dated Aug. 3, 2023, 2 pages.
Decision to Grant received for European Patent Application No. 17810723.1, dated Sep. 21, 2023, 2 pages.
Decision to Grant received for European Patent Application No. 20185974.1, dated Aug. 19, 2022, 3 pages.
Decision to Refuse received for Japanese Patent Application No. 2020-159824, dated Sep. 30, 2022, 6 pages (3 pages of English Translation and 3 pages of Official Copy).
Droid Life, "20+ Galaxy S9, S9+ Tips and Tricks", Available Online at: https://www.youtube.com/watch?v=sso0mYTfV6w, Mar. 22, 2018, pp. 1-33.
Examiner's Answer to Appeal Brief received for U.S. Appl. No. 15/405,122, dated Jan. 11, 2023, 16 pages.
Extended European Search Report received for European Patent Application No. 22188724.3, dated Mar. 2, 2023, 14 pages.
Final Office Action received for U.S. Appl. No. 15/421,865, dated Jul. 12, 2022, 27 pages.
Final Office Action received for U.S. Appl. No. 16/943,737, dated Feb. 4, 2022, 24 pages.
Final Office Action received for U.S. Appl. No. 17/031,671, dated Nov. 15, 2022, 27 pages.
Final Office Action received for U.S. Appl. No. 17/031,765, dated Sep. 1, 2023, 37 pages.
Final Office Action received for U.S. Appl. No. 17/031,765, dated Sep. 12, 2022, 37 pages.
Final Office Action received for U.S. Appl. No. 17/947,530, dated Jul. 13, 2023, 17 pages.
Final Office Action received for U.S. Appl. No. 17/949,081, dated Jun. 5, 2023, 23 pages.
Gauging Gadgets, "How to Customize Watch Faces—Garmin Venu Tutorial", Online Available at: https://www.youtube.com/watch?v=dxajKKulaP0, Jan. 7, 2020, 14 pages.

Ilovex, "Stripe Generator, a tool that makes it easy to create striped materials", Online available at: https://www.ilovex.co.jp/blog/system/webconsulting/stripe-generator.html, May 2, 2012, 3 pages (Official Copy Only) (See Communication Under Rule 37 CFR § 1.98(a)(3).
Intention to Grant received for Danish Patent Application No. PA202070623, dated Jul. 20, 2022, 2 pages.
Intention to Grant received for European Patent Application No. 17810723.1, dated Dec. 16, 2022, 9 pages.
Intention to Grant received for European Patent Application No. 17810723.1, dated Jun. 12, 2023, 9 pages.
Intention to Grant received for European Patent Application No. 20185974.1, dated Apr. 28, 2022, 8 pages.
International Preliminary Report on Patentability received for PCT Patent Application No. PCT/US2021/031212, dated Nov. 24, 2022, 16 pages.
International Search Report and Written Opinion received for PCT Patent Application No. PCT/US2022/029279, dated Nov. 9, 2022, 16 pages.
International Search Report and Written Opinion received for PCT Patent Application No. PCT/US2023/011151, dated Jul. 5, 2023, 20 pages.
Invitation to Pay Additional Fees and Partial International Search Report received for PCT Patent Application No. PCT/US2022/029279, dated Sep. 15, 2022, 9 pages.
Invitation to Pay Additional Fees and Partial International Search Report received for PCT Patent Application No. PCT/US2023/011151, dated May 12, 2023, 13 pages.
Invitation to Pay Search Fees received for European Patent Application No. 20730136.7, dated Jul. 1, 2022, 4 pages.
Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) (See Communication Under Rule 37 CFR § 1.98(a) (3).
Lein et al., "Patternizer", Available online at: https://patternizer.com/, Apr. 2016, 5 pages.
Minutes of the Oral Proceedings received for European Patent Application No. 17810723.1, mailed on Dec. 9, 2022, 7 pages.
Non-Final Office Action received for U.S. Appl. No. 15/421,865, dated Jul. 11, 2023, 32 pages.
Non-Final Office Action received for U.S. Appl. No. 16/943,737, dated Mar. 28, 2023, 28 pages.
Non-Final Office Action received for U.S. Appl. No. 17/031,671, dated Apr. 1, 2022, 32 pages.
Non-Final Office Action received for U.S. Appl. No. 17/031,671, dated Mar. 17, 2023, 34 pages.
Non-Final Office Action received for U.S. Appl. No. 17/031,765, dated Mar. 28, 2023, 31 pages.
Non-Final Office Action received for U.S. Appl. No. 17/031,765, dated Mar. 29, 2022, 33 pages.
Non-Final Office Action received for U.S. Appl. No. 17/373,163, dated Jan. 27, 2022, 14 pages.
Non-Final Office Action received for U.S. Appl. No. 17/556,165, dated Sep. 7, 2022, 15 pages.
Non-Final Office Action received for U.S. Appl. No. 17/717,275, dated Jul. 3, 2023, 10 pages.
Non-Final Office Action received for U.S. Appl. No. 17/738,940, dated Dec. 22, 2022, 31 pages.
Non-Final Office Action received for U.S. Appl. No. 17/947,530, dated Mar. 31, 2023, 14 pages.
Non-Final Office Action received for U.S. Appl. No. 17/949,081, dated Feb. 27, 2023, 19 pages.
Notice of Acceptance received for Australian Patent Application No. 2020239749, dated May 27, 2022, 3 pages.
Notice of Acceptance received for Australian Patent Application No. 2020239774, dated Jan. 5, 2022, 3 pages.
Notice of Acceptance received for Australian Patent Application No. 2020250323, dated Feb. 28, 2022, 3 pages.
Notice of Acceptance received for Australian Patent Application No. 2022201419, dated May 31, 2023, 3 pages.
Notice of Acceptance received for Australian Patent Application No. 2022202292, dated Jul. 6, 2022, 3 pages.

(56) References Cited

OTHER PUBLICATIONS

Notice of Acceptance received for Australian Patent Application No. 2022202583, dated Aug. 7, 2023, 3 pages.
Notice of Acceptance received for Australian Patent Application No. 2022203957, dated Sep. 27, 2023, 3 pages.
Notice of Acceptance received for Australian Patent Application No. 2022220279, dated Sep. 27, 2022, 3 pages.
Notice of Acceptance received for Australian Patent Application No. 2022235622, dated Sep. 13, 2023, 3 pages.
Notice of Acceptance received for Australian Patent Application No. 2023200039, dated Aug. 31, 2023, 3 pages.
Notice of Allowance received for Chinese Patent Application No. 202111457936.3, dated Nov. 7, 2022, 4 pages (1 page of English Translation and 3 pages of Official Copy).
Notice of Allowance received for Danish Patent Application No. PA202070623, dated Sep. 20, 2022, 2 pages.
Notice of Allowance received for Japanese Patent Application No. 2020-124605, dated Dec. 5, 2022, 4 pages (1 page of English Translation and 3 pages of Official Copy).
Notice of Allowance received for Japanese Patent Application No. 2020-159823, dated Jul. 24, 2023, 23 pages (1 page of English Translation and 22 pages of Official Copy).
Notice of Allowance received for Japanese Patent Application No. 2020-159825, dated Mar. 25, 2022, 5 pages (1 page of English Translation and 4 pages of Official Copy).
Notice of Allowance received for Japanese Patent Application No. 2020-562622, dated Aug. 26, 2022, 4 pages (1 page of English Translation and 3 pages of Official Copy).
Notice of Allowance received for Japanese Patent Application No. 2021-565837, dated May 16, 2022, 4 pages (1 page of English Translation and 3 pages of Official Copy).
Notice of Allowance received for Japanese Patent Application No. 2022-096730, dated Jun. 5, 2023, 4 pages (1 page of English Translation and 3 pages of Official Copy).
Notice of Allowance received for Korean Patent Application No. 10-2020-0123852, dated Mar. 9, 2023, 7 pages (2 pages of English Translation and 5 pages of Official Copy).
Notice of Allowance received for Korean Patent Application No. 10-2020-0123852, dated Nov. 28, 2022, 7 pages (2 pages of English Translation and 5 pages of Official Copy).
Notice of Allowance received for Korean Patent Application No. 10-2020-0123857, dated Feb. 21, 2023, 6 pages (1 page of English Translation and 5 pages of Official Copy).
Notice of Allowance received for Korean Patent Application No. 10-2020-0123887, dated Nov. 28, 2022, 7 pages (2 pages of English Translation and 5 pages of Official Copy).
Notice of Allowance received for Korean Patent Application No. 10-2021-7034748, dated Jan. 27, 2022, 6 pages (2 pages of English Translation and 4 pages of Official Copy).
Notice of Allowance received for Korean Patent Application No. 10-2021-7036246, dated Mar. 2, 2022, 5 pages (1 page of English Translation and 4 pages of Official Copy).
Notice of Allowance received for Korean Patent Application No. 10-2022-7014529, dated Dec. 13, 2022, 8 pages (2 pages of English Translation and 6 pages of Official Copy).
Notice of Allowance received for Korean Patent Application No. 10-2023-0064928, dated Sep. 22, 2023, 7 pages (2 pages of English Translation and 5 pages of Official Copy).
Notice of Allowance received for U.S. Appl. No. 16/401,934, dated Feb. 2, 2022, 8 pages.
Notice of Allowance received for U.S. Appl. No. 16/935,002, dated Feb. 15, 2023, 15 pages.
Notice of Allowance received for U.S. Appl. No. 16/935,002, dated Jun. 28, 2023, 8 pages.
Notice of Allowance received for U.S. Appl. No. 16/997,588, dated Mar. 18, 2022, 9 pages.
Notice of Allowance received for U.S. Appl. No. 17/373,163, dated Jul. 27, 2022, 8 pages.
Notice of Allowance received for U.S. Appl. No. 17/373,163, dated May 11, 2022, 8 pages.
Notice of Allowance received for U.S. Appl. No. 17/556,165, dated Feb. 21, 2023, 12 pages.
Notice of Allowance received for U.S. Appl. No. 17/738,940, dated Jun. 22, 2023, 9 pages.
Notice of Allowance received for U.S. Appl. No. 17/738,940, dated Oct. 2, 2023, 9 pages.
Notice of Allowance received for U.S. Appl. No. 17/941,962, dated Jul. 3, 2023, 9 pages.
Notice of Allowance received for U.S. Appl. No. 17/941,962, dated Mar. 10, 2023, 11 pages.
Notice of Allowance received for U.S. Appl. No. 17/941,962, dated May 3, 2023, 10 pages.
Office Action received for Australian Patent Application No. 2020239749, dated Jan. 21, 2022, 4 pages.
Office Action received for Australian Patent Application No. 2022201419, dated Mar. 20, 2023, 3 pages
Office Action received for Australian Patent Application No. 2022202292, dated May 10, 2022, 2 pages.
Office Action received for Australian Patent Application No. 2022202583, dated Mar. 24, 2023, 4 pages.
Office Action received for Australian Patent Application No. 2022203957, dated May 12, 2023, 5 pages.
Office Action received for Australian Patent Application No. 2022235622, dated Jun. 27, 2023, 3 pages.
Office Action received for Australian Patent Application No. 2022235622, dated May 22, 2023, 2 pages.
Office Action received for Australian Patent Application No. 2023200039, dated Jul. 4, 2023, 2 pages.
Office Action received for Chinese Patent Application No. 202111457936.3, dated Jul. 5, 2022, 18 pages (9 pages of English Translation and 9 pages of Official Copy).
Office Action received for Danish Patent Application No. PA202070623, dated May 23, 2022, 3 pages.
Office Action received for Danish Patent Application No. PA202070624, dated Feb. 4, 2022, 4 pages.
Office Action received for Danish Patent Application No. PA202070625, dated Feb. 8, 2022, 2 pages.
Office Action received for Danish Patent Application No. PA202070625, dated Sep. 23, 2022, 4 pages.
Office Action received for European Patent Application No. 19724997.2, dated Oct. 27, 2022, 5 pages.
Office Action received for European Patent Application No. 20730136.7, dated Jan. 19, 2023, 4 pages.
Office Action received for European Patent Application No. 20730136.7, dated Jun. 27, 2023, 5 pages.
Office Action received for European Patent Application No. 20730136.7, dated Oct. 6, 2022, 11 pages.
Office Action received for European Patent Application No. 21728746.5, dated Aug. 21, 2023, 4 pages.
Office Action received for Indian Patent Application No. 202017048447, dated Sep. 5, 2022, 6 pages.
Office Action received for Japanese Patent Application No. 2020-124605, dated May 13, 2022, 6 pages (3 pages of English Translation and 3 pages of Official Copy).
Office Action received for Japanese Patent Application No. 2020-159823, dated Aug. 15, 2022, 6 pages (3 pages of English Translation and 3 pages of Official Copy).
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2020-562622, dated Jan. 7, 2022, 13 pages (6 pages of English Translation and 7 pages of Official Copy).
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Dec. 16, 2022, 8 pages (4 pages of English Translation and 4 pages of Official Copy).

(56) References Cited

OTHER PUBLICATIONS

Office Action received for Korean Patent Application No. 10-2020-0123857, dated Jun. 9, 2022, 12 pages (5 pages of English Translation and 7 pages of Official Copy).
Office Action received for Korean Patent Application No. 10-2020-0123887, dated Jun. 9, 2022, 5 pages (2 pages of English Translation and 3 pages of Official Copy).
Office Action received for Korean Patent Application No. 10-2020-7032187, dated Jun. 10, 2022, 16 pages (7 pages of English Translation and 9 pages of Official Copy).
Office Action received for Korean Patent Application No. 10-2022-7019034, dated Sep. 18, 2023, 6 pages (2 pages of English Translation and 4 pages of Official Copy).
Office Action received for Korean Patent Application No. 10-2023-0064928, dated Jun. 9, 2023, 6 pages (2 pages of English Translation and 4 pages of Official Copy).
Pre-Appeal Review Report received for Japanese Patent Application No. 2020-159823, dated Jan. 12, 2023, 4 pages (2 pages of English Translation and 2 pages of Official Copy).
Record of Oral Hearing received for U.S. Appl. No. 15/405,122, mailed on Sep. 12, 2023, 20 pages.
Restriction Requirement received for U.S. Appl. No. 17/949,081, dated Dec. 2, 2022, 6 pages.
Restriction Requirement received for U.S. Appl. No. 17/949,081, dated Jan. 3, 2023, 6 pages.
Result of Consultation received for European Patent Application No. 17810723.1, dated Nov. 30, 2022, 3 pages.
Result of Consultation received for European Patent Application No. 20185974.1, dated Apr. 4, 2022, 4 pages.
Rozario Hamlin, "How to Edit Photos on iPhone & iPad", Online Available at: https://osxdaily.com/2020/01/23/how-to-edit-photos-on-iphone-ipad/, Jan. 23, 2020, 10 pages.
Summons to Attend Oral Proceedings received for European Patent Application No. 17810723.1, mailed on Jul. 5, 2022, 8 pages.
Supplemental Notice of Allowance received for U.S. Appl. No. 16/997,588, dated Apr. 20, 2022, 4 pages.
Applicant-Initiated Interview Summary received for U.S. Appl. No. 17/031,765, dated Oct. 31, 2023, 5 pages.
Extended European Search Report received for European Patent Application No. 23201849.9, dated Oct. 26, 2023, 9 pages.
Office Action received for Chinese Patent Application No. 202310124087.2, dated Sep. 9, 2023, 24 pages (13 pages of English Translation and 11 pages of Official Copy).
Office Action received for European Patent Application No. 20730136.7, dated Nov. 3, 2023, 5 pages.
Office Action received for Japanese Patent Application No. 2022-152693, dated Oct. 27, 2023, 6 pages (3 pages of English Translation and 3 pages of Official Copy).
Corrected Notice of Allowance received for U.S. Appl. No. 16/418,786, dated Jan. 5, 2022, 3 pages.
Final Office Action received for U.S. Appl. No. 16/935,002, dated Jan. 5, 2022, 25 pages.
Office Action received for Japanese Patent Application No. 2020-159823, dated Dec. 23, 2021, 8 pages (4 pages of English Translation and 4 pages of Official Copy).
Office Action received for Korean Patent Application No. 10-2021-7036678, dated Dec. 22, 2021, 6 pages (2 pages of English Translation and 4 pages of Official Copy).
Decision on Appeal received for U.S. Appl. No. 15/405,122, dated Dec. 12, 2023, 18 pages.
Examiner's Answer to Appeal Brief received for U.S. Appl. No. 17/031,671, dated Dec. 8, 2023, 16 pages.
Office Action received for Korean Patent Application No. 10-2023-7008854, dated Nov. 15, 2023, 6 pages (2 pages of English Translation and 4 pages of Official Copy).
Notice of Allowance received for U.S. Appl. No. 17/717,275, dated Dec. 26, 2023, 8 pages.
Office Action received for Korean Patent Application No. 10-2023-7033642, dated Dec. 4, 2023, 5 pages (2 pages of English Translation and 3 pages of Official Copy).

\* cited by examiner

800

```
┌─────────────────────────────────────────────────────────────────────┐
│  DISPLAY, AT A FIRST TIME, A FIRST USER INTERFACE OBJECT WITHOUT    │
│            DISPLAYING A SECOND USER INTERFACE OBJECT                │
│                                802                                   │
└─────────────────────────────────────────────────────────────────────┘
                                  ↓
┌─────────────────────────────────────────────────────────────────────┐
│  DISPLAY, AT A SECOND TIME AFTER THE FIRST TIME AND WITHIN A FIRST  │
│  PERIOD OF TIME, A COMBINATION OF THE FIRST USER INTERFACE OBJECT AND│
│                   THE SECOND USER INTERFACE OBJECT                   │
│                                804                                   │
└─────────────────────────────────────────────────────────────────────┘
                                  ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   OUTPUT AN ALERT BEFORE THE SECOND TIME AND WITHIN THE FIRST PERIOD
│                              OF TIME                                 │
                                806
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  RECEIVE USER INPUT, WHEREIN DISPLAYING THE COMBINATION OCCURS IN
│ ACCORDANCE WITH A DETERMINATION THAT THE USER INPUT IS RECEIVED     │
          WITHIN A THRESHOLD OF TIME AFTER THE ALERT
│                               808                                    │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  FORGO DISPLAY OF THE COMBINATION OF THE FIRST USER INTERFACE OBJECT
│ AND THE SECOND USER INTERFACE OBJECT IN RESPONSE TO RECEIVING THE   │
   INPUT AND IN ACCORDANCE WITH A DETERMINATION THAT USER INPUT IS
│              NOT RECEIVED WITHIN THE THRESHOLD                       │
                                810
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  ↓
```

```
┌─────────────────────────────────────────────────────────────┐
│  DISPLAY, AT A FIRST TIME, A USER INTERFACE OBJECT WITH A   │
│       FIRST APPEARANCE AT A FIRST LOCATION OF A CLOCK FACE  │
│                            1202                             │
└─────────────────────────────────────────────────────────────┘
                              ↓
┌─────────────────────────────────────────────────────────────┐
│  DISPLAY, AT A SECOND TIME DIFFERENT FROM THE FIRST TIME,   │
│  THE USER INTERFACE OBJECT WITH THE FIRST APPEARANCE AT A   │
│           SECOND LOCATION OF THE CLOCK FACE 1204            │
└─────────────────────────────────────────────────────────────┘
                              ↓
```

WHEREIN: THE USER INTERFACE OBJECT IS DISPLAYED FOR A FIRST AMOUNT OF TIME AFTER THE FIRST TIME, THE USER INTERFACE OBJECT IS DISPLAYED FOR A SECOND AMOUNT OF TIME AFTER THE SECOND TIME, THE FIRST LOCATION IS INDICATIVE OF A FIRST UNIT ACCORDING TO THE SECOND TIME SCALE, THE SECOND LOCATION IS INDICATIVE OF A SECOND UNIT ACCORDING TO THE SECOND TIME SCALE, THE SECOND UNIT IS DIFFERENT FROM THE FIRST UNIT
1206

CEASE TO DISPLAY THE USER INTERFACE OBJECT AFTER THE FIRST AMOUNT OF TIME
1208

CEASE TO DISPLAY THE USER INTERFACE OBJECT AFTER THE SECOND AMOUNT OF TIME
1210

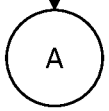

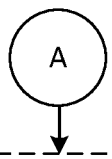

WHEREIN: THE USER INTERFACE OBJECT PERFORMS AN ANIMATION AT A PLURALITY OF TIME BOUNDARIES ACCORDING TO THE SECOND TIME SCALE, THE ANIMATION AT A FIRST TIME BOUNDARY INCLUDES AN ACTIVITY CORRESPONDING TO A FIRST TIME OF DAY AT THE FIRST TIME BOUNDARY, AND THE ANIMATION AT SECOND FIRST TIME BOUNDARY THAT IS DIFFERENT FROM THE FIRST TIME BOUNDARY INCLUDES AN ACTIVITY CORRESPONDING TO A SECOND TIME OF DAY THAT IS DIFFERENT FROM THE FIRST TIME OF DAY AT THE SECOND TIME BOUNDARY
1212

WHEREIN THE ANIMATION AT THE FIRST TIME BOUNDARY IS DIFFERENT FROM THE ANIMATION AT THE SECOND TIME BOUNDARY
1214

DISPLAY, AT A THIRD TIME DIFFERENT FROM THE SECOND TIME AND THE FIRST TIME, THE USER INTERFACE OBJECT WITH A SECOND APPEARANCE AT THE FIRST LOCATION OF THE CLOCK FACE
1216

WHEREIN THE USER INTERFACE OBJECT PERFORMS A FIRST ANIMATION AT THE FIRST TIME AND A SECOND ANIMATION AT THE THIRD TIME
1218

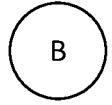

*FIG. 12B*

USING AN ILLUSTRATION TO SHOW THE PASSING OF TIME

CROSS-REFERENCE TO RELATED APPLICATIONS

This application claims priority to U.S. Provisional Patent Application No. 62/843,723, entitled "USING AN ILLUSTRATION TO SHOW THE PASSING OF TIME," filed on May 6, 2019, the contents of which is hereby incorporated by reference in its entirety.

FIELD

The present disclosure relates generally to computer user interfaces, and more specifically to techniques for indicating time on context-specific user interfaces.

BACKGROUND

Users rely on portable multifunction devices for a variety of operations, including keeping time and running an assortment of software applications that enhance device functionality. A user may also want to access different types of information, such as various forms of timekeeping-related data, or different application data, in different contexts.

BRIEF SUMMARY

Some techniques for indicating time on context-specific user interfaces using electronic devices, however, are generally cumbersome and inefficient. For example, some existing techniques use a complex and time-consuming user interface. It is therefore desirable to allow the user to access time-related and application-related information while keeping the interface simple and intuitive to use. Other existing techniques rely on the ability of a user to decipher textual, numerical, or radial markings, and to determine the position of multiple graphical elements relative to such markings. Furthermore, existing techniques require large amounts of display area to the exclusion of other graphical content, an acute concern for electronic devices with reduced-sized displays. It is therefore also desirable to allow the user to customize the user interface and the types of information provided through the user interface in a manner that provides improved visual feedback regarding the state of portable multifunctional device relative to time-keeping and application driven operations. Existing techniques may be prone to error or require more time than necessary, wasting user time and device energy. This latter consideration is particularly important in battery-operated devices.

Accordingly, the present techniques provide electronic devices with faster, more efficient methods and context-specific user interfaces for indicating time. Such methods and interfaces optionally complement or replace other methods for indicating time. Such methods and interfaces reduce the cognitive burden on a user and produce a more efficient human-machine interface. For battery-operated computing devices, such methods and interfaces conserve power and increase the time between battery charges.

In some embodiments, a method comprises, at an electronic device with a display device: at a first time, displaying, via the display device, a first user interface object without displaying a second user interface object, where the second user interface object is different from the first user interface object, and where the first user interface object represents a first period of time that includes the first time; at a second time after the first time and within the first period of time, displaying, via the display device, a combination of the first user interface object and the second user interface object; and at a third time after the second time, displaying, via the display device, the second user interface object without displaying the first user interface object, where the second user interface object represents a second period of time that includes the third time.

In some embodiments, a method comprises, at an electronic device with a display device: displaying a clock face via the display device; at a first time, displaying, via the display device, a user interface object at a first location of the clock face, where the user interface object has a first appearance at the first time; at a second time different from the first time, displaying, via the display device, the user interface object at a second location of the clock face, where the user interface object has the first appearance at the second time, and where a difference between the first time and the second time is at least one unit according to a first time scale; and at a third time different from each of the second time and the first time, displaying, via the display device, the user interface object at the first location of the clock face, where the user interface object has a second appearance at the third time, where a difference between the first time and the third time is at least one unit according to a second time scale different from the first time scale.

In some embodiments, a non-transitory computer-readable storage medium stores one or more programs configured to be executed by one or more processors of an electronic device with a display device, the one or more programs including instructions for: at a first time, displaying, via the display device, a first user interface object without displaying a second user interface object, where the second user interface object is different from the first user interface object, and where the first user interface object represents a first period of time that includes the first time; at a second time after the first time and within the first period of time, displaying, via the display device, a combination of the first user interface object and the second user interface object; and at a third time after the second time, displaying, via the display device, the second user interface object without displaying the first user interface object, where the second user interface object represents a second period of time that includes the third time.

In some embodiments, a non-transitory computer-readable storage medium stores one or more programs configured to be executed by one or more processors of an electronic device with a display device, the one or more programs including instructions for: at a first time, displaying, via the display device, a user interface object at a first location of the clock face, where the user interface object has a first appearance at the first time; at a second time different from the first time, displaying, via the display device, the user interface object at a second location of the clock face, where the user interface object has the first appearance at the second time, and where a difference between the first time and the second time is at least one unit according to a first time scale; and at a third time different from each of the second time and the first time, displaying, via the display device, the user interface object at the first location of the clock face, where the user interface object has a second appearance at the third time, where a difference between the first time and the third time is at least one unit according to a second time scale different from the first time scale.

In some embodiments, a transitory computer-readable storage medium stores one or more programs configured to be executed by one or more processors of an electronic device with a display device, the one or more programs including instructions for: at a first time, displaying, via the display device, a first user interface object without displaying a second user interface object, where the second user interface object is different from the first user interface object, and where the first user interface object represents a first period of time that includes the first time; at a second time after the first time and within the first period of time, displaying, via the display device, a combination of the first user interface object and the second user interface object; and at a third time after the second time, displaying, via the display device, the second user interface object without displaying the first user interface object, where the second user interface object represents a second period of time that includes the third time.

In some embodiments, a transitory computer-readable storage medium stores one or more programs configured to be executed by one or more processors of an electronic device with a display device, the one or more programs including instructions for: at a first time, displaying, via the display device, a user interface object at a first location of the clock face, where the user interface object has a first appearance at the first time; at a second time different from the first time, displaying, via the display device, the user interface object at a second location of the clock face, where the user interface object has the first appearance at the second time, and where a difference between the first time and the second time is at least one unit according to a first time scale; and at a third time different from each of the second time and the first time, displaying, via the display device, the user interface object at the first location of the clock face, where the user interface object has a second appearance at the third time, where a difference between the first time and the third time is at least one unit according to a second time scale different from the first time scale.

In some embodiments, an electronic device comprising a display device; one or more processors; and memory storing one or more programs configured to be executed by the one or more processors, the one or more programs including instructions for: at a first time, displaying, via the display device, a first user interface object without displaying a second user interface object, where the second user interface object is different from the first user interface object, and where the first user interface object represents a first period of time that includes the first time; at a second time after the first time and within the first period of time, displaying, via the display device, a combination of the first user interface object and the second user interface object; and at a third time after the second time, displaying, via the display device, the second user interface object without displaying the first user interface object, where the second user interface object represents a second period of time that includes the third time.

In some embodiments, an electronic device comprising a display device; one or more processors; and memory storing one or more programs configured to be executed by the one or more processors, the one or more programs including instructions for: at a first time, displaying, via the display device, a user interface object at a first location of the clock face, where the user interface object has a first appearance at the first time; at a second time different from the first time, displaying, via the display device, the user interface object at a second location of the clock face, where the user interface object has the first appearance at the second time, and where a difference between the first time and the second time is at least one unit according to a first time scale; and at a third time different from each of the second time and the first time, displaying, via the display device, the user interface object at the first location of the clock face, where the user interface object has a second appearance at the third time, where a difference between the first time and the third time is at least one unit according to a second time scale different from the first time scale.

In some embodiments, an electronic device comprising a display device; means for displaying at a first time, via the display device, a first user interface object without displaying a second user interface object, where the second user interface object is different from the first user interface object, and where the first user interface object represents a first period of time that includes the first time; means for displaying at a second time after the first time and within the first period of time, via the display device, a combination of the first user interface object and the second user interface object; and means for displaying at a third time after the second time, via the display device, the second user interface object without displaying the first user interface object, where the second user interface object represents a second period of time that includes the third time.

In some embodiments, an electronic device comprising a display device; means for displaying at a first time, via the display device, a user interface object at a first location of the clock face, where the user interface object has a first appearance at the first time; means for displaying at a second time different from the first time, via the display device, the user interface object at a second location of the clock face, where the user interface object has the first appearance at the second time, and where a difference between the first time and the second time is at least one unit according to a first time scale; and means for displaying at a third time different from each of the second time and the first time, via the display device, the user interface object at the first location of the clock face, where the user interface object has a second appearance at the third time, where a difference between the first time and the third time is at least one unit according to a second time scale different from the first time scale.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for indicating time, thereby increasing the effectiveness, efficiency, and user satisfaction with such devices. Such methods and interfaces may complement or replace other methods for in.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8B illustrate a flow diagram depicting a process for providing context-specific user interfaces in accordance with some embodiments.

FIGS. 12A-12C illustrate a flow diagram depicting a process for providing context-specific user interfaces in accordance with some embodiments.

DESCRIPTION OF EMBODIMENTS

Figure 1A:
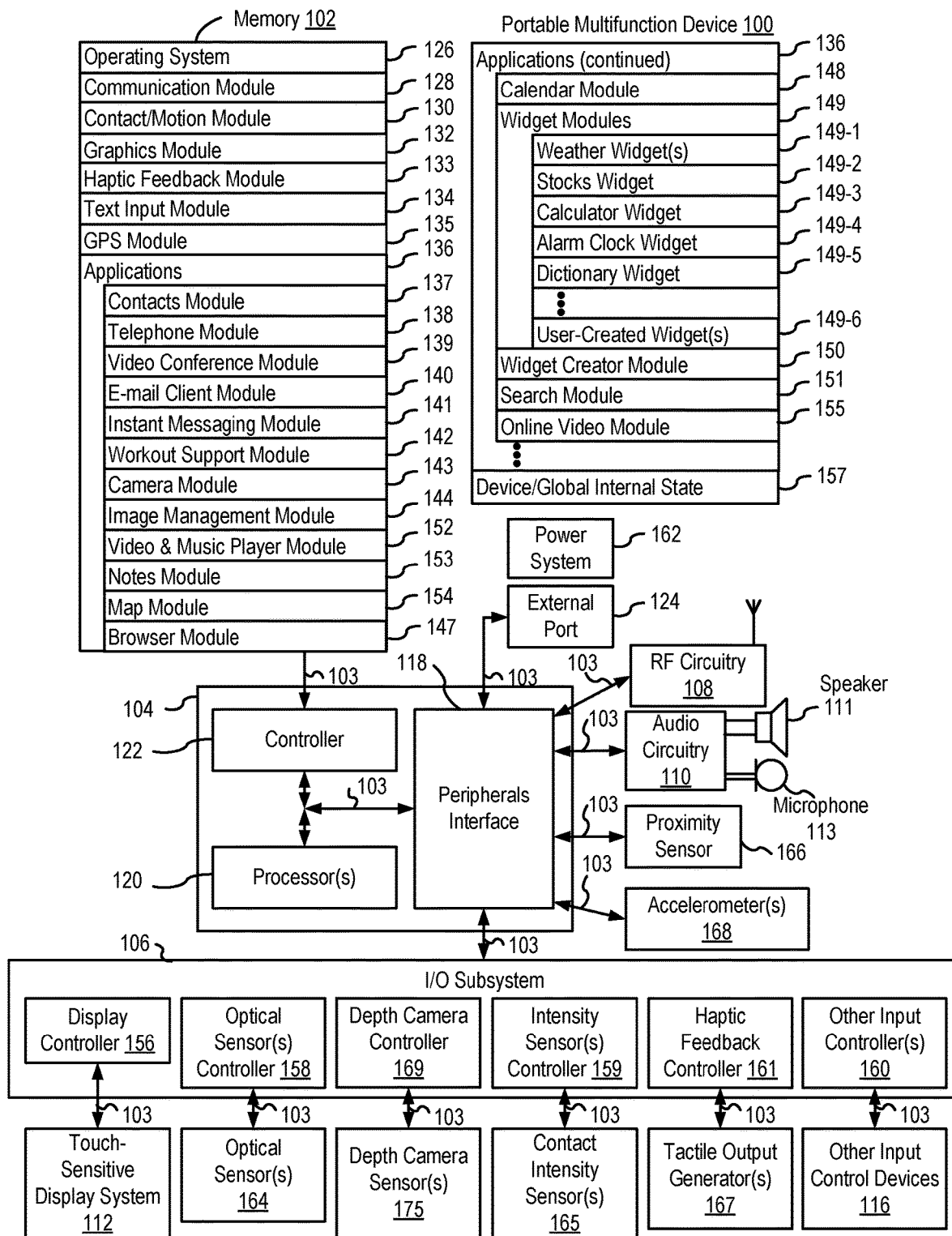
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and context-specific user interfaces, e.g., that display time along with additional information. This is particularly true for portable multifunction devices with reduced-sized displays. Providing context-specific user interfaces that include alternative modalities through which to convey information reduces the cognitive burden on a user attempting to access information and/or keep time, thereby enhancing user satisfaction, productivity, usability, and accessibility. Such interfaces provides more efficient use of limited screen "real estate," which in turn reduces the number of user interactions required to access relevant data at any time of day. Further, such techniques can reduce processor and battery power otherwise wasted on redundant user inputs.

Below, FIGS. 1A-1B, 2, 3, 4A-4B, and 5A-5B provide a description of exemplary devices for performing techniques for indicating time. FIGS. 6A-6E and 7A-7D illustrate exemplary user interfaces for indicating time. FIGS. 8A-8B are flow diagrams illustrating methods of indicating time on a context-specific user interface in accordance with some embodiments. The user interfaces in FIGS. 6A-6E and 7A-7D are used to illustrate the processes described below, including the processes in FIGS. 8A-8B. FIGS. 9A-9E, 10A-10G, and 11A-11D illustrate exemplary user interfaces for indicating time. FIGS. 12A-12C are flow diagrams illustrating methods of indicating time on a context-specific user interface in accordance with some embodiments. The user interfaces in FIGS. 9A-9E, 10A-10G, and 11A-11D are used to illustrate the processes described below, including the processes in FIGS. 12A-12C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
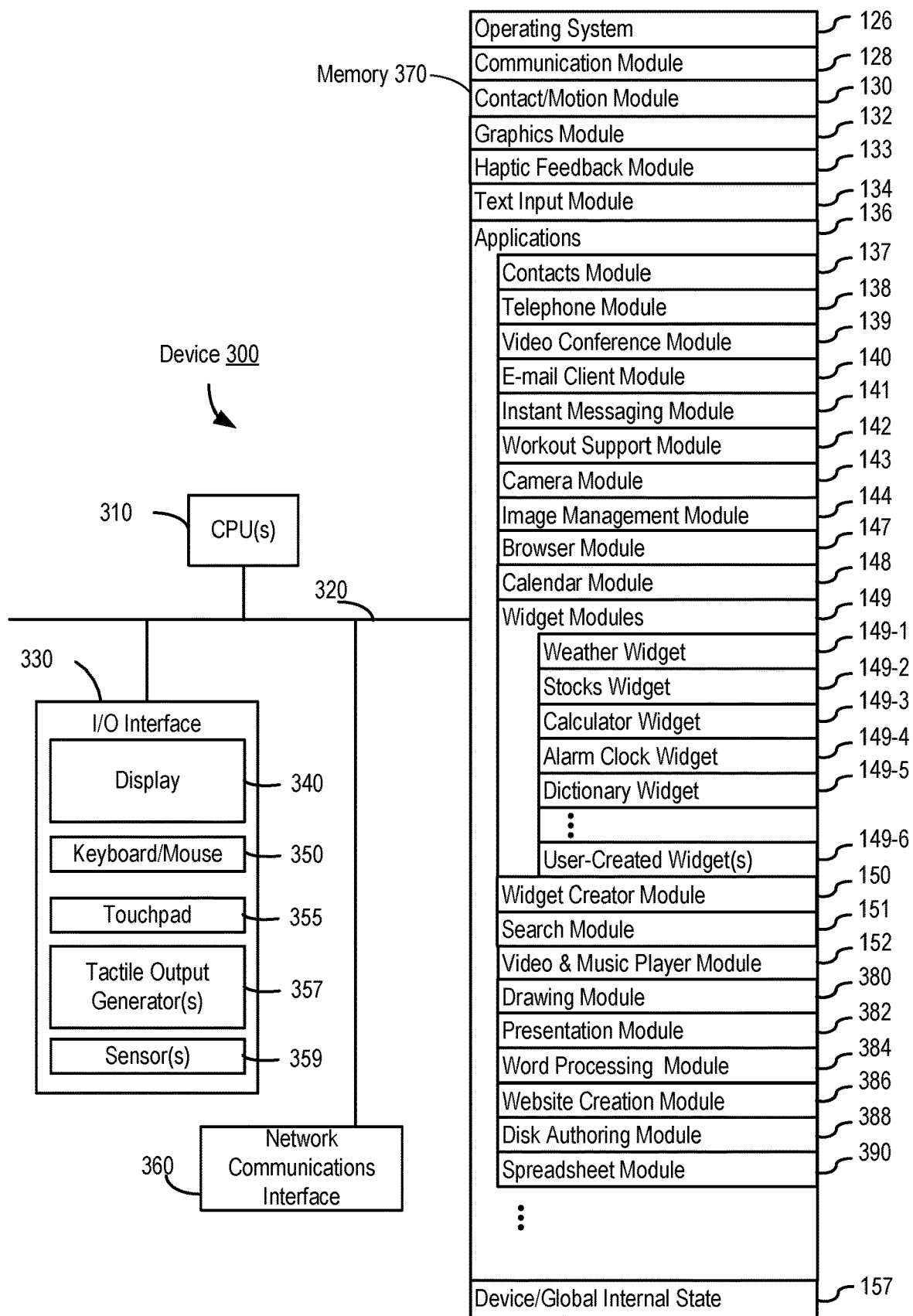
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
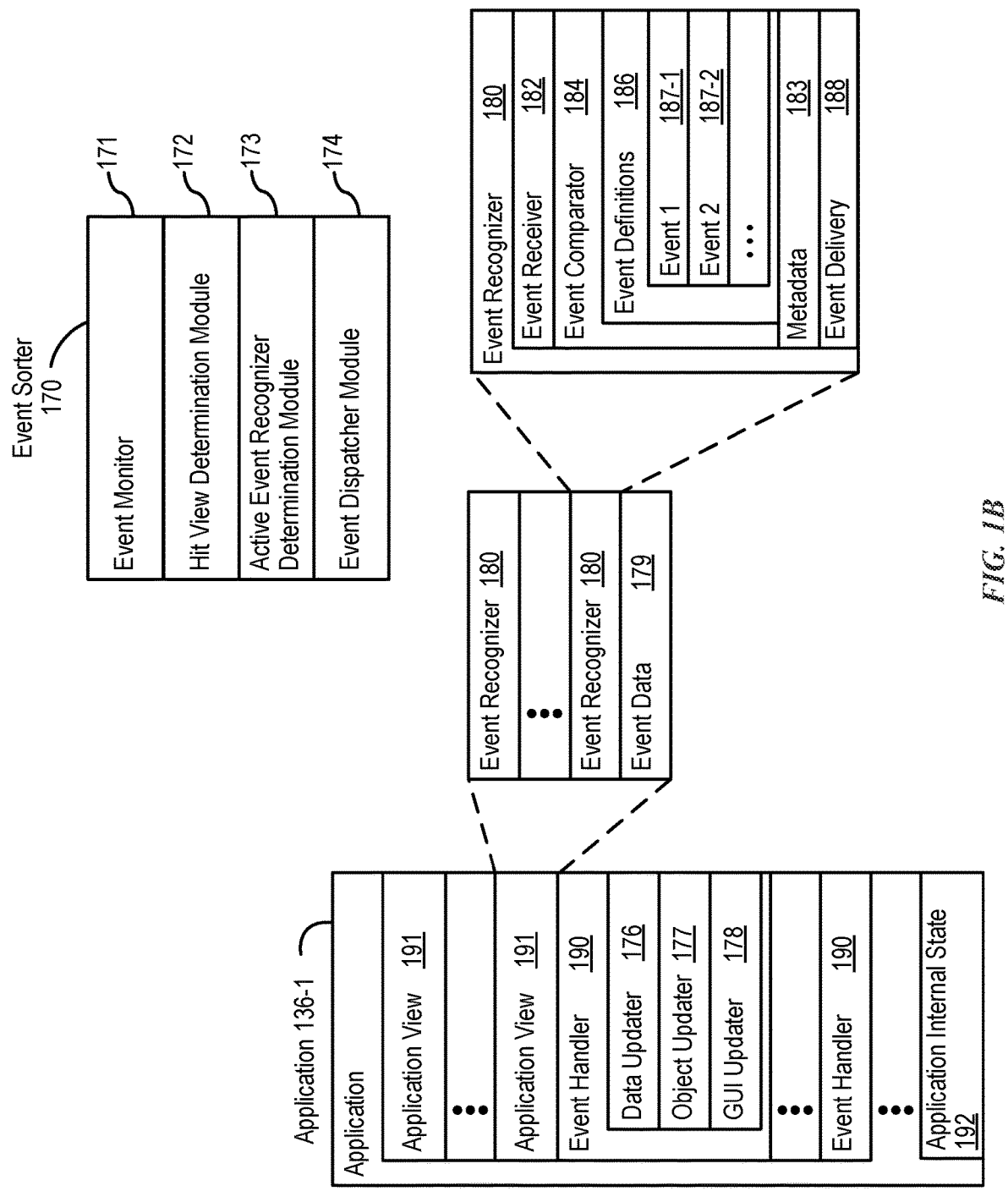
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predefined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
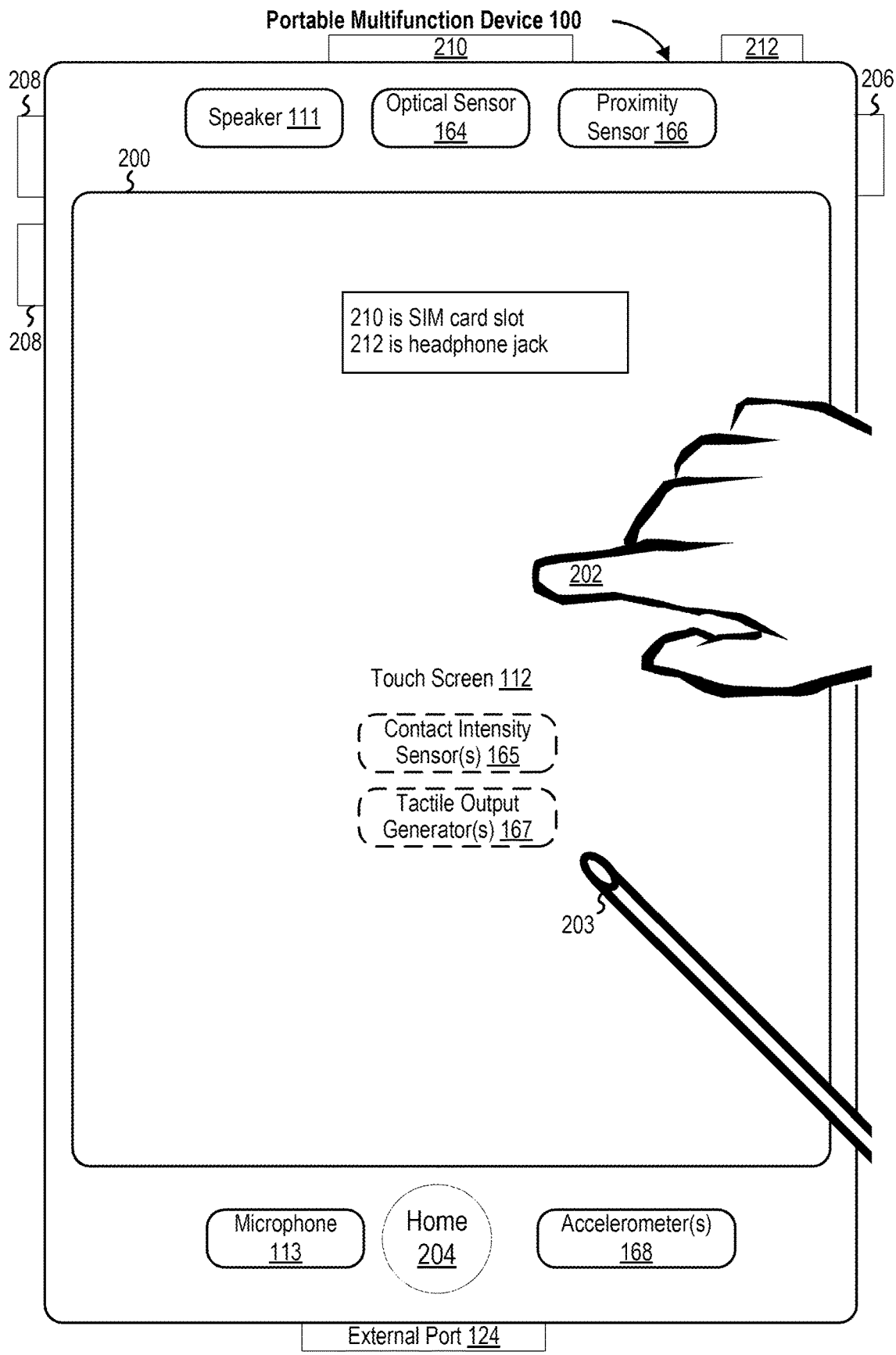
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
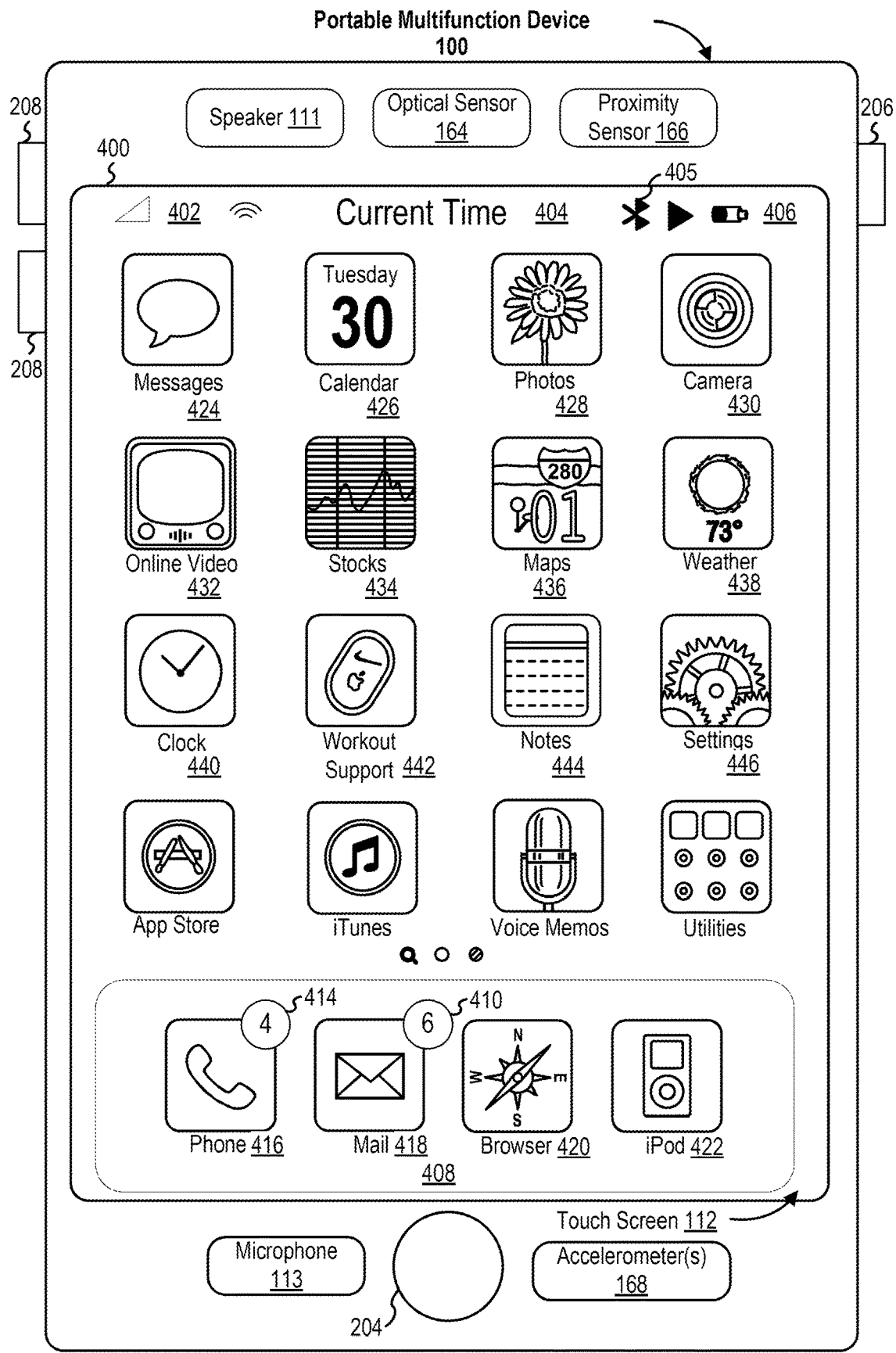
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
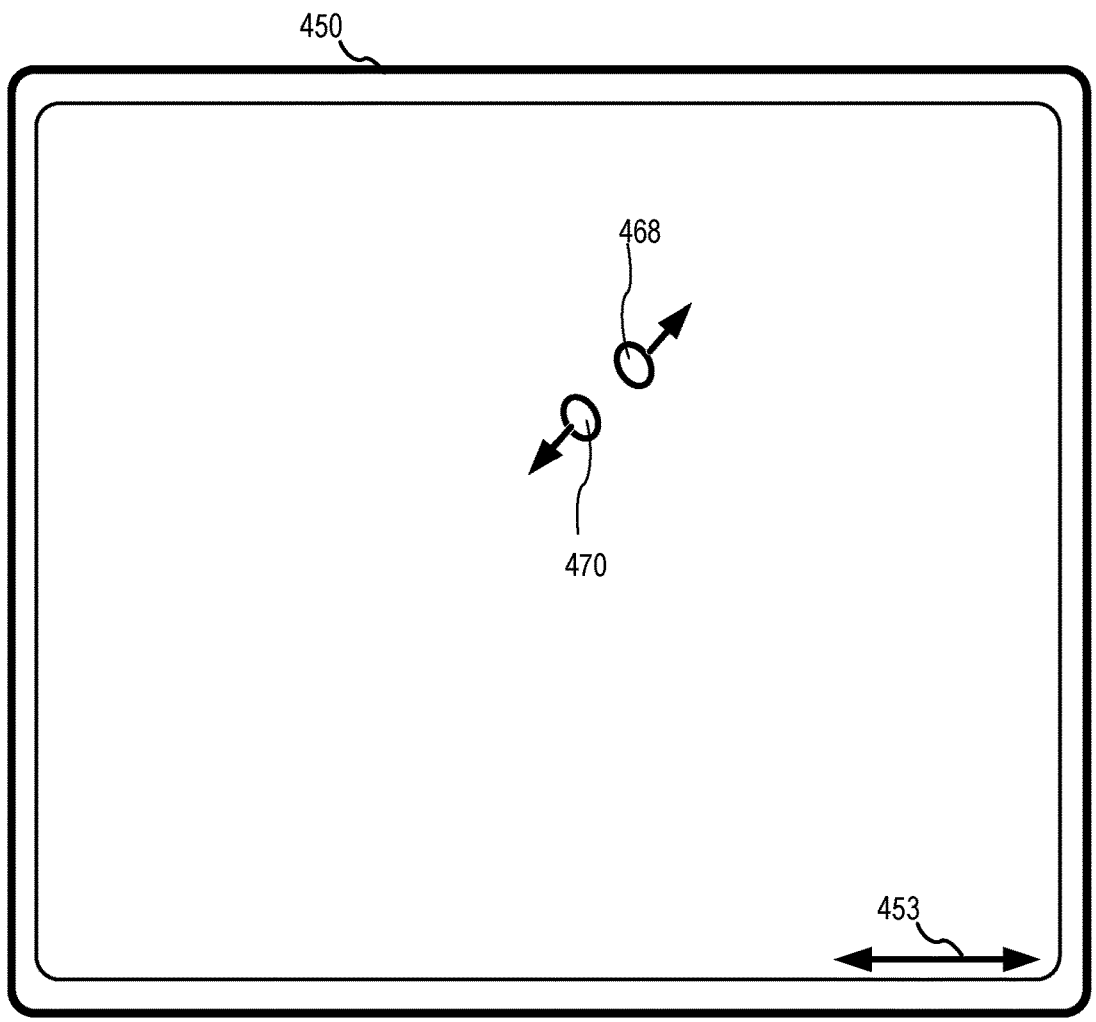
FIG. 4B illustrates an exemplary user interface for a multifunction device with a touch-sensitive surface that is separate from the display in accordance with some embodiments.
Figure 4B:
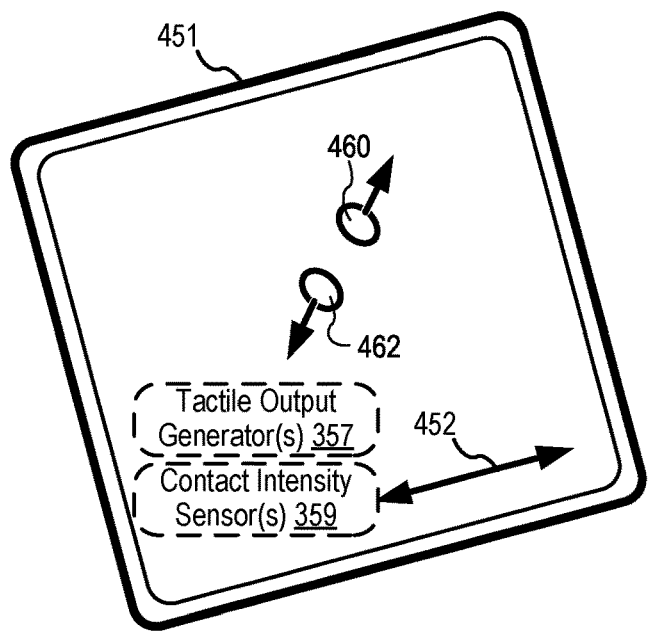

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
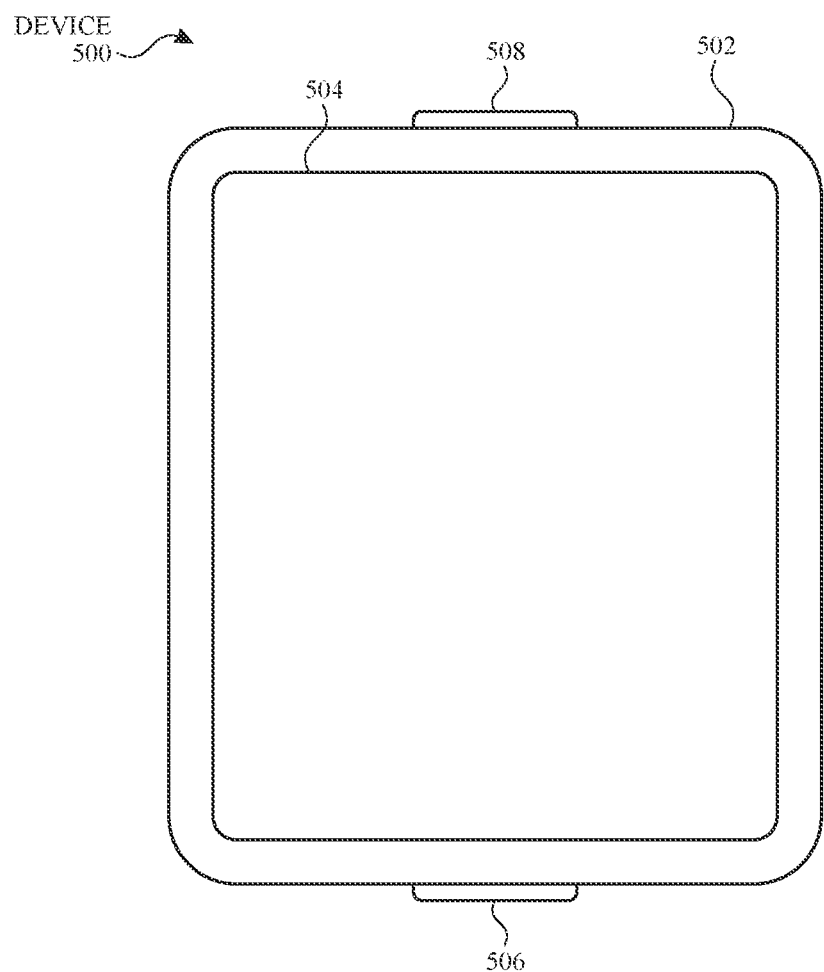
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
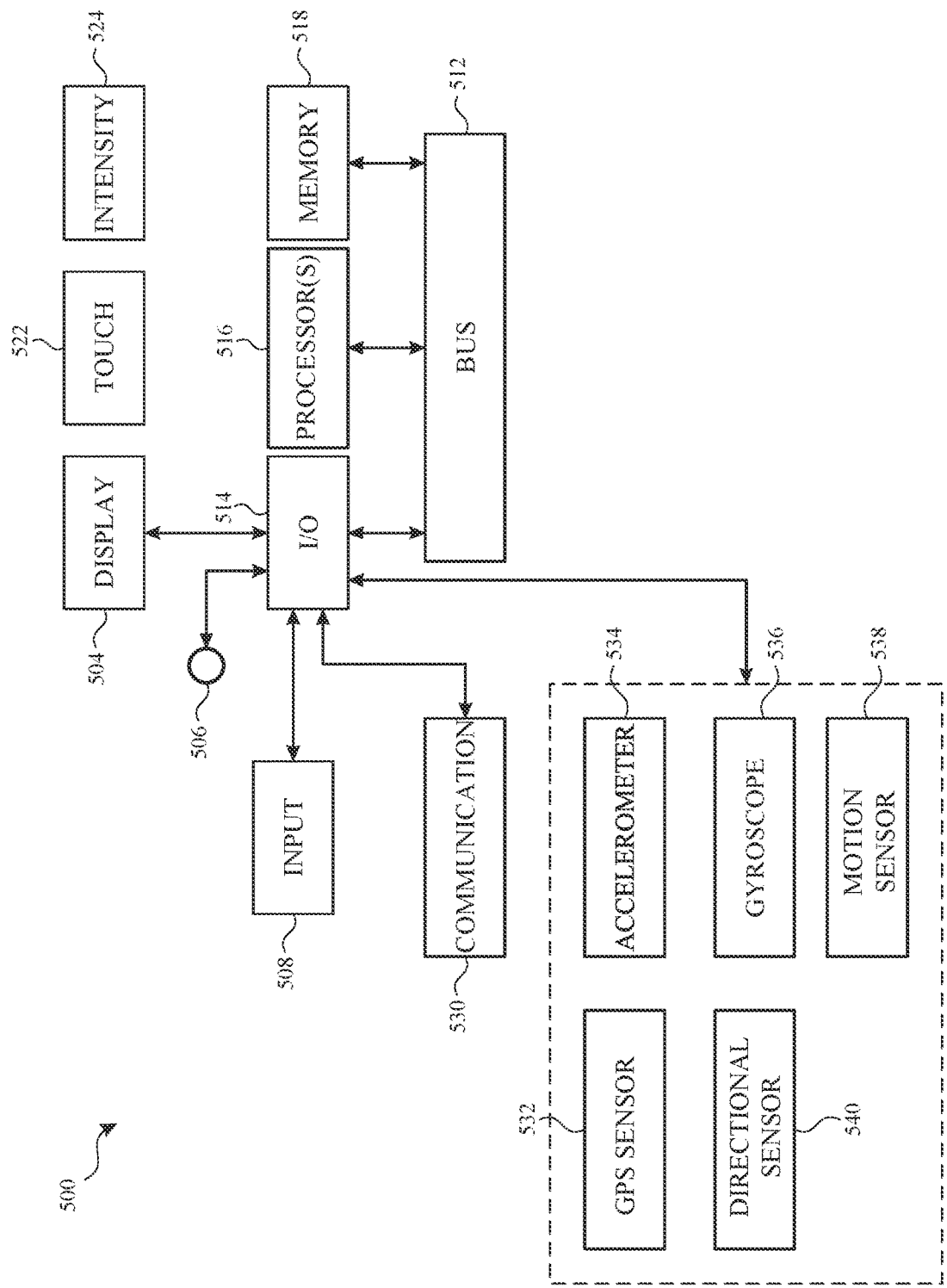
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800-1200 (FIGS. 8A-8B and 12A-12C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments for providing context-specific user interfaces and associated processes that are implemented on an electronic device, such as portable multifunction device 100, device 300, or device 500.

The following examples illustrate exemplary embodiments of context-specific user interfaces. Described herein are concepts related to interactive and/or customizable context-specific user interfaces. The context-specific user interfaces described herein are, optionally, editable in a number of ways. A user interface can display or otherwise indicate various types of information (e.g., a current time), and the type(s) of information can be customizable by the user according to some embodiments. A user interface can include aspects such as colors, density of display, and complications (or lack of complications) that are also customizable. As used here, consistent with its accepted meaning in art, a complication refers to any clock face feature other than those used to indicate the hours and minutes of a time (e.g., clock hands or hour/minute indications). Complications can provide different types of information to a user, such as data obtained from an application, and the information conveyed to a user by a complication is also customizable, as described below. In some embodiments, a complication also serves as an affordance for launching an application. Additional descriptions of context-specific user interfaces, as well as features thereof and techniques related thereto (e.g., editing and/or selecting context-specific user interfaces), are found in International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; and International Patent Application Serial No. PCT/US2015/034607, titled "Context Specific User Interfaces," filed Jun. 7, 2015, published as WIPO Publication No. WO/2016/022205; each of which is incorporated by reference herein in its entirety.

FIGS. 6A-6E illustrate user interfaces for indicating time on device 600 (e.g., device 100, 300, or 500) in accordance with some embodiments. Device 600 has display 602. In some embodiments, display 602 is a touch-sensitive display or other display device capable of displaying or presenting graphical content. In some embodiments, device 600 includes a rotatable and depressible input mechanism 604 and a button 606. It should be recognized that the input mechanisms (e.g., mechanism 604 and button 606) are merely examples of potential mechanisms that can be included in device 600.

Figure 6A:
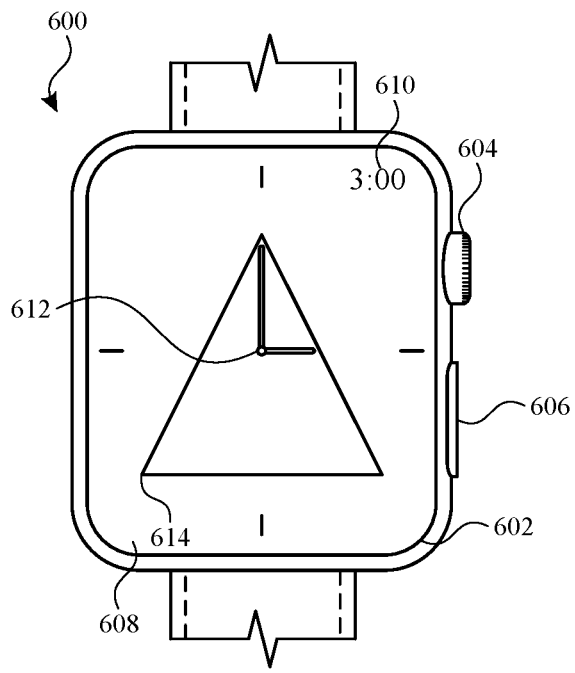
FIGS. 6A-6E illustrate context-specific user interfaces in accordance with some embodiments.

FIGS. 6A-6D depict watch user interface 608 changing based on a current time. In FIGS. 6A-6D, watch user interface 608 includes digital indication of time 610 and analog indication of time 612. The digital and analog indications of time both indicate the current time of the day (e.g., as measured by device 600) (e.g., 3:00 as depicted in FIG. 6A) and update with the passage of time.

As depicted in FIGS. 6A-6D, digital indication of time 610 is located in the upper right corner of watch user interface 608. In some embodiments, digital indication of time 610 is displayed at other locations on watch user interface 608 (e.g., bottom right, top center, within first graphical object 614, etc.). Digital indication of time 610 includes a representation of a digital clock with a numerical indication of an hour value (e.g., 3 as depicted in FIG. 6A) and a numerical indication of a minute value (e.g., 00 as depicted in FIG. 6A). In some embodiments, digital indication of time 610 indicates the current time in a different way than illustrated in FIGS. 6A-6D (e.g., hours alone, minutes alone, seconds alone, hours with minutes and seconds). In some embodiments, digital indication of time 610 is not displayed on watch user interface 608.

As depicted in FIGS. 6A-6D, analog indication of time 612 is located at approximately the center of watch user interface 608 and within first graphical object 614. In some embodiments, analog indication of time 612 is displayed at other locations on watch user interface 608 (e.g., bottom right, top center, outside (or partially outside) of first graphical object 614, etc.). Analog indication of time 612 includes a minute hand indicating a minute value (e.g., 00 as depicted in FIG. 6A) and an hour hand indicating an hour value (e.g., 3 as depicted in FIG. 6A). The minute and hour hand indicate their respective values based on their angular position relative to display 602 or relative to portions of watch user interface 608 (e.g., displayed tick marks, a dial, or bezel markings). In some embodiments, analog indication of time 612 indicates the current time in a different way than illustrated in FIGS. 6A-6D (e.g., hour hand only, hour hand in addition to a minute hand, minute hand only, hour hand in addition to a minute hand and a second hand, hour and in addition to a second hand, or second hand only). In some embodiments, analog indication of time 612 is not displayed on watch user interface 608 (e.g., FIG. 6E).

Device 600 updates the appearance of objects on watch user interface 608 based on a current time (as further discussed below), which provides an additional indication of the current time when presented with digital indication of time 610 and/or analog indication of time 612. The user interfaces depicted in FIGS. 6A-6E are used to illustrate an embodiment covering the processes described below, including method 800 in FIGS. 8A-8B.

In FIG. 6A, device 600 displays watch user interface 608 via display 602 at a current time of 3:00. Watch user interface 608 as depicted in FIG. 6A includes first graphical object 614 (e.g., a triangle) to indicate the current time (e.g., the 3 o'clock hour, as depicted in FIG. 6A). In some embodiments, first graphical object 614 is a different geometric shape than illustrated in FIG. 6A, such as a square, pentagon, hexagon, or the like. While illustrated as a single object in FIG. 6A, it should be recognized that first graphical object 614 can include multiple shapes or objects (e.g., a square in addition to a triangle, a pair of hands, a tree with a shadow, a mandala shape, a zodiac sign or other astrological symbol, a linguistic symbol or character, etc.). In some embodiments, first graphical object 614 includes a character user interface object. A character user interface object includes any representation of a character, for example a realistic figure or anthropomorphized character. In some embodiments, a character includes a cartoon figure. In some embodiments, a character includes a human, animal (e.g., a rat, ox, tiger, rabbit, dragon, snake, horse, sheep, monkey, rooster, dog, pig, lion, dragon, etc.), plant, organism, non-living object, or portion thereof. In some embodiments, a character user interface object includes other objects (e.g., a cartoon pushing a lawnmower, a man or woman holding a sign, a dragon breathing fire, etc.).

As discussed above, the appearance of first graphical object 614 provides the user of device 600 with an indication of the current time of day. For example, the triangular appearance of first graphical object 614 indicates to the user of device 600 that the hour value corresponding to the current time as depicted in FIG. 6A is three. In some embodiments, the appearance of first graphical object 614 indicates a unit of time other than hours (e.g., minutes, seconds, days, etc.).

An aspect of the appearance of first graphical object 614, as illustrated in FIG. 6A, relates to a numerical value (e.g., first graphical object 614 has three sides). In some embodiments, the appearance of first graphical object 614 does not literally relate to a numerical value (e.g., a user unfamiliar with the device is not readily able to read, interpret, or otherwise infer a specific numerical value associated with the first graphical object or an aspect of the appearance of the first graphical object). For example, in some embodiments, first graphical object 614 does not include one or more symbols with a physical or linguistic association with a numeric value (e.g., the graphical object does not, without additional context, represent or express a numerical value).

In some embodiments, the user of device 600 learns the corresponding numerical and temporal meaning of graphical objects through use of watch user interface 608. For example, consider an embodiment where first graphical object 614 is a cow rather than an object with a three-sided appearance. In such an embodiment, a new user of watch user interface 608 would not recognize the cow as having a meaning associated with a particular numerical value. However, as the user of watch user interface 608 gains experience with watch user interface 608, the user would readily begin to associate the cow-shaped graphical object with the 3 o'clock hour, if the cow-shaped graphical object appeared on watch user interface 608 every day from 3:00 until 3:59, and only appeared during that period. As a result, after acquiring familiarity with watch user interface 608, the user of watch user interface 608 is able to efficiently resolve the appearance of first graphical object 614 into a corresponding indication of time.

Figure 6B:
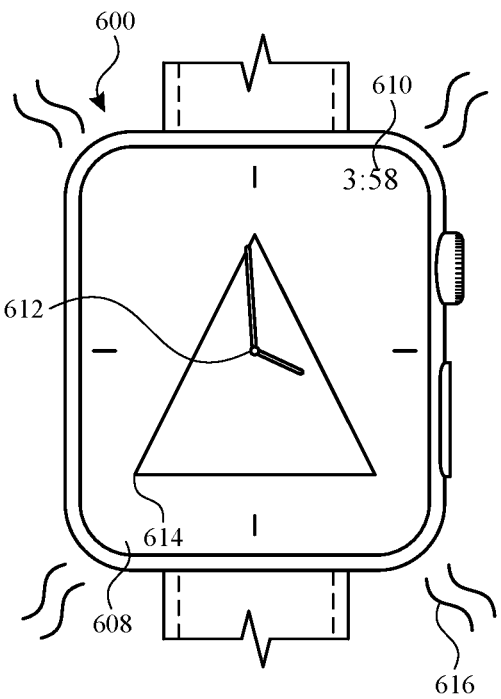

FIG. 6B illustrates watch user interface 608 at a current time of 3:58 (e.g., after 58 minutes have elapsed since the device 600 displayed watch user interface 608 as depicted in FIG. 6A). Compared to FIG. 6A, digital indication of time 610 and analog indication of time 612 have updated to reflect the current time, and device 600 continues to display first graphical object 614 (e.g., a triangle) because the current time as depicted in FIG. 6B remains within the 3 o'clock hour. While displaying watch user interface 608 at 3:58, device 600 generates a tactile output 616 to indicate to the user of device 600 that an hour boundary is approaching (e.g., the boundary between the 3 o'clock hour and the 4 o'clock hour is within two minutes). In some embodiments, device 600 generates tactile output 616 in response to the current time being a predetermined time (e.g., the current time is a predetermined amount of time (e.g., one minute) before a predetermined time (e.g., 4:00)). In some embodiments, tactile output 616 is replaced with or accompanied by one or more additional alerts such as an audible alert or visual indicator. In some embodiments, device 600 generates tactile output after 4:00 to indicate to the user of device 600 that an hour boundary is currently passing or has recently passed. In some embodiments, device 600 generates tactile output 616 in response to the current time being a predetermined time (e.g., the current time is a predetermined amount of time (e.g., one minute) after a predetermined time (e.g., 4:00)).

Figure 6C:
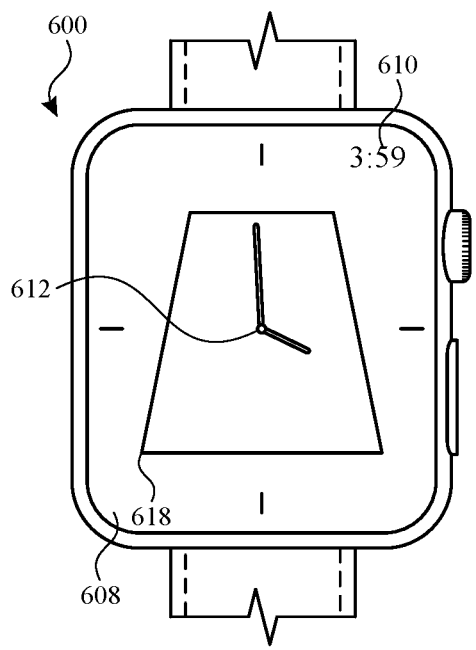

After generating tactile output 616, device 600 initiates an animation. In some embodiments, device 600 initiates an animation in response tactile output 616. In some embodiments, device 600 initiates an animation in response to the current time being a predetermined time (e.g., the current time is a predetermined amount of time (e.g., one minute) before or after device 600 generates tactile output 616). FIG. 6C depicts a frame of an exemplary animation. The frame depicted in FIG. 6C includes transitional graphical object 618, which is a visual blend of first graphical object 614 (representing the outgoing 3 o'clock hour) and second graphical object 620 (representing the incoming 4 o'clock hour, see FIG. 6D). As illustrated in FIG. 6C, transitional graphical object 618 combines features of first graphical object 614 and features of second graphical object 620.

In some embodiments, device 600 displays transitional graphical object 618 as part of a transition animation illustrating the gradual transformation of first graphical object 614 into second graphical object 620 (e.g., an animation shows the transition from a triangle to a square). In some embodiments, a transition animation includes at least an initial frame including first graphical object 614 without second graphical object 620, a final frame including second graphical object 620 without first graphical object 614, and an intermediate frame (e.g., occurring after the initial frame and before the final frame) including first graphical object 614 and second graphical object 620 (or an object representing a combination of first graphical object 614 and second graphical object 620 (e.g., transitional graphical object 618).

In some embodiments, an animation occurs over a fixed period of time (e.g., 3:00 to 3:59, 3:50 to 3:59, 3:58 to 4:00, 3:59 to 4:00, etc.). In some embodiments, the duration of the animation is selected (e.g., by device 600) based at least in part on the timing of tactile output 616 relative to a predetermined time (e.g., an upcoming hourly boundary). For example, as illustrated in FIG. 6B, haptic 616 occurs two minutes prior to the 4 o'clock hourly boundary, resulting in device 600 displaying a transition animation with a duration of two minutes or less on watch user interface 608. In some embodiments, the transition animation concludes display on watch user interface 608 prior to passing the upcoming hourly boundary, allowing watch user interface 608 to maintain an accurate depiction of the current time (e.g., providing an animation with a duration longer than two minutes would result in the appearance of second graphical object 620, as illustrated in FIG. 6D, only after the 4 o'clock hourly boundary).

Figure 6D:
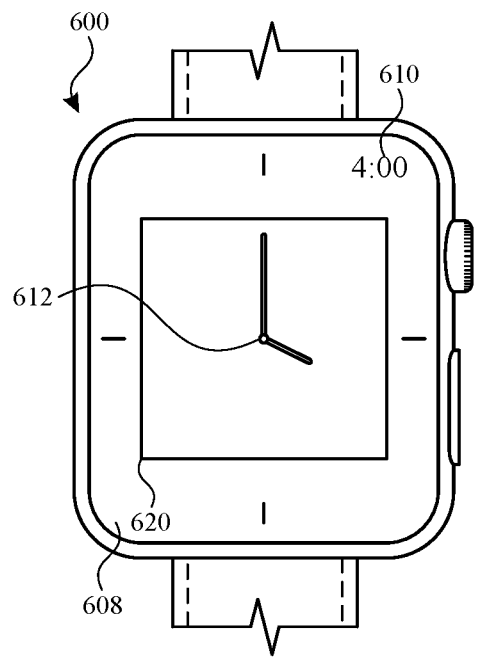

After displaying transitional graphical object 618, device 600 updates watch user interface 608 as depicted in FIG. 6D. In some embodiments, device 600 displays watch user interface 608 as depicted in FIG. 6D in response device 600 ceasing to display transitional graphic 618 (e.g., a transition animation depicting transitional graphical object 618 concludes). In FIG. 6D, digital indication of time 610 and analog indication of time 612 have updated to reflect the current time (4:00); however, compared to FIGS. 6A-6C, watch user interface 608 includes second graphical object 620 (e.g., a square) rather than first graphical object 614 (e.g., a triangle), because the current time has progressed and is within the 4 o'clock hour. In FIG. 6D, the four-sided appearance of second graphical object 620 indicates to the user that the current time is within the 4 o'clock hour.

Figure 6E:
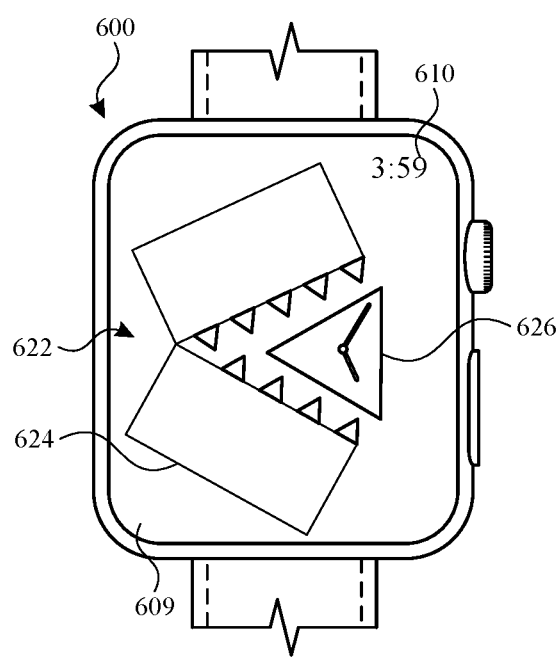

Turning to FIG. 6E, device 600 displays watch user interface 609 on display 602. Watch user interface 622 includes transitional graphical object 622, which illustrates an anthropomorphized representation of second graphical object 620 interacting with (e.g., eating) a representation of first graphical object 614. In some embodiments, interacting includes a graphical object performing an action that affects another graphical object (e.g., a first graphical object pushing a second graphical object). In some embodiments, transitional graphical object 622 is presented (e.g., displayed) in addition to or instead of transitional graphical object 618 discussed above with reference to FIG. 6C.

In contrast to the blended transitional graphical object 618 illustrated in FIG. 6C, transitional graphical object 622 includes first representational object 626 and second representational object 624 (e.g., corresponding to first graphical object 614 and second graphical object 620, respectively).

In some embodiments, representational objects (e.g., first representational object 626 and second representational object 624) vary somewhat in appearance from their respective objects but are otherwise recognizable as their respective objects. In some embodiments, a representational object includes a resized version of the corresponding graphical object (e.g., first representational object 626 is a smaller version of first graphical object 614). In some embodiments, a representational object includes details not present in the graphical object it represents (e.g. second representational object 624 includes teeth). In some embodiments, a representational object does not include details present in the graphical object it represents (e.g., second representational object 624 does not include an indication of time).

The user interfaces depicted in FIGS. 7A-7D illustrate an embodiment covering the processes described below, including method 800 in FIGS. 8A-8B. In particular, FIGS. 7A-7D illustrates an embodiment in which the display of transitional graphical objects is conditional.

Figure 7A:
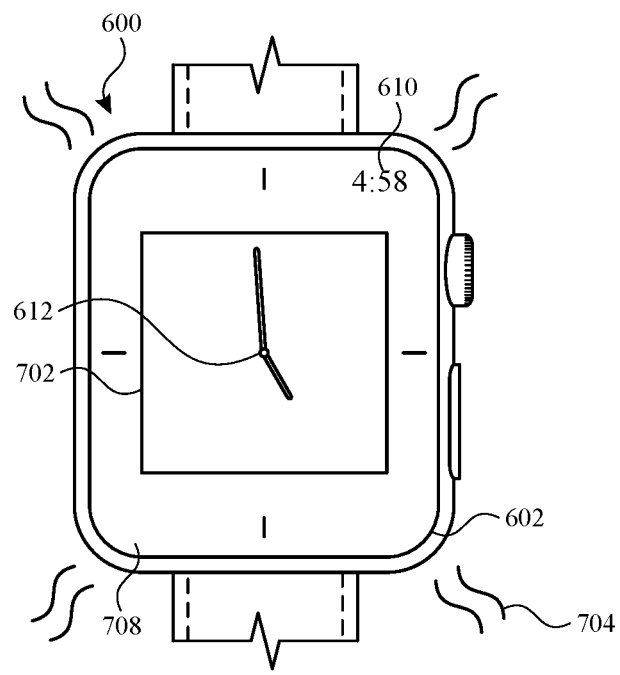
FIGS. 7A-7D illustrate context-specific user interfaces in accordance with some embodiments.
Figure 8B:
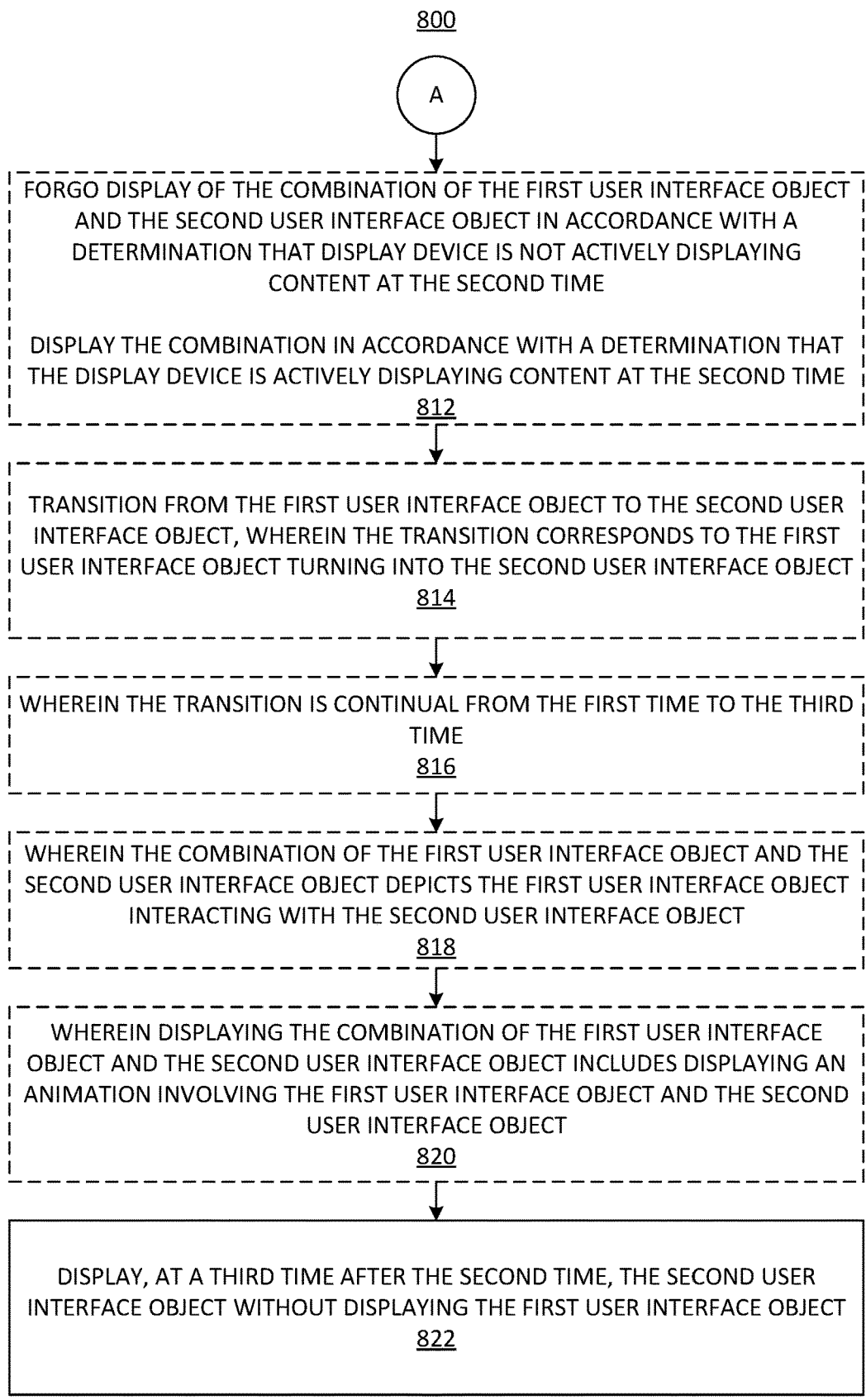

In FIG. 7A, device 600 displays watch user interface 708 on display 602 at a current time of 4:58. While displaying watch user interface 708, device 600 generates tactile output 704 (e.g., device 600 generates tactile output 704 in response to the current time corresponding to a predetermined time). In some embodiments, tactile output 704 is replaced with or accompanied by one or more additional alerts such as an audible alert or visual indicator. Rather than displaying a transitional graphical object along with presenting the haptic (e.g., as depicted in FIGS. 6B and 6C), device 600 continues to display the watch user interface of FIG. 7A until further conditions are satisfied, as discussed below.

Figure 7B:
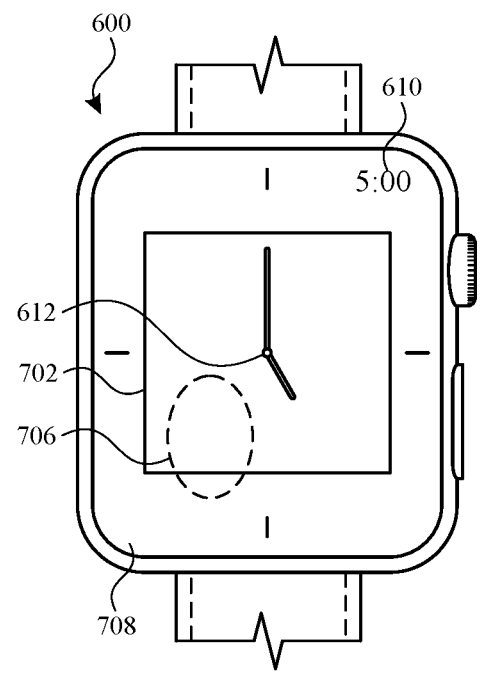

As illustrated by FIG. 7B, after emitting tactile output 704, device detects user input 706 (e.g., a tap gesture). In some embodiments, user input 706 includes one or more inputs associated with a user of the device responding to tactile output 704 (e.g., device 600 receives orientation data from an internal sensor indicating that the user has raised or is raising device 600 into a viewing position, device 600 detects a rotation of rotatable and depressible input mechanism 604, device 600 detects a depression of button 606, etc.).

Figure 7C:
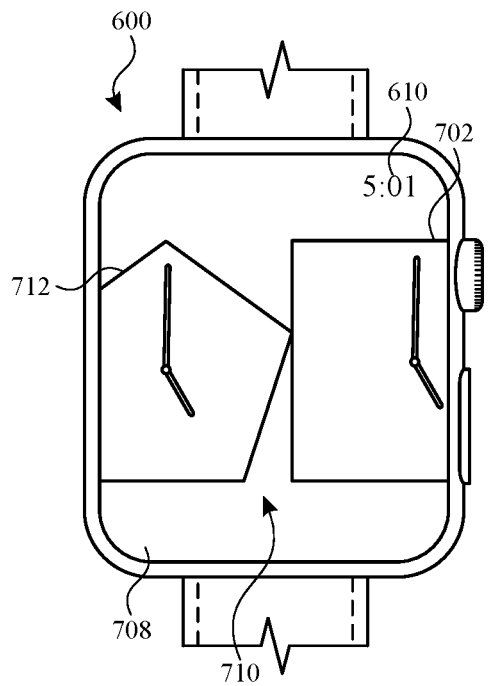

Upon (e.g., in response to) receiving user input 706 within a response interval (e.g., within two minutes of tactile output 704 or alternatively, within 60 seconds of the current time transitioning to a new hour), device 600 displays the watch user interface of FIG. 7C. As illustrated in FIG. 7C, device 600 displays watch user interface 708 with transitional graphical object 710. Transitional graphical object 710 includes a portion of third graphical object 702 (representing the outgoing 4 o'clock hour), and a portion of fourth graphical object 712 (representing the incoming 5 o'clock hour, see FIG. 7D). In some embodiments second graphical object 620 is the same object as third graphical object 702. In some embodiments, transitional graphical object 710 includes representations of objects that are similar in appearance to third graphical object 702 and fourth graphical object 712 (e.g., resized versions of the graphical objects, representations of the graphical objects that include more visual details, simplified representations of the graphical objects that include less visual details, or other representations that are recognizable by the user of device 600 as the respective graphical objects).

Similar to the discussion above with respect to FIGS. 6C and 6E, in some embodiments, device 600 displays transitional graphical object 710 as part of a transition animation illustrating the transition between the 4 o'clock hour and the 5 o'clock hour. FIG. 7C illustrates a frame of a transition animation showing third graphical object 702 (e.g., square) being pushed off of the rightmost edge of watch user interface 708 by fourth graphical object 712 (e.g., pentagon). In some embodiments, a transition animation occurs over a fixed period of time (e.g., 4:59 to 5:00, 5:00 to 5:01, 4:59 to 5:02, etc.). In some embodiments, a transition animation includes at least an initial frame including third graphical object 702 without fourth graphical object 712, a final frame including fourth graphical object 712 without third graphical object 702, and an intermediate frame (e.g., occurring after the initial frame and before the final frame) including at least a portion of third graphical object 702 and at least a portion of fourth graphical object 712.

In some embodiments, device 600 determines the duration of a transition animation based in part on a time at which device 600 receives user input gesture 706 relative to a predetermined time (e.g., an upcoming hourly boundary). In some embodiments, a duration is determined based upon the difference between the time at which device 600 receives user input gesture 706 and a predetermined time (e.g., an upcoming hourly boundary). In some embodiments, a duration is determined based upon the difference between the time at which device 600 receives user input gesture 706 and the minute past an hourly boundary (e.g., 5:01). In this manner, device 600 determines a shorter animation duration for a user input received closer (e.g., 4:59) to an hourly boundary (e.g., 5:00) and a longer animation duration for a user input gesture received further (4:58) from the hourly 5:00 hourly boundary. In some embodiments, device 600 determines a duration of a transition animation such that the transition animation will complete prior to an event (e.g., the current time reaching the next hourly boundary, the current time reaching a minute past the next hourly boundary).

In some embodiments, device 600 determines the duration of a transition animation based in part on a time at which device 600 emits haptic 704 relative to an hourly boundary (e.g., the difference between the current time at which device 600 emits haptic 704 and the upcoming hourly boundary). For example, if device emits haptic 704 at 4:58 as illustrated in FIG. 7A, device 600 sets the duration of a transition animation to two minutes. In some embodiments, a duration of a transition animation is dynamically adjusted by device 600, which selects a subset of available animation frames. In some embodiments, a duration of a transition animation is dynamically adjusted by modifying an animation playback rate (e.g., the number of frames displayed in a given period of time) associated with a respective transition animation.

Figure 7D:
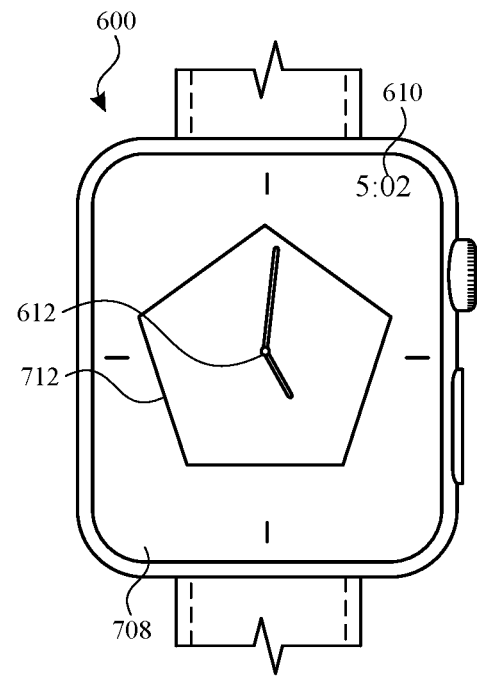

In contrast, if device 600 does not receive user input 706 (or other device inputs associated with a user of the device responding to tactile output 704 as described above) within the response interval (e.g., within two minutes of the alert), device 600 forgoes displaying transitional graphical object 710 or any associated animation (e.g., device 600 displays watch user interface 708 with fourth graphical object 712 as shown in FIG. 7D without displaying transitional graphic 710).

In some embodiments, device 600 displays the user interface of FIG. 7C (including transitional graphical object 710) upon determining (e.g., by device 600) that display 602 is in an active state, and forgoes displaying transitional graphical object 710 or any associated animation upon determining that display 602 is in a non-active state. In some embodiments, determining display 602 is in an active state includes determining by device 600 that a user is viewing display 602. In some embodiments determining display 602 is in an active state includes determining by device 600 that display 602 is displaying content. In some embodiments, determining that display 602 is in a non-active state includes determining by device 600 that a user is not viewing display 602. In some embodiments, determining that display 602 is in a non-active state includes determining by device 600 that display 602 is not displaying content.

After displaying transitional graphical object 710, device 600 updates watch user interface 708 as depicted in FIG. 7D. In FIG. 7D, digital indication of time 610 and analog indication of time 612 have updated to reflect the current time (5:02) and device 600 displays fourth graphical object 712 (e.g., pentagon) rather than third graphical object 702 (e.g., square) because the current time has progressed and is within the 5 o'clock hour. In FIG. 7D, the five-sided appearance of third graphical object 712 indicates to the user that the current time is within the 5 o'clock hour.

FIGS. 8A-8B are a flow diagram illustrating method 800 for indicating a current time using an electronic device in accordance with some embodiments. Method 800 is performed at a device (e.g., 100, 300, 500, 600) with a display device (e.g. 602). Some operations in method 800 are, optionally, combined, the orders of some operations are, optionally, changed, and some operations are, optionally, omitted. In one example, method 800 relates to having (1) one object (e.g., a dragon) during a unit of time (e.g., one hour) indicate a current time (e.g., 10:00), (2) a point in time within the unit of time (e.g., 10:30) where a combination of objects (e.g., a dragon eating a rat, 3 turning into 4, etc.) are displayed, and (3) objects switch when switching between units of time (e.g., from the 10 o'clock hour to the 11 o'clock hour).

As described below, method 800 provides a technique for dynamically modifying a user interface object based on a current time. The method provides a user with an easily decipherable visual indication that quickly draws the user's attention to relevant information (e.g., a current hour measured by a device) and/or reduces the cognitive burden on a user for identifying a state of a device (e.g., a current time as measured by a device), thereby creating a more efficient human-machine interface. Providing improved visual feedback to the user enhances the operability of the device and makes the user-device interface more efficient (e.g., by helping the user to quickly resolve the current time, the user does not need to spend as much time interacting with the device) which, additionally, reduces power usage and improves battery life of the device by enabling the user to use the device more efficiently.

At 802, the device (e.g., 600) displays, via the display device (e.g., 602) at a first time (e.g., 10:00), a first user interface object (e.g., 614 in FIG. 6A or 702 in FIG. 7A) without displaying a second user interface object (e.g., 620 in FIG. 6D or 712 in FIG. 7D), where the second user interface object is different from the first user interface object, and where the first user interface object represents a first period of time that includes the first time (e.g., the first user interface object specifically represents the one hour period of time from 10:00 to (but not including) 11:00). In some embodiments, the first and/or second user interface object is a character user interface object.

At 804, the device displays, via the display device at a second time after the first time and within the first period of time (e.g., 10:59), a combination (e.g., 618 in FIG. 6C, 622 in FIG. 6E, or 710 in FIG. 7C) of the first user interface object and the second user interface object (e.g., simultaneous display of both, a gradual transition from one to other, or an animation of one turning into other) (in some examples, the combination is displayed in response to user interaction, such as a wrist raise or tap). In some embodiments, displaying the combination occurs in accordance with a determination that the user input is received (806) within a threshold of time after outputting the alert (804).

In some embodiments, the combination occurs at or near an hour boundary (e.g., a time prior to the hour boundary providing enough time for the combination to finish before the hour boundary). In some embodiments, a haptic (e.g., 616 in FIG. 6B or 704 in FIG. 7A) is played after or near the hour boundary, indicating that a user can look at the device to see an animation for the hour boundary (e.g., an animation is played, in whole, if user input is received within a window of time after the haptic). In some embodiments, an alert (e.g., audio, visual indication, or haptic) is output at the hour boundary (e.g., a boundary between units of time). In some embodiments, if a user responds within a time threshold (e.g., the device detects a tap input or a wrist raise), an animation is displayed (e.g., 708 in FIG. 7C illustrates a frame of an animation). In some embodiments, if a user responds after the time threshold (e.g., the device detects a tap input or wrist raise), an indication of time is displayed without displaying the animation. For example, at 806, the device, before the second time and within the first period of time, outputs an alert (e.g., 704) (e.g., haptic feedback).

At 808, in some embodiments, the device receives user input (e.g., 706) (e.g., a tap or wrist raise), wherein displaying the combination occurs in accordance with a determination that the user input is received within a threshold of time after the alert.

At 810, in some embodiments, the device, in response to receiving the user input (806) and in accordance with a determination that the user input is not received within the threshold, forgoes display, via the display device, of the combination of the first user interface object and the second user interface object. Determining whether to display information (e.g., a transitional graphical object including the combination of the first user interface object and the second user interface object) based receiving a timely user input response to an alert, emphasizes to a user that an easily decipherable visual indication of relevant information (e.g., the current hour measured by the watch) is only temporarily available. Providing improved user feedback regarding the state of the device (e.g., the availability of data) enhances the operability of the device and makes the user-device interface more efficient (e.g., by allowing the user to quickly resolve the current time when additional visual aids are available, the user does not need to spend as much time interacting with the device) which, additionally, reduces power usage and improves battery life of the device by enabling the user to use the device more efficiently.

In some embodiments, an animation is displayed at a time boundary if a user is viewing the device (e.g., watch). For example, displaying the combination occurs in accordance with a determination that the display device is actively displaying content at the second time (e.g., a user is currently looking at her watch). At 812, in some embodiments, in accordance with a determination that the display device is not actively displaying content at the second time, the device forgoes display, via the display device, of the combination of the first user interface object and the second user interface object.

At 814, in some embodiments, the device displays, via the display device, one character turning into another character. For example, the device displays a transition (e.g., 618 in FIG. 6C) from the first user interface object to the second user interface object, where the transition corresponds to the first user interface object turning (e.g., morphing, transforming, or changing) into the second user interface object. In some embodiments, transitioning from the first user interface object to the second user interface object includes an animation beginning with the first user interface object and ending with the second user interface object such that a frame (e.g., as depict by 608 of FIG. 6C) of the animation between the beginning and the ending includes a user interface object that is based on the first user interface object and the second user interface object, where the frame does not include solely the first user interface object or solely the second user interface object.

At 816, in some embodiments, the device displays, via the display device, the combination as a gradual transition (e.g., as depicted by 608 of FIG. 6C). For example, the transitioning is continual (e.g., a character starts transitioning at 10:00 and continues to transition throughout the hour) from the first time (e.g., 10:00) to the third time (e.g., 11:00). Gradually transitioning a user interface object into another user interface object provides the user with an easily decipherable visual indication that quickly draws the user attention to relevant information (e.g., the current hour measured by the watch). Providing improved visual feedback to the user enhances the operability of the device and makes the user-device interface more efficient (e.g., by helping the user to quickly resolve the current time, the user does not need to spend as much time interacting with the device) which, additionally, reduces power usage and improves battery life of the device by enabling the user to use the device more efficiently.

At 818, in some embodiments, the device displays, via the display device, one character interacting with another character. For example, the combination of the first user interface object and the second user interface object depicts the first user interface object interacting (e.g., 622 in FIG. 6E) (e.g., a dragon eats a rat, or a square eats a triangle) with the second user interface object. In some embodiments, the combination includes an animation (e.g., the first user interface object physically moving and/or changing appearance), and the animation includes a frame with at least a portion of the first user interface object and at least a portion of the second user interface object.

At 820, in some embodiments, the device displays, via the display device, a transition animation at a boundary (e.g., 11:00), where the animation involves both characters (e.g., as depict by 710 in FIG. 7C). For example, displaying the combination of the first user interface object and the second user interface object includes displaying an animation involving the first user interface object and the second user interface object (e.g., 710 in FIG. 7C). In some embodiments, the animation includes a frame with the first user interface object and the second user interface object (e.g., the first user interface object pushing the second user interface object such that the second user interface object is eventually no longer displayed).

At 822, the device displays, via the display device and at a third time (e.g., 11:00) after the second time (e.g., 10:59), the second user interface object without displaying the first user interface object, where the second user interface object represents a second period of time that includes the third time (e.g., 11:00). In some embodiments, the first period of time and the second period of time are mutually exclusive.

Note that details of the processes described above with respect to method 800 (e.g., FIGS. 8A-8B) are also applicable in an analogous manner to the methods described below. For example, method 1200 optionally includes one or more of the characteristics of the various methods described below with reference to method 800. For example, the techniques for illustrating the transition from a first object to a second object (e.g., via a transition animation) discussed in method 800 can be used in method 1200 to illustrate graphical objects transitioning from a first appearance to a second appearance at hourly boundaries. For brevity, these details are not repeated below.

FIGS. 9A-9E illustrate user interfaces for indicating time on device 600 (as described above) in accordance with some embodiments. The user interfaces depicted in these figures are used to illustrate an example covering the processes described below, including the processes in FIGS. 12A-12C.

Figure 9A:
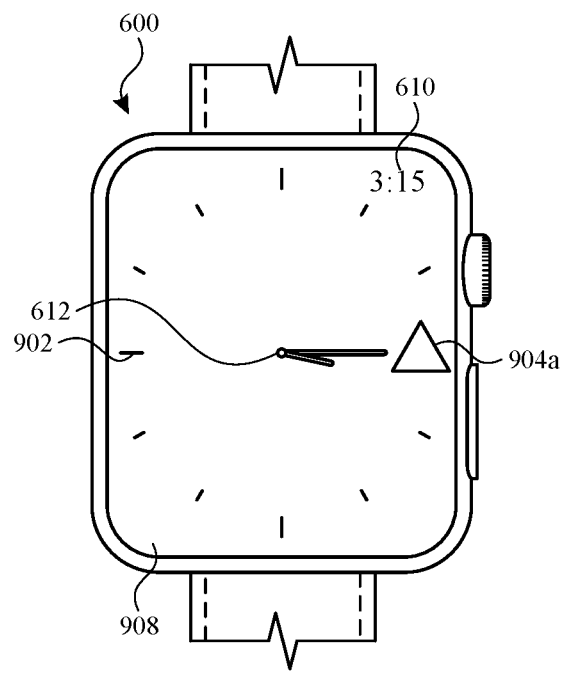
FIGS. 9A-9E illustrate context-specific user interfaces in accordance with some embodiments.

In FIG. 9A, device 600 displays watch user interface 908 via display 602 at a current time of 3:15. Watch user interface 908 includes digital indication of time 610 and analog indication of time 612 (as describe above), each indicating a current time of 3:15. Watch user interface 908 also includes graphical object 904 which indicates a current time of day based at least in part on its appearance (e.g., shape) and location on watch user interface 908. In some embodiments, the appearance represents a first unit of time (e.g., hours) and does not represent a second unit of time (e.g., minutes) such that the appearance alone only indicates a current time according to the first unit of time and does not indicate a time according to the second unit of time. Similarly, in some embodiments, the location represents the second unit of time (e.g., minutes) and does not represent the first unit of time (e.g., hours) such that the location alone only indicates a current time according to the second unit of time and does not indicate a time according to the first unit of time.

As illustrated in FIG. 9A, graphical object 904 is a triangle to indicate the current hour (i.e., 3 o'clock hour). In some embodiments, graphical object 904 is a different geometric shape than illustrated, such as square, pentagon, hexagon, or the like. While illustrated as a single object, in some embodiments, graphical object 904 includes multiple shapes or objects (e.g., a square in addition to a triangle, a pair of hands, a tree with a shadow, a mandala shape, a zodiac sign or other astrological symbol, a linguistic symbol or character, etc.). In some embodiments, graphical object 904 includes a character user interface object. In some embodiments, a character user interface object includes a representation of a character, for example a realistic or anthropomorphized character. In some embodiments, a character includes a cartoon figure. In some embodiments, a character includes a human, animal (e.g., a rat, ox, tiger, rabbit, dragon, snake, horse, sheep, monkey, rooster, dog, pig, lion, dragon, etc.), plant, organism, non-living object, or portion thereof. In some embodiments, a character user interface object includes other objects (e.g., a cartoon pushing a lawnmower, a woman holding a sign, a man holding a briefcase, a dragon breathing fire, etc.).

As discussed above, the appearance of graphical object 904 provides the user of device 600 with an indication of the current time of day. For example, the triangular shape (i.e., three-sided appearance) of graphical object 904a as illustrated in FIG. 9A indicates to the user of device 600 that the hour value corresponding to the current time is three (e.g., the time is in the range 3:00-3:59). In some embodiments, the appearance of graphical object 904 indicates a unit of time other than hours (e.g., minutes, seconds, days, etc.).

An aspect of the appearance of graphical object 904*a*, as illustrated in FIG. 9A, relates to a numerical value (e.g., graphical object 904 has three sides). In some embodiments, no aspect of the appearance of graphical object 904 literally relates to a numerical value (e.g., a user unfamiliar with the device is not readily able to read, interpret, or otherwise infer a specific numerical value associated with the graphical object or an aspect of the appearance of the graphical object). For example, in some embodiments, graphical object 904 does not include one or more symbols with a physical or linguistic association with a numerical value (e.g., the graphical object does not, without additional context, represent or express a numerical value).

In some embodiments, the user of device 600 learns the corresponding numerical and temporal meaning of graphical objects through use of watch user interface 908. For example, consider an embodiment where the graphical object 904 is a soccer ball rather than an object with a three-sided appearance. In such an embodiment, a new user of watch user interface 908 would not recognize the soccer ball as having a meaning associated with a particular numerical or temporal value. However, as the user of watch user interface 908 gains experience with watch user interface 908, the user would readily begin to associate the soccer ball-shaped hourly object with the 3 o'clock hour, if the soccer ball-shaped graphical object appeared on watch user interface 908 every day from 3:00 until 3:59, and only appeared during that period. As a result, after acquiring familiarity with watch user interface 908, the user of watch user interface 908 is able to efficiently resolve the appearance of hourly graphical object 904 into a corresponding indication of time.

As discussed above, the location of graphical object 904 on watch user interface 908 provides the user of device 600 with an indication of the current time of day. In FIG. 9A, graphical object 904*a* is located at a position on graphical user interface 908 corresponding to a minute value of fifteen (e.g., 15). In some embodiments, the location of graphical object 904 indicates a unit of time other than minutes (e.g., hours, seconds, days, etc.).

As illustrated in FIG. 9A, watch user interface 908 also includes radial time-scale 902 (e.g. minute and/or hour markers, a dial, or bezel markings). Radial time-scale 902 includes twelve individual markers angularly spaced about a central point on watch user interface 908. Radial time-scale 902 serves as visual reference to users of device 600 in deciphering the time indicated by the location of graphical object 904 on watch user interface 908 (e.g., a user of device 600 interprets the position graphical object 904 relative to the markers). As illustrated in FIG. 9A, starting at a value of zero (e.g., 0) for the marker centered along the top edge of watch user interface 908, successive markers (moving clock wise around watch user interface 908) each represent minute values increasing by 5 (e.g., 5, 10, 15, 20, etc.). In some embodiments, radial time-scale 902 includes more or less than twelve markers (e.g., one, twenty-four, sixty, etc.) to provide varying degrees of precision. However, since users are accustomed to perceiving analog clock faces, a radial time-scale markers is optional, as the relative positioning of objects (e.g., hourly object 904) on an interface resembling a clock indicates an approximate time even without such markings.

While the location of graphical object 904*a*, as illustrated in FIG. 9A, relates to a minute value of 15 according to its position relative to radial time-scale 902, in some embodiments, the location of graphical object 904 does not relate to a numerical value based on its positioning relative any scale. For example, in some embodiments, graphical object 904 is located at a position on watch user 908 that does not readily correspond to a numeric value (e.g., the graphical object does not, without additional context, represent a numerical value).

In some embodiments, the user of device 600 learns the corresponding numerical and temporal meaning of a graphical objects location on watch user interface 908 through use of watch user interface 908. For example, consider an embodiment where graphical object 904 is located at the center of watch user interface 908. In such an embodiment, a new user of watch user interface 908 would not recognize the central location as having a meaning associated with a particular numerical or temporal value. However, as the user of watch user interface 908 gains experience with watch user interface 908, the user would readily begin to associate the central location of the graphical object with the 20$^{th}$ minute of an hour, if graphical object 904 appeared on watch user interface 908 at that location every at twenty minutes past each hour (e.g. 1:20, 2:20, 3:30, etc.). As a result, after acquiring familiarity with watch user interface 908, the user of watch user interface 908 is able to efficiently resolve the location of graphical object 904 into a corresponding indication of time.

Figure 9B:
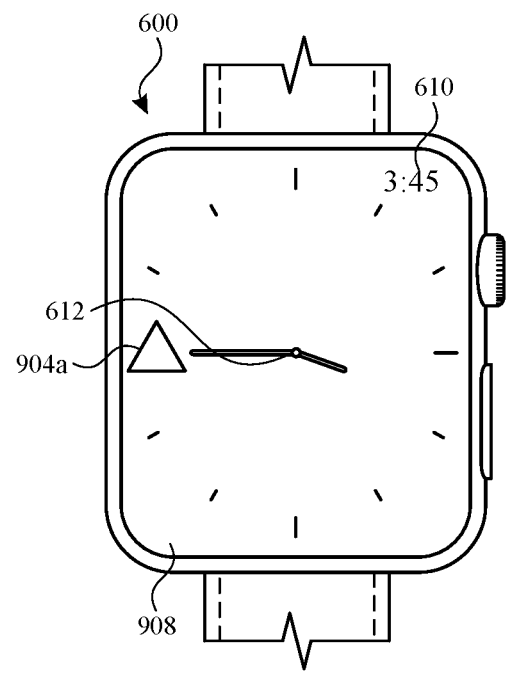

FIG. 9B illustrates watch user interface 908 at a current time of 3:45 (e.g., after 30 minutes have elapsed since device 600 displayed watch user interface 908 as depicted in FIG. 9A). Device 600 displays updated digital and analog indications of time reflecting a current time of 3:45. Graphical object 904*a* remains displayed on watch user interface 908 as a triangle; however, device 600 displays the object at an updated position on watch user interface 908 indicating a current minute value of 45.

Figure 9C:
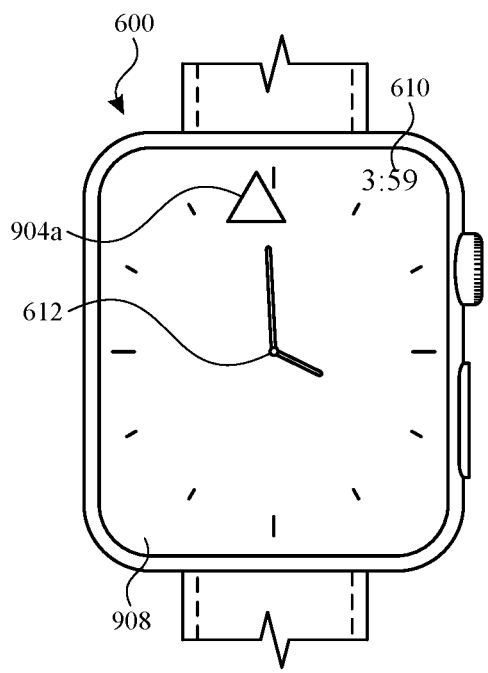

FIG. 9C illustrates watch user interface 908 at a current time of 3:59 (e.g., after 14 minutes have elapsed since device 600 displayed watch user interface 908 as depicted in FIG. 9B). Device 600 displays updated digital and analog indications of time reflecting a current time of 3:59. Graphical object 904*a* remains displayed on watch user interface 908 as a triangle; however, device 600 displays the object at an updated position on watch user interface 908 indicating a current minute value of 59.

Figure 9D:
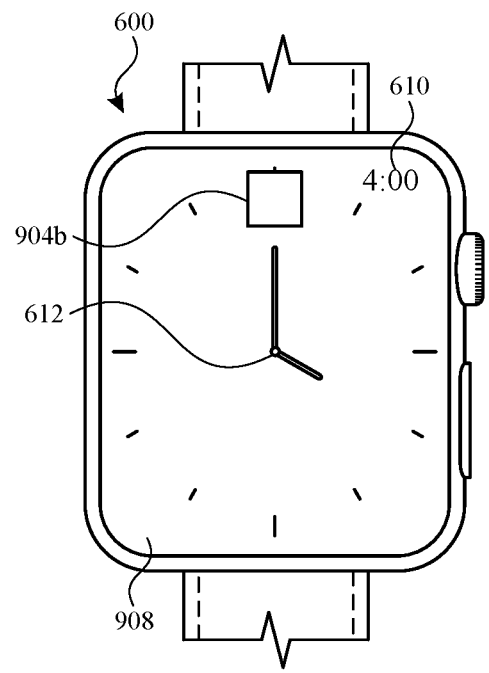

FIG. 9D illustrates watch user interface 908 at a current time of 4:00 (e.g., after one minute has elapsed that device 600 displayed watch user interface 908 as depicted in FIG. 9C). Device 600 displays updated digital and analog indications of time reflecting a current time of 4:00. Device 600 now displays graphical object 904*b* (e.g., the appearance of the graphical object has changed from a triangle to a square) at a position on watch user interface 908 indicating a current minute value of 00.

Figure 9E:
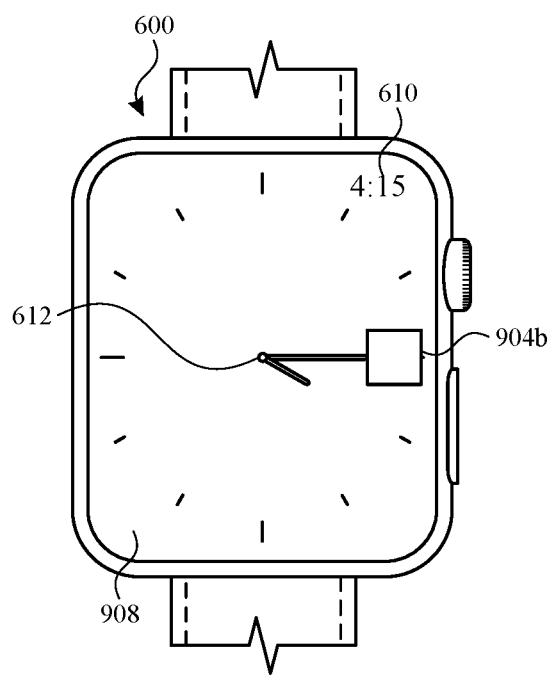

FIG. 9E illustrates watch user interface 908 at a current time of 4:15 (e.g., after 15 minutes have elapsed since device 600 displayed watch user interface 908 as depicted in FIG. 9D). Device 600 displays updated digital and analog indications of time reflecting a current time of 4:15. Device 600 continues to display graphical object 904*b* (e.g. the appearance of the graphical object remains a square, however, device 600 displays the object at an updated position on watch user interface 908 indicating a current minute value of 15.

FIGS. 10A-10G illustrate user interfaces for indicating time on device 600 (as described above) in accordance with some embodiments. The user interfaces depicted in these figures are used to illustrate an example covering the processes described below, including the processes in FIGS. 12A-12C.

Figure 10A:
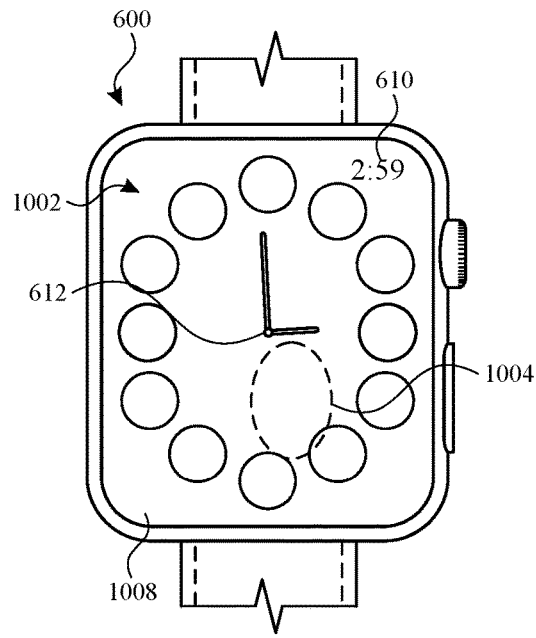
FIGS. 10A-10G illustrate context-specific user interfaces in accordance with some embodiments.

In FIG. 10A, device 600 displays watch user interface 1008 via display 602 at a current time of 2:59. Watch user interface 1008 includes digital indication of time 610 and analog indication of time 612 (as describe above), both displaying a current time of 2:59. As illustrated in FIG. 10A, watch user interface 1008 also includes radial time-scale 1002. Radial time-scale 1002 includes twelve individual holes angularly spaced about a central point on watch user interface 1008. Radial time-scale 1002 serves as visual reference to assist users of device 600 in deciphering the time indicated by the position of character user interface object 1010 on watch user interface 1008 (e.g., a user of device 600 interprets the position of character user interface object 1010 on watch user interface 1008 relative to the holes of radial time-scale 1002). As illustrated in FIG. 10A, each hole is associated with an hourly value (e.g., values corresponding to the hourly markers a clock dial or bezel).

In FIG. 10A, device receives tap gesture 1004. In some embodiments, tap gesture 1004 is replaced with or accompanied by one or more other device inputs (e.g., device 600 receives orientation data from an internal sensor indicating that the user has raised or is raising device 600 into a viewing position). Upon receiving tap gesture 1004, device 600 updates watch user interface 1008 to appear as depicted in FIG. 10B.

Figure 10B:
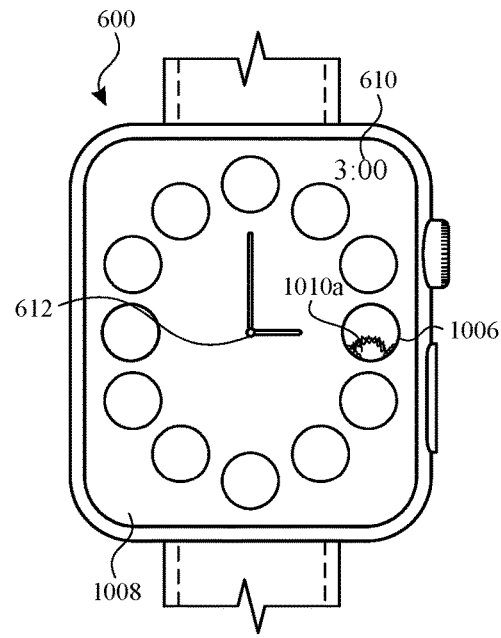

FIG. 10B illustrates watch user interface 1008 at current time of 3:00 (e.g., after one minute has elapsed since device 600 displayed watch user interface 1008 as depicted in FIG. 10A). Device 600 displays updated digital indication of time 610 and analog indication of time 612, both reflecting a current time of 3:00. As illustrated in FIG. 10B, device 600 begins displaying an animation including character user interface object 1010a at a position on watch user interface 1008 indicating a current hour value of 3 (e.g., character user interface object 1010a begins emerging from hole 1006, which is associated the 3 o'clock hour). The location of character user interface object 1010a indicates to the user of device 600 that the current time is within the 3 o'clock hour. In some embodiments, device 600 initiates an animation in response receiving user input (e.g., device 600 receives orientation data from an internal sensor indicating that the user has raised or is raising device 600 into a viewing position, device 600 detects a rotation of rotatable and depressible input mechanism 604, device 600 detects a depression of button 606, device 600 detects a tap gesture on watch user interface 1008, etc.).

In some embodiments, a character user interface object includes a representation of a character, for example a realistic or anthropomorphized character. In some embodiments, a character includes a cartoon figure. In some embodiments, a character includes a human, animal (e.g., a rat, ox, tiger, rabbit, dragon, snake, horse, sheep, monkey, rooster, dog, pig, lion, dragon, etc.), plant, organism, non-living object, or portion thereof. In some embodiments, a character user interface object includes more than one object (e.g., a cartoon pushing a lawnmower, a woman holding a sign, a man holding a briefcase, a dragon breathing fire, etc.).

Figure 10C:
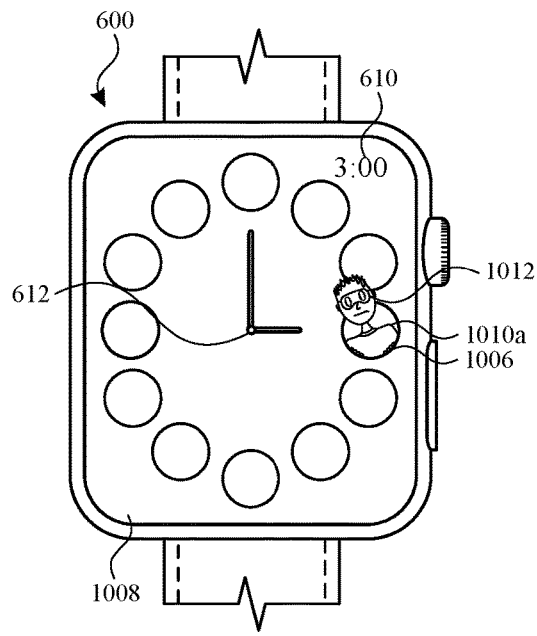

FIG. 10C illustrates watch user interface 1008 as device continues to display an animation of character graphical object 1010a emerging from hole 1006 (e.g., device 600 displays a subsequent frame of the animation of character user interface object 1010a emerging from hole 1006). As depicted in FIG. 10C, character user interface object 1010a includes a person sleeping with a sleeping mask. As discussed above, the appearance of character user interface object 1010a provides the user of device 600 with an indication of a current time of day. For example, messy morning hair and a sleeping mask indicate to the user of device 600 that the position on watch user interface 1008 of character user interface object 1010a (e.g., hole 1006) corresponds to three in the morning (e.g., 3 am) rather than three in the afternoon (e.g., 3 pm). In addition, the numbers on the sleeping mask indicate a minute value of the current time (e.g., 00).

In some embodiments, character user interface object 1010 represents nighttime by depicting a yawn and holding a candle. In some embodiments, character user interface object 1010 is altered to depict wearing clothing associated with nighttime, such as pajamas. In some embodiments, the character interface object is modified to yawn or wear pajamas in accordance with a determination that the user should go to sleep. In some embodiments, the determination is be based on, for example, any of a preset time, recognition of a pattern of the user's sleep, indication of an early event on the next day's calendar, recognition that the user has been active for longer than a predetermined time, etc. In some embodiments, the appearance of character user interface object 1010 indicates a time of day other than morning or nighttime (e.g., breakfast time, lunch time, dinner time, bedtime, a time corresponding to an event such as a calendar appointment, etc.).

In some embodiments, the animation of character user interface object 1010a emerging from hole 1006 includes the character performing an action related to the time of day (e.g., snoring, yawning, eating a particular meal, carrying a brief case, reading a morning newspaper, etc.). In some embodiments, the animation of character user interface objects 1010 includes the character performing different actions for each hour of the day (e.g., a cartoon character user interface object holds up a sign indicating the current hour, a dragon character user interface object breathes fire in the shape of an hourly indicator or contort its body into a shape indicating the current hour, etc.). In some embodiments, the animation of character user interface object 1010a emerging from hole 1006 has a fixed duration (e.g., character user interface object is only displayed by device 600 for a duration of 5 seconds).

Figure 10D:
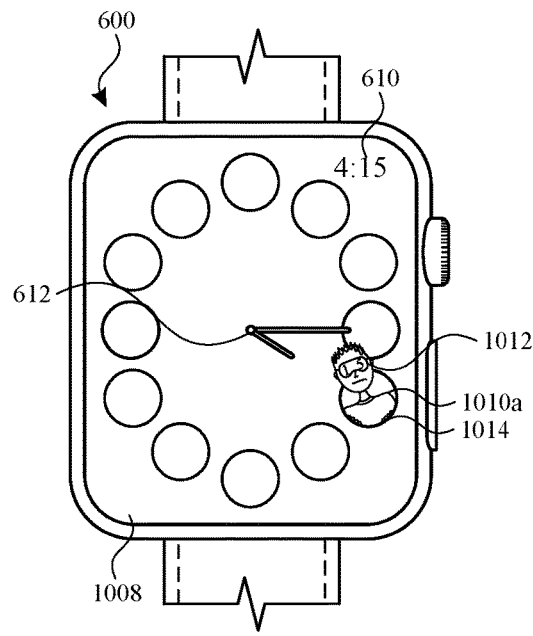

FIG. 10D illustrates watch user interface 1008 at a current time of 4:15 (e.g., after approximately 13.25 hours have elapsed since device 600 displayed watch user interface 1008 as depicted in FIG. 10C). Device 600 displays digital indication of time 610 and analog indication of time 612, both reflecting a current time of 4:15. Device 600 displays character user interface object 1010a on watch user interface 1008 at position on watch user interface 1008 indicating a current hour value of four (e.g., 4). The location of character user interface object 1010a indicates to the user of device 600 that the current time is within the 4 o'clock hour. The appearance of character user interface object 1010a with messy morning hair and a sleeping mask indicates to the user of device 600 that the position on watch user interface 1008 of character user interface object 1010a (e.g., hole 1014) corresponds to four in the morning (e.g., 4 am) rather than four in the afternoon (e.g., 4 pm). In addition, the numbers on the sleeping mask indicate a minute value of the current time (e.g., 15).

Figure 10E:
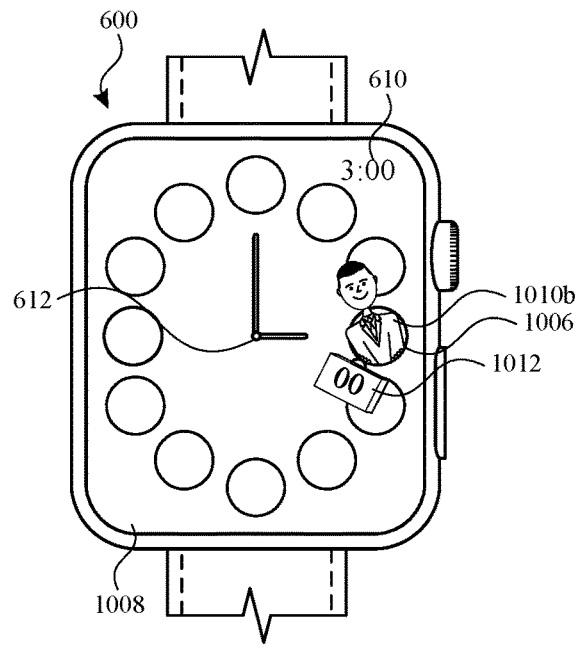

FIG. 10E illustrates watch user interface 1008 at a current time of 3:00 (e.g., after approximately 10.75 hours have elapsed since device 600 displayed watch user interface 1008 as depicted in FIG. 10D). Device 600 displays digital indication of time 610 and analog indication of time 612, both reflecting a current time of 3:00. Device 600 updates watch user interface 1008 to display character user interface object 1010b at position on watch user interface 1008 indicating a current hour value of three (e.g., 3). The location of character user interface object 1010a indicates to the user of device 600 that the current time is within the 3 o'clock hour. The appearance of character user interface object 1010b (e.g., dressed in workday attire with neat hair carrying briefcase 1012) indicates to the user of device 600 that the position on watch user interface 1008 of character user interface object 1010b (e.g., hole 1006) corresponds to three in the afternoon (e.g., 3 pm, a time corresponding to a typical workday schedule) rather than three in the morning (e.g., 3 am). In addition, device 600 display numbers on briefcase 1012 corresponding to a minute value of the current time (e.g., 00).

Figure 10F:
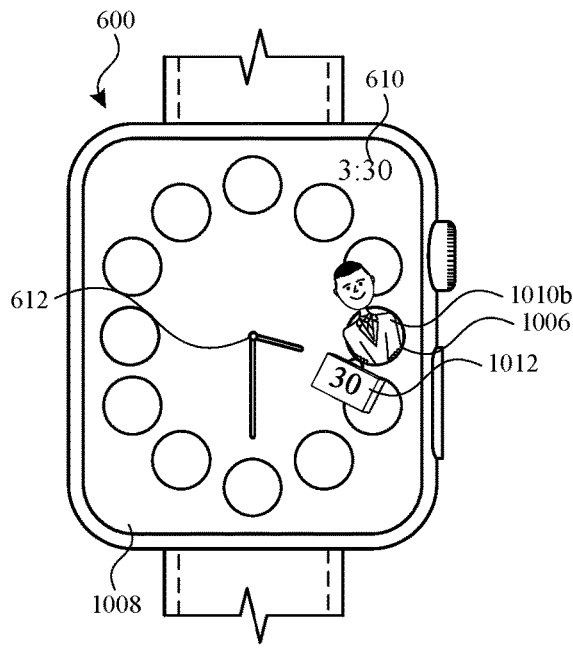

FIG. 10F illustrates watch user interface 1008 at a current time of 3:00 (e.g., after approximately 12 hours have elapsed since device 600 displayed watch user interface 1008 as depicted in FIG. 10E). Device 600 displays digital indication of time 610 and analog indication of time 612, both reflecting a current time of 3:30. Device 600 continues to display watch user interface 1008 to display character user interface object 1010b at position on watch user interface 1008 indicating a current hour value of three (e.g., 3). The appearance of character user interface object 1010b (e.g., dressed in workday attire with neat hair carrying briefcase 1012) indicates to the user of device 600 that the position on watch user interface 1008 of character user interface object 1010b (e.g., hole 1006) corresponds to three in the afternoon (e.g., 3 pm). In addition, device 600 display numbers on briefcase 1012 corresponding to a minute value of the current time (e.g., 30).

Figure 10G:
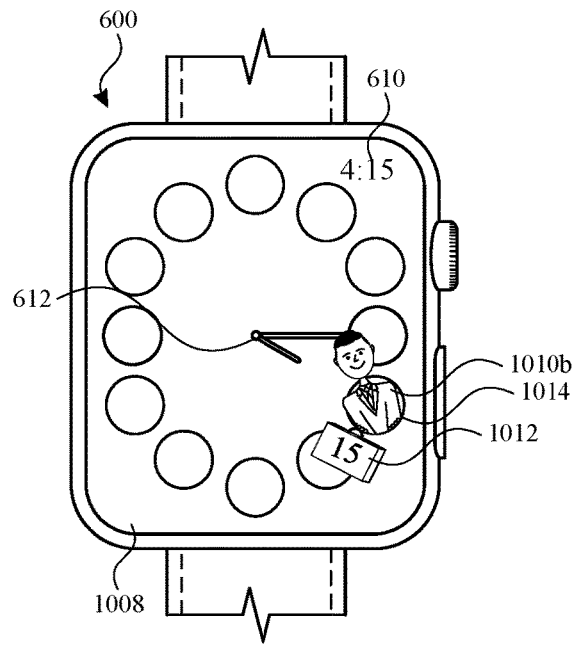

FIG. 10G illustrates watch user interface 1008 at a current time of 4:15 (e.g., after approximately 13.25 hours have elapsed since device 600 displayed watch user interface 1008 as depicted in FIG. 10F). Device 600 displays digital indication of time and analog indication of time 612, both reflecting a current time of 4:15. Device 600 displays character user interface object 1010b on watch user interface 1008 at position on watch user interface 1008 indicating a current hour value of four (e.g., 4). The appearance of character user interface object 1010b (e.g., dressed in workday attire with neat hair carrying briefcase 1012) indicates to the user of device 600 that the position on watch user interface 1008 of character user interface object 1010b (e.g., hole 1014) corresponds to four in the afternoon (e.g., 4 pm). In addition, device 600 display numbers on briefcase 1012 corresponding to a minute value of the current time (e.g., 15).

In some embodiments, device 600 receives first data indicative of an event (e.g., a calendar appointment). Device 600 determines whether the event meets a condition (e.g., the event corresponds to the current date). In accordance with the determination that the event meets the condition, device 600 updates a character user interface object by changing a visual aspect of the character user interface object (e.g., displaying character user interface object with a birthday hat). In some embodiments, device 600 determines whether the current or forecasted weather corresponds to one or more designated weather conditions. In some embodiments, designated weather conditions are system-designated. In some embodiments, designated weather conditions include favorable weather conditions such as sunshine or inclement weather conditions such as rain, thunderstorms, wind, snow, and so forth. If device 600 determines that the current or forecasted weather corresponds to one or more designated weather conditions, device 600 updates a character user interface object to reflect the current or forecasted weather. For example, a user interface screen including a character user interface object with a umbrella, as well as raindrops. In some embodiments, device 600 displays a user interface object reflecting the designated weather condition. In some embodiments, a character user interface object is animated to react to a user interface object reflective of a designated weather condition. As another example, a user interface screen displays a character user interface object with sunglasses and surfboard, as well as sun.

In some embodiments, a device (such as device 600) displays a character user interface object indicating when data indicating user activity can be received. For example, the device includes a user activity monitor (such as a workout monitor), an accelerometer, a gyroscope, a motion sensor, and/or a combination thereof. The device determines whether the data indicating user activity is received outside of a threshold interval after a previous user activity. For example, the device determines whether a threshold period of time has elapsed since the last data indicating user activity (e.g., the last user workout). If the device determines that the data indicating user activity is received outside of the threshold interval after a previous user activity, the device animates the character user interface object to reflect inactivity. For example, the character changes an expression and/or posture to represent boredom, a sedentary or recumbent posture, a sullen or apathetic appearance, and so forth.

In some embodiments, device 600 determines whether the user activity is current user activity, and, if so, animates a character user interface object to represent exercise. For example, a user interface screen including a character user interface object and barbell. In some embodiments, device 600 animates a character user interface object to depict an activity related to exercise, such as motion, running, weight lifting, swimming, bicycling, pushups, and/or sweat, heavy breathing, or any other signs of physical exertion. In some embodiments, the activity monitor includes options for the user to indicate which activity they are going to begin. In these cases the character appearance is changed to reflect the selected activity option.

FIGS. 11A-11D illustrate user interfaces for indicating time on device 600 (as described above) in accordance with some embodiments. The user interfaces depicted in these figures are used to illustrate an example covering the processes described below, including the processes in FIGS. 12A-12C.

Figure 11A:
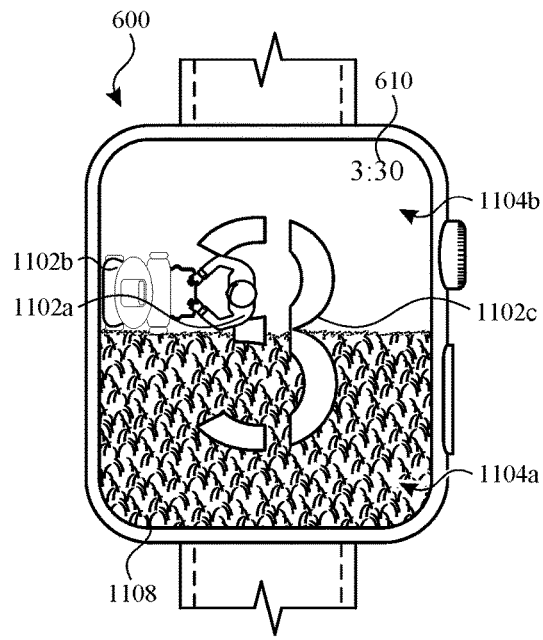
FIGS. 11A-11D illustrate context-specific user interfaces in accordance with some embodiments.
Figure 12C:
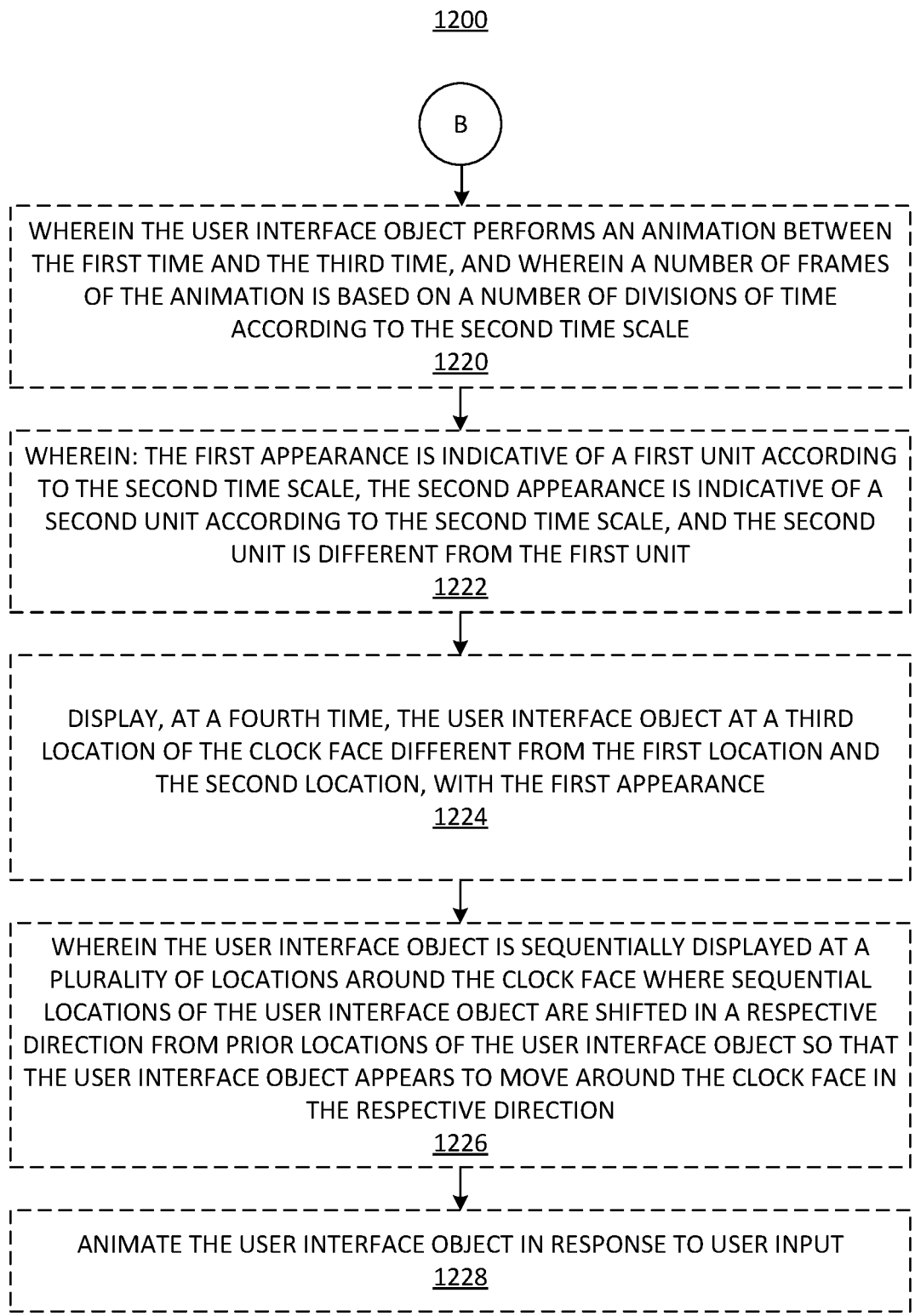

In FIG. 11A, device 600 displays watch user interface 1108 via display 602 at a current time of 3:30. In addition to digital indication of time 610 indicating a current time of 3:30, watch user interface 1108 includes character user interface object 1102. As discussed above, a character user interface object can include a character figure in addition to other objects. For example, as depicted in FIG. 11A, character user interface object 1102 includes man object 1102a pushing mower object 1102b over a lawn that contains lawn emblem object 1102c (e.g., "3").

An aspect of the appearance of character user interface object 1102 provides the user of device 600 with an indication of the current time of day. For example, as illustrated in FIG. 11A, device 600 displays lawn emblem object 1102c (e.g., a "3") indicating to the user of device 600 that the hour value corresponding to the current time is three (e.g., 3). In some embodiments, an aspect of the appearance of character user interface object 1102 (e.g., lawn emblem object 1102*c*) indicates a unit of time other than hours (e.g., minutes, seconds, days, etc.).

A location of at least a portion of character user interface object 1102 on watch user interface 1108 also provides the user of device 600 with an indication of the current time of day. In FIG. 11A, device 600 displays character user interface object 1102 (e.g., man object 1102*a* and mover object 1102*b*) at a position on graphical user interface 1108 illustrative of the man having cut half of the lawn (e.g., unmowed grass 1104*a* and mowed grass 1104*b* occupy the same amount of graphical user interface 1108). In some embodiments, the amount of lawn mown is based on the corresponding position of character user interface object 1102 (e.g., the position of man object 1102*a* and mower object 1102*b*) on watch user interface 1108 is proportional to the minute value of the current time. For example, as depicted in FIG. 11A, the position of character user interface object 1102 (e.g., half way through mowing the lawn) indicates a minute value corresponding to half of the minutes within the current hour (e.g., 30 minutes). In some embodiments, the location of character user interface object 1102 indicates a unit of time other than minutes (e.g., hours, seconds, days, etc.).

Figure 11B:
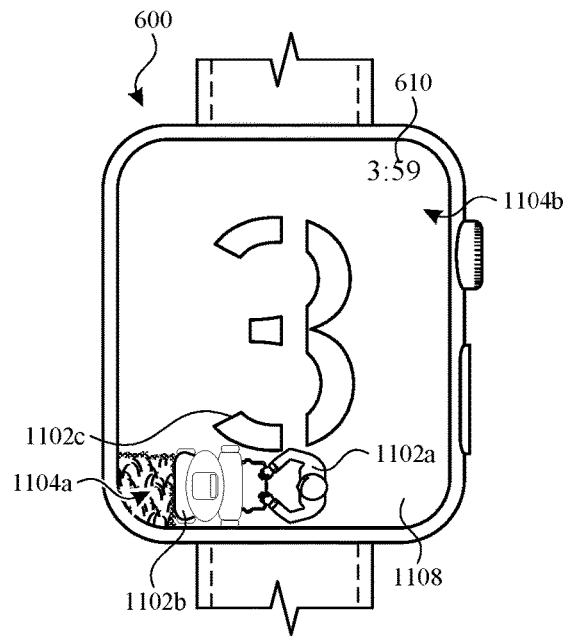

FIG. 11B illustrates watch user interface 1108 at a current time of 3:59 (e.g., after 29 minutes have elapsed since device 600 displayed watch user interface 1108 as depicted in FIG. 11A). Device 600 displays an updated digital indication of time 610 reflecting a current time of 3:59. As depicted in FIG. 11B, device 600 maintains display of lawn emblem 1102*c* as a "3" however, the location of character user interface object 1102 has been updated. As illustrated in FIG. 11B, device 600 displays character user interface object 1102 at a location indicating a minute value corresponding to the current time as 59.

Figure 11C:
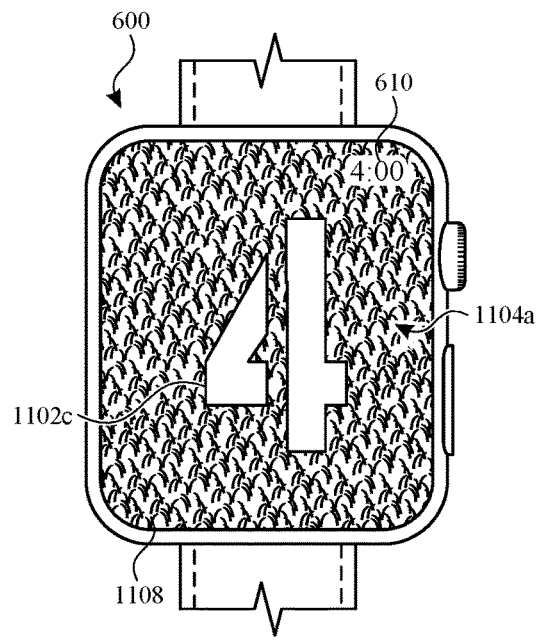

FIG. 11C illustrates watch user interface 1108 at a current time of 4:00 (e.g., after one minute has elapsed since device 600 displayed watch user interface 1108 as depicted in FIG. 11B). Device 600 displays an updated digital indication of time 610 reflecting a current time of 4:00. Device 600 displays of lawn emblem 1102*c* as a "3" however, the location of character user interface object 1102 has been updated. As illustrate in FIG. 11C, device 600 displays user interface object 1102 at a location indicating a minute value corresponding to the current time is zero (e.g., 00).

Figure 11D:
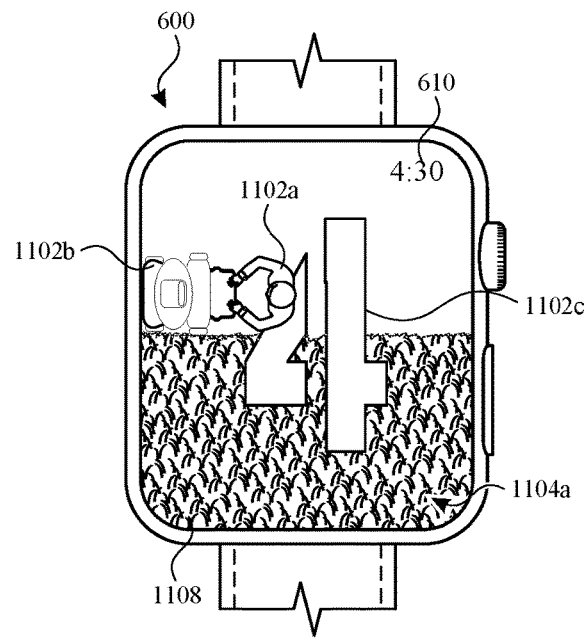

FIG. 11D illustrates watch user interface 1108 at a current time of 4:30 (e.g., after 30 minutes have elapsed since device 600 displayed watch user interface 1108 as depicted in FIG. 11C). Device 600 displays an updated digital indication of time 610 reflecting a current time of 4:30. Device 600 updates watch user interface 1108 to display lawn emblem 1102*c* as a "4," and to display character user interface object 1102 at a location indicating a minute value corresponding to the current time as thirty (e.g., 30).

In some embodiments, the current time of day is depicted as an ongoing animation, with each animation frame corresponding to a minute value of the respective hour of day. For example, device 600 updates watch user interface 1108 at every minute, displaying a frame depicting the progress of character user interface object 1102 mowing the lawn (i.e., mowing un-mowed grass 1102*a*). FIGS. 11A-11D illustrate exemplary animation frames (e.g., FIG. 11A illustrates an animation frame corresponding to 30 minutes, FIG. 11B illustrates an animation frame corresponding to 59 minutes, etc.). In some embodiments, the number of frames included in an animation is based in part on a unit of time associated with the position of character user interface object 1102. For example, as described above in reference to FIGS. 11A-11D, the position of character user interface object 1102 relates to a minute value of the current hour, thus, a corresponding animation includes 60 frames (e.g., corresponding to each minute within an hour).

In some embodiments, device 600 displays an animation in response to the current time being a predetermined time (e.g., the current time is a predetermined amount of time (e.g., one minute) before or after a predetermined time (e.g., 4:00)). In some embodiments, device 600 initiates an animation in response receiving user input (e.g., device 600 receives orientation data from an internal sensor indicating that the user has raised or is raising device 600 into a viewing position, device 600 detects a rotation of rotatable and depressible input mechanism 604, device 600 detects a depression of button 606, etc.).

FIGS. 12A-12C are a flow diagram illustrating method 1200 for indicating a current time using an electronic device in accordance with some embodiments. Method 1200 is performed at a device (e.g., 100, 300, 500, 600) with a display device (e.g., 602). Some operations in method 1200 are, optionally, combined, the orders of some operations are, optionally, changed, and some operations are, optionally, omitted. In some embodiments, method 1200 relates to having an animated character move around an outside of a watch face as time progresses while performing actions to indicate time, where actions represent time according to one time unit (e.g., hours) and location represents time according to a different time unit (e.g., minutes). In some embodiments, a dragon moves around the watch face to indicate minute based on the dragon's location and then the dragon contorting to a number to indicate hour.

As described below, method 1200 provides a technique for dynamically modifying a location and appearance of a user interface object based on a current time. The method provides a user with an easily decipherable visual indication that quickly draws the user's attention to relevant information (e.g., a current hour measured by a device) and/or reduces the cognitive burden on a user for identifying a state of a device (e.g., a current time as measured by a device, thereby creating a more efficient human-machine interface. Providing improved visual feedback to the user enhances the operability of the device and makes the user-device interface more efficient (e.g., by helping the user to quickly resolve the current time, the user does not need to spend as much time interacting with the device) which, additionally, reduces power usage and improves battery life of the device by enabling the user to use the device more efficiently.

At 1202, the device (e.g., 600) device displays, via the display device (e.g., 602) at a first time (e.g., 10:10), a user interface object (e.g., 904*a* in FIG. 9A, 1010*a* in FIG. 10C, 1102*a* in FIG. 11A) (in some embodiments, the user interface object is a character user interface object) (e.g., in some embodiments, the user interface object is a single user interface object) at a first location of the clock face, where the user interface object has a first appearance at the first time.

At 1204, the device displays, via the display device at a second time (e.g., 10:11) different from the first time), the user interface object (e.g., 904*a* in FIG. 9C, 1010*a* in FIG. 10D, 1102*a* in FIG. 11B) at a second location of the clock face, where the user interface object has the first appearance at the second time, and where a difference between the first time and the second time is at least one unit (e.g., a minute) according to a first time scale (e.g., minutes).

At 1206, in some embodiments, the device displays, via the display device the user interface object (e.g., 1010*a* and

1010*b*) for a first amount of time (e.g., 1 minute) after the first time (e.g., 10:10), and displays the user interface object for a second amount of time (e.g., 1 minute) after the second time (e.g., 11:10), where the first location is indicative of a first unit (e.g., 10 when it is 10:12) according to the second time scale (e.g., hours, even though the second time scale is interpreted as minutes above), the second location is indicative of a second unit (e.g., 11 when it is 11:12) according to the second time scale (e.g., hours), the second unit is different from the first unit.

At 1208, in some embodiments, the device ceases to display, via the display device, the user interface object after the first amount of time.

At 1210, in some embodiments, the device ceases to display, via the display device, the user interface object after the second amount of time.

At 1212, in some embodiments, the device displays via the display device an animation of the user interface object (e.g., 1010*a* and 1010*b*) performing (e.g., a character yawns, stretches, puts on sunglasses, or the like) at a plurality of time boundaries according to the second time scale, the animation at a first time boundary including an activity corresponding to a first time of day at the first time boundary (e.g., in the morning, eating a bowl of cereal, reading a newspaper, or drinking a cup of coffee, etc.), and the animation at second first time boundary that is different from the first time boundary including an activity corresponding to a second time of day that is different from the first time of day at the second time boundary (e.g., in the evening, putting on pajamas or turning off a light switch, etc.). In some embodiments, the character acts out activity corresponding to the time of day switch at an hourly boundary (e.g., 1010*a* in FIG. 10C and 1010*b* in FIG. 10E).

In some embodiments, displaying an animation at each time boundary corresponding to the particular time of day provides the user with additional feedback about the current state of the watch (e.g., the current time relative to activities a user normally performs at the time of day corresponding to the respective time boundary). Providing improved visual feedback to the user enhances the operability of the device and makes the user-device interface more efficient (e.g., by helping the user to quickly resolve the current time, without the need to decipher textual or numerical symbols, the user does not need to spend as much time interacting with the device) which, additionally, reduces power usage and improves battery life of the device by enabling the user to use the device more efficiently.

At 1214, in some embodiments, the device displays via the display device an illustration (1010*a* and 1010*b*) that changes as time of day time of day changes. For example, in some embodiments, the animation at the first time boundary is different from the animation at the second time boundary.

At 1216, the device displays, via the display device at a third time (e.g., 11:10) different from each of the second time and the first time, the user interface object (e.g., 904*b* in FIG. 9E, 1010*b* in FIG. 10E, 1102*c* in FIG. 11C) at the first location of the clock face, where the user interface object has a second appearance at the third time, where a difference between the first time and the third time is at least one unit (e.g., an hour) according to a second time scale (e.g., hours) (e.g., where the user interface object maintains the representation between the first time and the second time) different from the first time scale.

At 1218, in some embodiments, the device displays via the display device the user interface object performing a first animation at the first time (e.g., the user interface object performs an action that is indicative of the time, such as yawning when it is late or stretching if it is early) and a second animation at the third time (e.g., interacting with an object of a first type at the first location and interacting with a different object of the first type at the second location) (e.g., 1010*a* in FIGS. 10C and 10D, 1010*b* in FIGS. 10F and 10G). For example, a character walks around watch face eating items at each number.

At 1220, in some embodiments, the device displays via the display device an animation including a number of frames based on divisions of time) (e.g., 1108 in FIGS. 11A-11D) (e.g., 60 frames for a 60 second animation, 24 frames for a 24 hour animation). For example, in some embodiments, the user interface object performs an animation between the first time and the third time (e.g., a person mowing a lawn or the user interface object transforming from one appearance (e.g., shape, such as a triangle) to another appearance (e.g., a different shape, such as a square)), and where a number of frames of the animation is based on a number of divisions of time according to the second time scale (e.g., when the second time scale is minutes, the number of frames is 60 to correspond to how many minutes are in an hour.

In some embodiments, varying the number of frames of a displayed animation based on a time scale provides the user with additional feedback about the current state of the watch (e.g., the current time relative to a specific temporal scale). Providing improved visual feedback to the user enhances the operability of the device and makes the user-device interface more efficient (e.g., by helping the user to quickly resolve the current time, without the need to decipher textual or numerical symbols, the user does not need to spend as much time interacting with the device) which, additionally, reduces power usage and improves battery life of the device by enabling the user to use the device more efficiently.

At 1222, in some embodiments, the device displays via the display device, a character (e.g., 904*a* in FIG. 9C and 904*b* in FIG. 9D) changing shape to represent a number indicative of the current time at the location (e.g., changing in shape to look like a 3). In some embodiments, the first appearance is indicative of a first unit (e.g., a hand showing 2 fingers or a snake contorted to look like the number 2) according to the second time scale, the second appearance is indicative of a second unit according to the second time scale, and the second unit is different from the first unit.

At 1224, in some embodiments, the device displays, via the display device at a fourth time (e.g., 10:12) different from each of the first time, the second time, and the third time, the user interface object (e.g., 904*a* in FIG. 9B) at a third location of the clock face different from the first location and the second location, where the user interface object has the first appearance at the fourth time.

At 1226, in some embodiments, the device displays, via the display device, the user interface object (e.g., 904*a* and 904*b* throughout FIGS. 9A-9E) sequentially at a plurality of locations around the clock face where sequential location of the user interface object are shifted in a respective direction from prior locations of the user interface object so that the user interface object appears to move around the clock face in the respective direction. For example, the character runs or climbs around watch face once per minute or once per hour. In some embodiments, the object moves through a plurality of positions as the appearance of the object remains substantially the same (e.g., a dragon stays in the same shape while moving from the 2 to the 3).

At 1228, in some embodiments, the device displays, via the display device the animation (e.g., 1008 in FIGS. 10A-10C) upon user interaction (e.g., wrist raise or tap). For example, the device animates the user interface object (e.g., a character pops out of a hole, a character transforms into another character, or a character eats food or performs some other action) in response to user input.

Note that details of the processes described above with respect to method 1200 (e.g., FIGS. 12A-12C) are also applicable in an analogous manner to the methods described above. For example, method 800 optionally includes one or more of the characteristics of the various methods described above with reference to method 1200. For example, the techniques for modifying the appearance of character user interface objects to illustrate an activity indicative of a time of day (e.g., sleeping) discussed in method 1200 can be used in method 800 to provide an indication of, for example, whether indications of time on a watch user interface correspond to Ante Meridiem (i.e., AM) or Post Meridiem (i.e., PM) time. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources provide context-specific user interfaces with improved time indicating functionality. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to initiate energy intensive operations, such as displaying animated content, only at times such content will be of great interest to the user. Accordingly, use of such personal information data enables users to have calculated control of device energy usage, which is of great concern in portable battery-operated electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in context-specific user interfaces which indicate time, the present technology can be configured to allow users to select to "opt in" or "opt out" of participation in the collection of personal information data during registration for services or anytime thereafter. In another example, users can select not to provide device orientation data or device usage data for specific purposes, such as targeted content delivery services. In yet another example, users can select to limit the length of time device orientation data or device usage data is maintained or entirely prohibit the development of a baseline device orientation or device usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, animation content can be selected and delivered to users only in particular contexts (i.e., while the user is viewing the device) by inferring preferences based on non-personal information data (e.g., settings) or a bare minimum amount of personal information, such as the content being requested by the device associated with a user, other non-personal information available to the device, or publicly available information.

What is claimed is:

1. An electronic device, comprising:
 a display device;
 one or more processors; and
 memory storing one or more programs configured to be executed by the one or more processors, the one or more programs including instructions for:
  displaying, via the display device and at a first time of a day that is within a first hour of the day:
   an indication of time that indicates the first time of the day; and
   a first user interface object, wherein the first user interface object has a first shape that indicates the first hour of the day;
  displaying, via the display device and at a second time of the day, wherein the second time of the day is a time that is within a threshold time of an hour boundary between the first hour of the day and a second hour of the day:
   the indication of time, wherein the indication of time indicates the second time of the day; and
   a first transitional user interface object that is a combination of the first user interface object and a second user interface object;
  displaying, via the display device and at a third time of the day, wherein the third time of the day is within the second hour of the day:
   the indication of time, wherein the indication of time indicates the third time of the day; and
   the second user interface object different from the first user interface object, wherein the second user interface object includes a second shape that indicates the second hour of the day;
  displaying, via the display device and at a fourth time of the day, wherein the fourth time of the day is a time that is within the threshold time of an hour boundary between the second hour of the day and a third hour of the day:
   the indication of time, wherein the indication of time indicates the fourth time of the day; and
   a second transitional user interface object that is a combination of the second user interface object and a third user interface object; and
  displaying, via the display device and at a fifth time of the day, wherein the fifth time of the day is within the third hour of the day:
   the indication of time, wherein the indication of time indicates the fifth time of the day; and
   the third user interface object different from the first user interface object and the second user interface object, wherein the third user interface object includes a third shape that indicates the third hour of the day.

2. The electronic device of claim 1, wherein the one or more programs further include instructions for:
 outputting, by the electronic device and at a sixth time of the day, wherein the sixth time of the day is within the first hour of the day, an alert;
 after outputting the alert, receiving user input; and
 in response to receiving the user input:
  in accordance with a determination that the user input is not received within a predefined duration of time after outputting the alert, displaying, via the display device, the indication of time without displaying the first transitional user interface object that is the combination of the first user interface object and the second user interface object.

3. The electronic device of claim 1, wherein the one or more programs further include instructions for:
 in accordance with a determination that the display device is in a non-active state, displaying, via the display device, the indication of time without displaying the first transitional user interface object that is the combination of the first user interface object and the second user interface object.

4. The electronic device of claim 1, wherein the one or more programs further include instructions for:
 transitioning from displaying the first user interface object to displaying the second user interface object, wherein the transitioning corresponds to the first user interface object turning into the second user interface object.

5. The electronic device of claim 4, wherein the transitioning is continual from the first time to the third time.

6. The electronic device of claim 1, wherein the first transitional user interface object that is the combination of the first user interface object and the second user interface object depicts the first user interface object interacting with the second user interface object.

7. The electronic device of claim 1, wherein displaying the first transitional user interface object that is the combination of the first user interface object and the second user interface object includes displaying an animation involving the first user interface object and the second user interface object.

8. The electronic device of claim 1, wherein the first transitional user interface object that is the combination of the first user interface object and the second user interface object includes a visual blend of the first shape of the first user interface object and the second shape of the second user interface object.

9. The electronic device of claim 1, wherein:
 the indication of time and the third user interface object are displayed at the fifth time of the day without displaying the first user interface object, the second user interface object, and a fourth user interface object,
 the fourth user interface object has a fourth shape that indicates a fourth hour of the day,
 the fourth user interface object is different from the first user interface object, the second user interface object, and the third user interface object, and
 the one or more programs further include instructions for:
  displaying, via the display device and at a seventh time of the day:
   the indication of time, wherein the indication of time indicates the seventh time of the day; and a third transitional user interface object that is a combination of the third user interface object and the fourth user interface object;

displaying, via the display device and at an eighth time of the day:

the indication of time, wherein the indication of time indicates the eighth time of the day; and the fourth user interface object.

10. The electronic device of claim 1, wherein:

the indication of time that indicates the first time of the day and the first user interface object are displayed at the first time of the day without displaying the second user interface object and the third user interface object, the second time of the day is after the first time of the day and is within the first hour of the day, the second hour of the day does not include the first time of the day, the third time of the day is after the second time of the day and is not within the first hour of the day, the indication of time that indicates the third time of the day and the second user interface object are displayed at the third time of the day without displaying the first user interface object and the third user interface object, the third hour of the day does not include the third time of the day, the fourth time of the day is after the third time of the day and is within the second hour of the day, the fifth time of the day is after the fourth time of the day, the fifth time of the day is not within the first hour of the day and is not within the second hour of the day, and the indication of time that indicates the fifth time of the day and the third user interface object are displayed at the fifth time of the day without displaying the first user interface object and without displaying the second user interface object.

11. A non-transitory computer-readable storage medium storing one or more programs configured to be executed by one or more processors of an electronic device with a display device, the one or more programs including instructions for:

displaying, via the display device and at a first time of a day that is within a first hour of the day:

an indication of time that indicates the first time of the day; and a first user interface object, wherein the first user interface object has a first shape that indicates the first hour of the day;

displaying, via the display device and at a second time of the day, wherein the second time of the day is a time that is within a threshold time of an hour boundary between the first hour of the day and a second hour of the day:

the indication of time, wherein the indication of time indicates the second time of the day; and a first transitional user interface object that is a combination of the first user interface object and a second user interface object;

displaying, via the display device and at a third time of the day, wherein the third time of the day is within the second hour of the day:

the indication of time, wherein the indication of time indicates the third time of the day; and the second user interface object different from the first user interface object, wherein the second user interface object includes a second shape that indicates the second hour of the day;

displaying, via the display device and at a fourth time of the day, wherein the fourth time of the day is a time that is within the threshold time of an hour boundary between the second hour of the day and a third hour of the day:

the indication of time, wherein the indication of time indicates the fourth time of the day; and a second transitional user interface object that is a combination of the second user interface object and a third user interface object; and displaying, via the display device and at a fifth time of the day, wherein the fifth time of the day is within the third hour of the day:

the indication of time, wherein the indication of time indicates the fifth time of the day; and the third user interface object different from the first user interface object and the second user interface object, wherein the third user interface object includes a third shape that indicates the third hour of the day.

12. The non-transitory computer-readable storage medium of claim 11, wherein the one or more programs further include instructions for:

outputting, by the electronic device and at a sixth time of the day, wherein the sixth time of the day is within the first hour of the day, an alert;

after outputting the alert, receiving user input; and in response to receiving the user input:

in accordance with a determination that the user input is not received within a predefined duration of time after outputting the alert, displaying, via the display device, the indication of time without displaying the first transitional user interface object that is the combination of the first user interface object and the second user interface object.

13. The non-transitory computer-readable storage medium of claim 11, wherein the one or more programs further include instructions for:

in accordance with a determination that the display device is in a non-active state, displaying, via the display device, the indication of time without displaying the first transitional user interface object that is the combination of the first user interface object and the second user interface object.

14. The non-transitory computer-readable storage medium of claim 11, wherein the one or more programs further include instructions for:

transitioning from displaying the first user interface object to displaying the second user interface object, wherein the transitioning corresponds to the first user interface object turning into the second user interface object.

15. The non-transitory computer-readable storage medium of claim 14, wherein the transitioning is continual from the first time to the third time.

16. The non-transitory computer-readable storage medium of claim 11, wherein the first transitional user interface object that is the combination of the first user interface object and the second user interface object depicts the first user interface object interacting with the second user interface object.

17. The non-transitory computer-readable storage medium of claim 11, wherein displaying the first transitional user interface object that is the combination of the first user interface object and the second user interface object includes displaying an animation involving the first user interface object and the second user interface object.

18. The non-transitory computer-readable storage medium of claim 11, wherein the first transitional user interface object that is the combination of the first user interface object and the second user interface object includes a visual blend of the first shape of the first user interface object and the second shape of the second user interface object.

19. The non-transitory computer-readable storage medium of claim 11, wherein:
the indication of time and the third user interface object are displayed at the fifth time of the day without displaying the first user interface object, the second user interface object, and a fourth user interface object,
the fourth user interface object has a fourth shape that indicates a fourth hour of the day,
the fourth user interface object is different from the first user interface object, the second user interface object, and the third user interface object, and
the one or more programs further include instructions for:
displaying, via the display device and at a seventh time of the day:
the indication of time, wherein the indication of time indicates the seventh time of the day; and
a third transitional user interface object that is a combination of the third user interface object and the fourth user interface object;
displaying, via the display device and at an eighth time of the day:
the indication of time, wherein the indication of time indicates the eighth time of the day; and
the fourth user interface object.

20. The non-transitory computer-readable storage medium of claim 11, wherein:
the indication of time that indicates the first time of the day and the first user interface object are displayed at the first time of the day without displaying the second user interface object and the third user interface object,
the second time of the day is after the first time of the day and is within the first hour of the day,
the second hour of the day does not include the first time of the day,
the third time of the day is after the second time of the day and is not within the first hour of the day,
the indication of time that indicates the third time of the day and the second user interface object are displayed at the third time of the day without displaying the first user interface object and the third user interface object,
the third hour of the day does not include the third time of the day,
the fourth time of the day is after the third time of the day and is within the second hour of the day,
the fifth time of the day is after the fourth time of the day,
the fifth time of the day is not within the first hour of the day and is not within the second hour of the day, and
the indication of time that indicates the fifth time of the day and the third user interface object are displayed at the fifth time of the day without displaying the first user interface object and without displaying the second user interface object.

21. A method, comprising:
at an electronic device with a display device, one or more processors, and memory:
displaying, via the display device and at a first time of a day that is within a first hour of the day:
an indication of time that indicates the first time of the day; and
a first user interface object, wherein the first user interface object has a first shape that indicates the first hour of the day;
displaying, via the display device and at a second time of the day, wherein the second time of the day is a time that is within a threshold time of an hour boundary between the first hour of the day and a second hour of the day:
the indication of time, wherein the indication of time indicates the second time of the day; and
a first transitional user interface object that is a combination of the first user interface object and a second user interface object;
displaying, via the display device and at a third time of the day, wherein the third time of the day is within the second hour of the day:
the indication of time, wherein the indication of time indicates the third time of the day; and
the second user interface object different from the first user interface object, wherein the second user interface object includes a second shape that indicates the second hour of the day;
displaying, via the display device and at a fourth time of the day, wherein the fourth time of the day is a time that is within the threshold time of an hour boundary between the second hour of the day and a third hour of the day:
the indication of time, wherein the indication of time indicates the fourth time of the day; and
a second transitional user interface object that is a combination of the second user interface object and a third user interface object; and
displaying, via the display device and at a fifth time of the day, wherein the fifth time of the day is within the third hour of the day:
the indication of time, wherein the indication of time indicates the fifth time of the day; and
the third user interface object different from the first user interface object and the second user interface object, wherein the third user interface object includes a third shape that indicates the third hour of the day.

22. The method of claim 21, further comprising:
outputting, by the electronic device and at a sixth time of the day, wherein the sixth time of the day is within the first hour of the day, an alert;
after outputting the alert, receiving user input; and
in response to receiving the user input:
in accordance with a determination that the user input is not received within a predefined duration of time after outputting the alert, displaying, via the display device, the indication of time without displaying the first transitional user interface object that is the combination of the first user interface object and the second user interface object.

23. The method of claim 21, further comprising:
in accordance with a determination that the display device is in a non-active state, displaying, via the display device, the indication of time without displaying the first transitional user interface object that is the combination of the first user interface object and the second user interface object.

24. The method of claim 21, further comprising:
transitioning from displaying the first user interface object to displaying the second user interface object, wherein the transitioning corresponds to the first user interface object turning into the second user interface object.

25. The method of claim 24, wherein the transitioning is continual from the first time to the third time.

26. The method of claim 21, wherein the first transitional user interface object that is the combination of the first user interface object and the second user interface object depicts the first user interface object interacting with the second user interface object.

27. The method of claim 21, wherein displaying the first transitional user interface object that is the combination of the first user interface object and the second user interface object includes displaying an animation involving the first user interface object and the second user interface object.

28. The method of claim 21, wherein the first transitional user interface object that is the combination of the first user interface object and the second user interface object includes a visual blend of the first shape of the first user interface object and the second shape of the second user interface object.

29. The method of claim 21, wherein:
- the indication of time and the third user interface object are displayed at the fifth time of the day without displaying the first user interface object, the second user interface object, and a fourth user interface object,
- the fourth user interface object has a fourth shape that indicates a fourth hour of the day,
- the fourth user interface object is different from the first user interface object, the second user interface object, and the third user interface object, and
- the method further comprises:
  - displaying, via the display device and at a seventh time of the day:
    - the indication of time, wherein the indication of time indicates the seventh time of the day; and
    - a third transitional user interface object that is a combination of the third user interface object and the fourth user interface object;
  - displaying, via the display device and at an eighth time of the day:
    - the indication of time, wherein the indication of time indicates the eighth time of the day; and
    - the fourth user interface object.

30. The method of claim 21, wherein
the indication of time that indicates the first time of the day and the first user interface object are displayed at the first time of the day without displaying the second user interface object and the third user interface object,
the second time of the day is after the first time of the day and is within the first hour of the day,
the second hour of the day does not include the first time of the day,
the third time of the day is after the second time of the day and is not within the first hour of the day,
the indication of time that indicates the third time of the day and the second user interface object are displayed at the third time of the day without displaying the first user interface object and the third user interface object,
the third hour of the day does not include the third time of the day,
the fourth time of the day is after the third time of the day and is within the second hour of the day,
the fifth time of the day is after the fourth time of the day,
the fifth time of the day is not within the first hour of the day and is not within the second hour of the day, and
the indication of time that indicates the fifth time of the day and the third user interface object are displayed at the fifth time of the day without displaying the first user interface object and without displaying the second user interface object.

* * * * *